US010580457B2

(12) United States Patent
Miller et al.

(10) Patent No.: US 10,580,457 B2
(45) Date of Patent: Mar. 3, 2020

(54) EFFICIENT AUDIO DESCRIPTION SYSTEMS AND METHODS

(71) Applicant: 3Play Media, Inc., Boston, MA (US)

(72) Inventors: Joshua Miller, Charlestown, MA (US); Christopher S. Antunes, Boston, MA (US); Lily Megan Berthold-Bond, Cambridge, MA (US); Andrew H. Schwartz, Roslindale, MA (US); Kelly J. Savietta, Madison, WI (US); Lanya Lee Butler, Somerville, MA (US); Sharon Lee Tomasulo, Medford, MA (US); Jeremy E. Barron, Boston, MA (US); Christopher E. Johnson, Belmont, MA (US); Roger S. Zimmerman, Boston, MA (US)

(73) Assignee: 3Play Media, Inc., Boston, MA (US)

( * ) Notice: Subject to any disclaimer, the term of this patent is extended or adjusted under 35 U.S.C. 154(b) by 139 days.

(21) Appl. No.: 16/007,149

(22) Filed: Jun. 13, 2018

(65) Prior Publication Data

US 2018/0358052 A1    Dec. 13, 2018

Related U.S. Application Data

(60) Provisional application No. 62/518,911, filed on Jun. 13, 2017.

(51) Int. Cl.
*G11B 27/036* (2006.01)
*G10L 21/055* (2013.01)
(Continued)

(52) U.S. Cl.
CPC .......... *G11B 27/036* (2013.01); *G10L 15/265* (2013.01); *G10L 21/055* (2013.01);
(Continued)

(58) Field of Classification Search
CPC ... G10L 15/265; G10L 21/055; G11B 27/036; G11B 27/10; H04N 5/9305; H04N 9/8715
(Continued)

(56) References Cited

U.S. PATENT DOCUMENTS 8,230,343 B2 * 7/2012 Logan .................. G10H 1/0033
715/723
8,839,086 B2 * 9/2014 Basson ................ H04N 21/235
386/201

(Continued)

*Primary Examiner* — Thai Q Tran
*Assistant Examiner* — Stephen R Smith
(74) *Attorney, Agent, or Firm* — Finch & Maloney PLLC

(57) ABSTRACT

A computer system configured to generate an audio description of a media file is provided. The system includes a display, a memory, and a processor coupled to the display and the memory. The memory stores a media file, including video data that is accessible via a time index and audio data synchronized with the video data by the time index and a transcript of the audio data, including transcription data synchronized with the video data via the time index. The processor is configured to render, via the display, images from portions of the video data; render text from portions of the transcription data in synchrony with the images; receive input identifying a point within the time index; receive input specifying audio description data to associate with the point; store, in the memory, the audio description data; and store an association between the audio description data and the point.

31 Claims, 18 Drawing Sheets

(51) Int. Cl.
*H04N 5/93* (2006.01)
*G11B 27/10* (2006.01)
*G10L 15/26* (2006.01)
*G11B 27/28* (2006.01)
*H04N 9/87* (2006.01)

(52) U.S. Cl.
CPC .............. *G11B 27/10* (2013.01); *G11B 27/28* (2013.01); *H04N 5/9305* (2013.01); *H04N 9/8715* (2013.01)

(58) Field of Classification Search
USPC .......... 386/244, 285, 239, 241, 278; 348/62; 381/80; 704/235, 271; 715/203
See application file for complete search history.

(56) References Cited

U.S. PATENT DOCUMENTS

| | | | |
|---|---|---|---|
| 2010/0260482 A1* | 10/2010 | Zoor | G11B 27/10 386/239 |
| 2012/0151320 A1* | 6/2012 | McClements, IV | G06Q 10/101 715/230 |
| 2013/0156398 A1* | 6/2013 | Fradet | H04H 60/37 386/231 |
| 2014/0133832 A1* | 5/2014 | Sumler | G11B 27/034 386/278 |
| 2014/0344839 A1* | 11/2014 | Woods | H04N 21/488 725/9 |
| 2015/0312649 A1* | 10/2015 | Gopalan | H04N 21/23418 725/32 |
| 2015/0317304 A1* | 11/2015 | An | G11B 27/036 386/285 |
| 2016/0080685 A1* | 3/2016 | De Saint Salvy | H04N 21/4302 386/285 |
| 2017/0286383 A1* | 10/2017 | Koul | G06K 9/4604 |
| 2018/0035163 A1* | 2/2018 | Thomas | H04N 21/44213 |
| 2018/0341455 A1* | 11/2018 | Ivanov | G06F 3/165 |
| 2019/0096407 A1* | 3/2019 | Lambourne | G10L 15/265 |

* cited by examiner

Upload

1. Service  2. Options  3. Location  4. Summary

1. Which service would you like?

- ● English Transcription and Captioning (default service)
- ○ Spanish-Latin America Transcription and Captioning ($4.50 per min)
- ○ Alignment ($1.25 per min). I have transcripts to sync to my media files Add-On Services:
- ☑ Add Audio Description : More Info
- ☐ Add Caption Placement : More Info Credit: $0.00

902 — (service options)
904 — (add-on services)

FIG. 9

EFFICIENT AUDIO DESCRIPTION SYSTEMS AND METHODS

RELATED APPLICATIONS

The present application claims priority under 35 U.S.C. § 119(e) to U.S. Provisional Application 62/518,911, filed on Jun. 13, 2017, and titled "EFFICIENT AUDIO DESCRIPTION SYSTEM AND METHODS," which is hereby incorporated herein by reference in its entirety. The present application relates to U.S. Pat. No. 9,704,111, issued on Jul. 11, 2017 and titled "ELECTRONIC JOB MARKET" ("Electronic Job market patent"), which is hereby incorporated herein by reference in its entirety. The present application relates to U.S. Pat. No. 9,633,696 issued on Apr. 25, 2017 and titled "SYSTEMS AND METHODS FOR AUTOMATICALLY SYNCHRONIZING MEDIA TO DERIVED CONTENT" ("Alignment patent"), which is hereby incorporated herein by reference in its entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

Technical Field

The technical field relates generally to audio description of content and, more particularly, to systems and methods that generate an audio description of a media file.

Background Discussion

Audio description of video (sometimes referred to as "descriptive narration" or "video description") provides, via an audio track, critical information about actions, characters, scene changes, on-screen text, and other visual content that is not articulated in source audio associated with the video. Audio description improves the accessibility of visual images for people who are blind, low vision, or are otherwise visually impaired. Several U.S. federal accessibility laws require audio description for video in certain contexts, including for when video is presented on-line.

However, the creation of audio description (as well as the publishing process) is expensive and cumbersome. Traditionally, producers of video content have employed script writers and voice talent to create audio descriptions. In this traditional approach, the time points for insertion of the descriptions are determined interactively while watching the video content, the script for the descriptive audio is created given an estimate of how much speech can fit in the available time, and the human voice is recorded iteratively to carefully fit into the indicated time limitations. Often, this process must be repeated many times to optimize the usefulness of description given the time constraints. For example, the time regions that require audio description may be modified, the script may be rewritten to fit into a shorter available time period, or the speaker may increase her speaking rate to fit into the available time. In some cases, it may be determined that the source video (or source audio track in the source video) must be modified to accommodate the required narration, and this will incur further post production costs. In addition, this process makes editing audio description after the fact virtually impossible. The personnel costs for these activities may be very high. As a result of these challenges, traditional audio description services may be priced at $15-$75 per minute of content.

SUMMARY

At least some aspects and embodiments disclosed herein provide for a computer system that addresses the challenges articulated above. In so doing, these aspects and embodiments make wider adoption of audio description possible by reducing its costs and increasing the population who can perform the work. Furthermore, at least some of the aspects and embodiments disclosed herein increase productivity of audio description professionals via the inventive use of particular arrangements of user interface elements.

One computer system in accord with the aspects and embodiments disclosed herein is provided by 3Play Media of Cambridge, Mass. This system provides an audio description platform that is optimized to enable users to create high-quality audio description. In some embodiments, the system accepts media files uploaded over the internet by customers who wish to have audio descriptions produced. These original media files may include original audio and video content encoded as original audio data and video data. In some embodiments, the system identifies portions of audio data within the media files that are suitable to overlay with audio description. For example, these identified portions may include original audio data that is silent or is otherwise unimportant when rendered and, therefore, is suitable for concurrent audible rendering with audio description data. For ease of description, these identified portions of original audio data are referred to herein as "gaps," although the identified portions may include original audio data that is audible when rendered. The system may identify gaps with reference to a transcript of the media file and/or by analyzing the audio data and/or video data stored in the media file.

In some embodiments, the system provides a user interface that visually and audibly renders the media file, presents a visual representation of at least a portion of the transcript of the media file, and presents representations of any gaps identified within the original audio data. The representations of the gaps are located within the context of the representation of the transcript. The representation of the transcript includes multiple areas that, for ease of description, are referred to herein as "cells." Cells are associated with points within an index, such as a time index, that organizes the transcript and synchronizes the transcript with the media file. In some embodiments, the user interface responds to user input selecting a cell by targeting its associated point within the index for association with audio description data. In these embodiments, the user interface further responds to the user input by providing the user with a data entry control to accept input specifying the audio description data. This input may be haptic (e.g., communicated via a keyboard or touch screen) or verbal (e.g., communicated via spoken word) and may be recorded as audio description text or as actual audio description data (e.g., where the user wishes for the audio description data to be rendered in her voice). Combining these user interface features in the manner described herein reduces the time required to generate audio descriptions vis-à-vis conventional approaches.

In at least one embodiment, a computer system configured to generate an audio description of a media file is provided. The system includes a display, a memory, and at least one processor coupled to the display and the memory. The memory stores a media file, including video data that is accessible via a time index and audio data synchronized with the video data by the time index. The memory also stores a transcript of the audio data, including transcription data synchronized with the video data via the time index. The at least one processor is configured to render, via the display, one or more images from portions of the video data; render, via the display, text from portions of the transcription data in synchrony with the one or more images; receive input identifying at least one point within the time index; receive input specifying audio description data to associate with the at least one point; store, in the memory, the audio description data; and store, in the memory, an association between the audio description data and the at least one point.

In the system, the audio description data may have at least one renderable duration and the at least one processor may be further configured to extend the media file, at one or more locations accessible via the at least one point, by the at least one renderable duration.

In the system, the at least one processor may be further configured to generate a new media file that may include the audio description data synchronized with the video data according to the time index. The new media file may include the video data, the audio data, and the audio description data. In the system, the at least one processor may be further configured to adjust a volume of at least one portion of the audio data, thereby generating adjusted audio data; and generate a new media file that includes the adjusted audio data. In the system, the at least one processor may be configured to receive input identifying the at least one point via selection of an area within the text.

The system may further include a microphone or a keyboard coupled to the at least one processor, and the at least one processor may be configured to receive input specifying the audio description data via the microphone or the keyboard.

In the system, the at least one processor may be further configured to render additional text from additional portions of the transcription data adjacent to the portions of the transcription data. The at least one processor may be further configured to identify a plurality of points within the time index that identify a plurality of portions of the audio data that each have one or more attributes that meet one or more predefined criteria; and display a plurality of indications representing the plurality of points within the text and the additional text. The at least one processor may be further configured to identify the plurality of points at least in part by accessing one or more of the transcription data and the audio data. The one or more attributes may include a duration, a volume, or a volume over a range of frequencies. The one or more predefined criteria may specify that the duration be at least a predefined threshold value, the volume not exceed a predefined threshold value, or the volume over the range of frequencies not transgress one or more predefined threshold values.

In the system, the at least one processor may be further configured to calculate a describability rating for the media file. The at least one processor may be further configured to render, via the display, the describability rating. The at least one processor may be further configured to setup an audio description job associated with the media file; compare the describability rating to a predefined threshold value; configure the audio description job as a standard job where the describability rating transgresses the predefined threshold value; and configure the audio description job as an extended job where the describability rating does not transgress the predefined threshold value. The at least one processor may be further configured to determine a pay rate for the audio description job that is based at least in part on the describability rating. The describability rating may include at least one of a ratio and a target frequency, the ratio being a sum of durations of a plurality of portions of the audio data that each have one or more attributes that meet one or more predefined criteria divided by a duration of the media file, the target frequency being a count of the plurality of portions per unit of time. The unit of time may be 1 minute.

According to another embodiment, a method to generate an audio description of a media file using a computer system is provided. The method includes acts of storing, by the computer system, a media file including video data accessible via a time index and audio data synchronized with the video data via the time index; storing a transcript of the audio data including transcription data synchronized with the video data via the time index; rendering one or more images from portions of the video data; rendering text from portions of the transcription data in synchrony with the one or more images; receiving input identifying at least one point within the time index; receiving input specifying audio description data to associate with the at least one point; storing the audio description data; and storing an association between the audio description data and the at least one point.

In the method, the audio description may have at least one renderable duration, and the method may further include an act of extending the media file, at one or more locations accessible via the at least one point, by the at least one renderable duration. The method may further include generating a new media file that includes the audio description data synchronized with the video data according to the time index. The method may further include generating a new media file that includes the video data, the audio data, and the audio description data. The method may further include generating adjusted audio data by adjusting a volume of the audio data to fit within an envelope; and generating a new media file that includes the adjusted audio data.

The method may further include rendering additional text from additional portions of the transcription data adjacent to the portions of the transcription data. The method may further include identifying a plurality of points within the time index that identify a plurality of portions of the audio data that each have one or more attributes that meet one or more predefined criteria; and displaying a plurality of indications representing the plurality of points within the text and the additional text. The method may further include calculating a describability rating for the media file; setting up an audio description job associated with the media file; comparing the describability rating to a predefined threshold value; configuring the audio description job as a standard job where the describability rating transgresses the predefined threshold value; configuring the audio description job as an extended job where the describability rating does not transgress the predefined threshold value; and determining a pay rate for the audio description job that is based at least in part on the describability rating. Other embodiments of the method may include any combination of the acts disclosed herein.

According to another embodiment, a non-transitory computer readable medium is provided. The computer readable medium stores computer-executable sequences of instructions to generate an audio description of a media file via a computer system. The sequences of instructions include instructions to store, in a memory, a media file including video data accessible via a time index and audio data synchronized with the video data via the time index; store, in the memory, a transcript of the audio data including transcription data synchronized with the video data via the time index; render, via a display, one or more images from portions of the video data; render, via the display, text from portions of the transcription data in synchrony with the one or more images; receive input identify at least one point within the time index; receive input specifying audio description data to associate with the at least one point; store, in the memory, the audio description data; and store, in the memory, an association between the audio description data and the at least one point.

The audio description data may include at least one renderable duration. The sequences of instructions may further include instructions to extend the media file, at one or more locations accessible via the at least one point, by the at least one renderable duration. The instructions may further include instructions to render additional text from additional portions of the transcription data adjacent to the portions of the transcription data. Other embodiments of the computer readable medium may store sequences of instructions to execute any combination of the computer-executable acts disclosed herein.

According to another embodiment, a transcription system configured to generate audio description snippets and a snippet manifest from a source media file is provided. The system includes a time-coded transcript of the source media file and a synthesized audio video interface. The synthesized audio video interface is configured to display the source media file; display the time-coded transcript; receive input identifying a selected time location within the source media file; receive input specifying audio description text to associate with the selected time location, the audio description text having at least one text characteristic; generate an estimated duration of the audio description text using at least one of the at least one text characteristics; display the estimated duration of the audio description text; generate an audio snippet from the audio description text; store the audio snippet as a file; and store, in the snippet manifest, the audio snippet, the audio description text, the selected time location in the source media file, and a duration of the snippet.

Still other aspects, embodiments and advantages thereof are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment. In addition, in the event of inconsistent usages of terms between this document and documents incorporated herein by reference, the term usage in the incorporated references is supplementary to that of this document; for irreconcilable inconsistencies, the term usage in this document controls.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure.

FIG. 9 is an illustration of an example upload screen according to at least one embodiment described herein.

DETAILED DESCRIPTION

Figure 1:
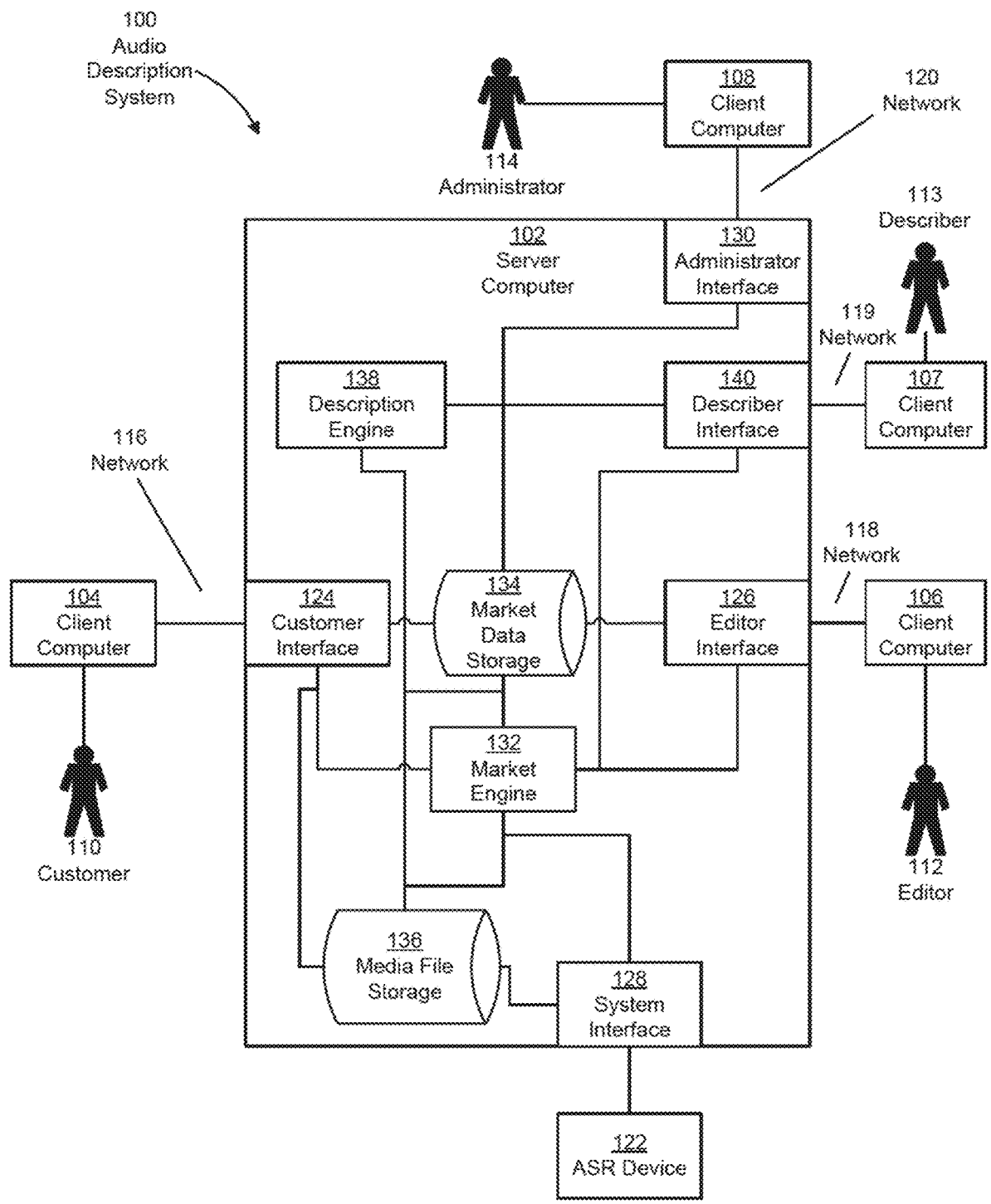
FIG. 1 is a context diagram including one example of an audio description system according to at least one embodiment described herein.

At least one embodiment disclosed herein includes apparatus and processes for implementing, using a computer system, an audio description system. In some embodiments, the audio description system receives requests (e.g., electronic messages) to perform audio descriptions from computers operated by customers. These audio description requests may identify and/or include media files with encoded video content that the customers seek to have audibly described during playback. The audio description requests may also include a transcript of the media file and/or a request to transcribe the media file.

In some embodiments, the audio description system includes components of, or is interfaced to and interoperates with, a job market as implemented by the transcription system 100 described in the Electronic Job market patent. In these embodiments, the audio description system initiates execution of components of the job market to manage the creation of a transcript of the media file, where a transcription request was included in the audio description request and/or where no transcript was provided as part of the audio description request. Available transcripts may be used with the associated media files as inputs to audio description processes. For instance, a transcript may be used by the audio description system to identify portions of the media file suitable for overlay with audio description and/or to determine the overall suitability of the media file for audio description.

Further, in some embodiments, the audio description system utilizes components of the Electronic Job market patent to manage creation of the audio description. For instance, in some embodiments, the audio description system creates and posts audio description jobs associated with the media files. These audio description jobs may be completed by audio description professionals (referred to herein as "describers") who access the audio description system via a user interface, such as the user interface described further below. In some embodiments, these features and other features of the audio description system described herein are implemented via execution of a description engine and/or a describer interface, as described further below.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Description System

Various embodiments implement an audio description system configured to support audio description of a media file using one or more computer systems. FIG. 1 illustrates one of these embodiments, an audio description system 100. As shown, FIG. 1 includes a server computer 102; client computers 104, 106, 107, and 108; a customer 110; an editor 112; a describer 113; an administrator 114; networks 116, 118, 119, and 120; and an automatic speech recognition (ASR) device 122. The server computer 102 includes several components: a customer interface 124, an editor interface 126, a system interface 128, an administrator interface 130, a market engine 132, a market data storage 134, a media file storage 136, a description engine 138, and a describer interface 140.

As shown in FIG. 1, the system interface 128 exchanges (i.e. sends or receives) media file information with the ASR device 122. The customer interface 124 exchanges information with the client computer 104 via the network 116. The editor interface 126 exchanges information with the client computer 106 via the network 118. The describer interface 140 exchanges information with the client computer 107 via the network 119. The networks 116, 118, 119, and 120 may include any communication network through which computer systems may exchange information. For example, the network 116, the network 118, the network 119, and the network 120 may be a public network, such as the internet, and may include other public or private networks such as LANs, WANs, extranets, and intranets.

Information within the description system 100, including data within the market data storage 134 and the media file storage 136, may be stored in any logical construction capable of holding information on a computer readable medium including, among other structures, file systems, flat files, indexed files, hierarchical databases, relational databases or object-oriented databases. The data may be modeled using unique and foreign key relationships and indexes. The unique and foreign key relationships and indexes may be established between the various fields and tables to ensure both data integrity and data interchange performance. In one embodiment, the media file storage 136 includes a file system configured to store media files and other transcription system data and acts as a file server for other components of the transcription system. In another embodiment, the media file storage 136 includes identifiers for files stored on another computer system configured to serve files to the components of the transcription system.

Information may flow between the components illustrated in FIG. 1, or any of the elements, components and subsystems disclosed herein, using a variety of techniques. Such techniques include, for example, passing the information over a network using standard protocols, such as TCP/IP or HTTP, passing the information between modules in memory and passing the information by writing to a file, database, data store, or some other non-volatile data storage device. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Figure 8:
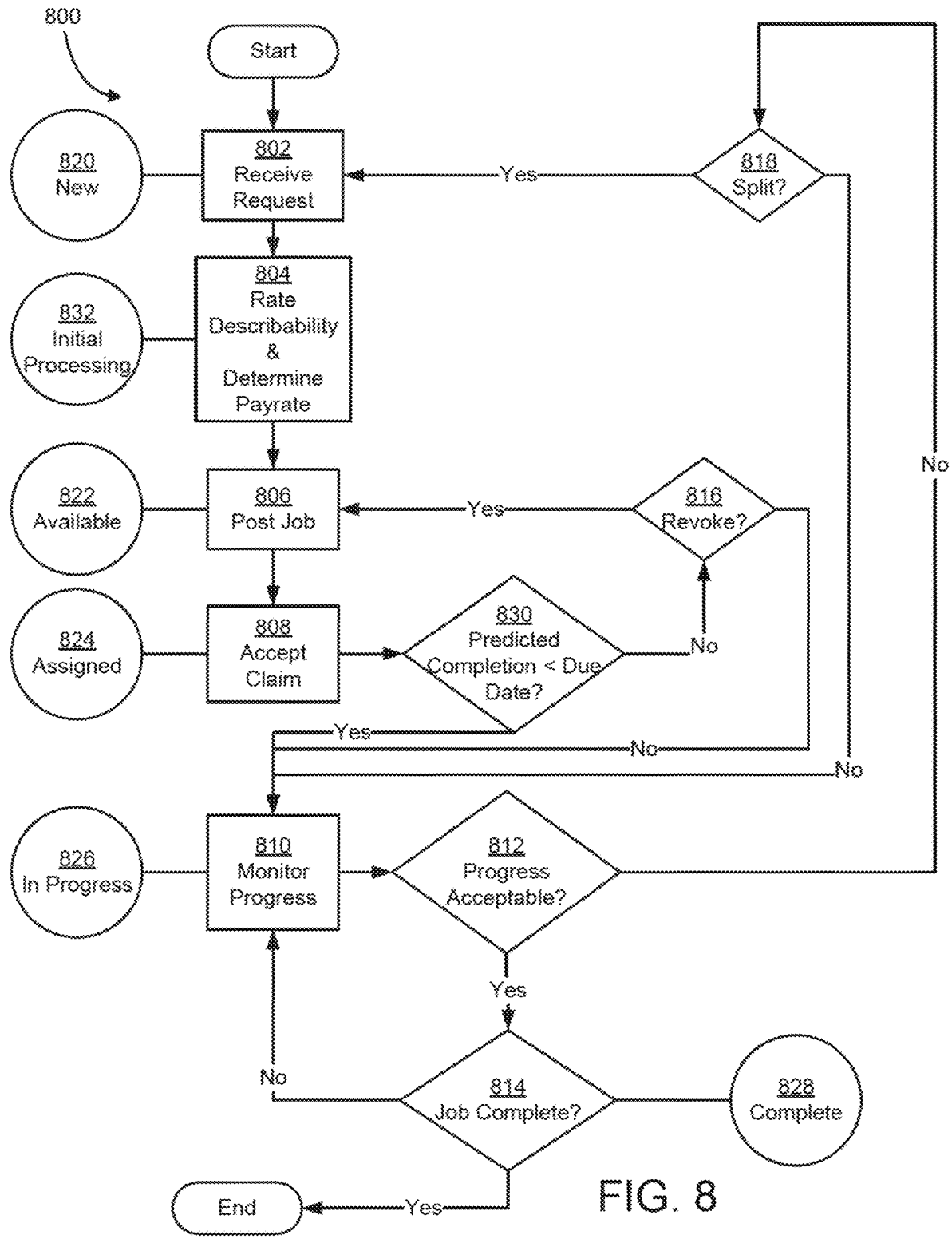
FIG. 8 is a flow diagram illustrating a process of executing a job according to at least one embodiment described herein.

One goal of the audio description system 100 is to receive media files from customers and to provide final audio descriptions of the content included in the media files to the customers. One mechanism used by the audio description system 100 to achieve this goal is an audio description job. Within the audio description system 100, audio description jobs are associated with media files and are capable of assuming several states during processing. FIG. 8 illustrates an example process 800 during the execution of which an audio description job assumes several different states.

As shown in FIG. 8, the process 800 begins in act 802 with the audio description system 100 receiving an audio description request. The audio description request identifies a media file to describe and, in some examples, a transcript of the media file. In some embodiments, the description system 100 receives the audio description request and the media file via an upload from a customer interface, such as the customer interface 124, or as a result of a previously received media file being split, per act 818 below. The upload from a customer interface may also include a transcription file storing transcription data representing the transcript. This transcription file may be a time-coded or not time-coded. Time-coded transcription files identify the time locations for words and other important sounds throughout the media file. In other embodiments, the upload may include a transcription request as an addition to, or alternative of, a transcription file.

Upon receipt of the audio description request and the media file, the audio description system 100 creates an audio description job, associates the audio description job with the media file, and sets the audio description job to a new state 820. In act 804, the audio description system 100 sets the audio description job to an initial processing state 832. Further, in the act 804, the audio description system 100 calculates a describability rating (e.g., by executing the description engine 138) and determines a pay rate for the audio description job (e.g., by executing the market engine 132). In some embodiments, where a time-coded transcription is available to the audio description system 100 (e.g., via the audio description request received in the act 802), the audio description system 100 determines the describability rating and the pay rate using the available time-coded transcription. Where a time-coded transcription is not available to the audio description system 100, the audio description system 100 creates a transcription job, associates the transcription job with the media file, and executes a transcription generation process, such as the process 800 described in the Electronic Job market patent, to generate a transcription file. This transcription file may be an ASR transcription, a professionally edited transcription, or a quality assured transcription, as discussed in the in the Electronic Job market patent, depending on the type of transcription identified in the transcription request included in the audio description request.

In some embodiments, after the describability rating and pay rate for the audio description job have been determined in the act 804, the audio description system 100 presents the describability rating and the service price to the customer via the customer interface. In these embodiments, the customer may then accept or abort the audio description job.

Figure 14:
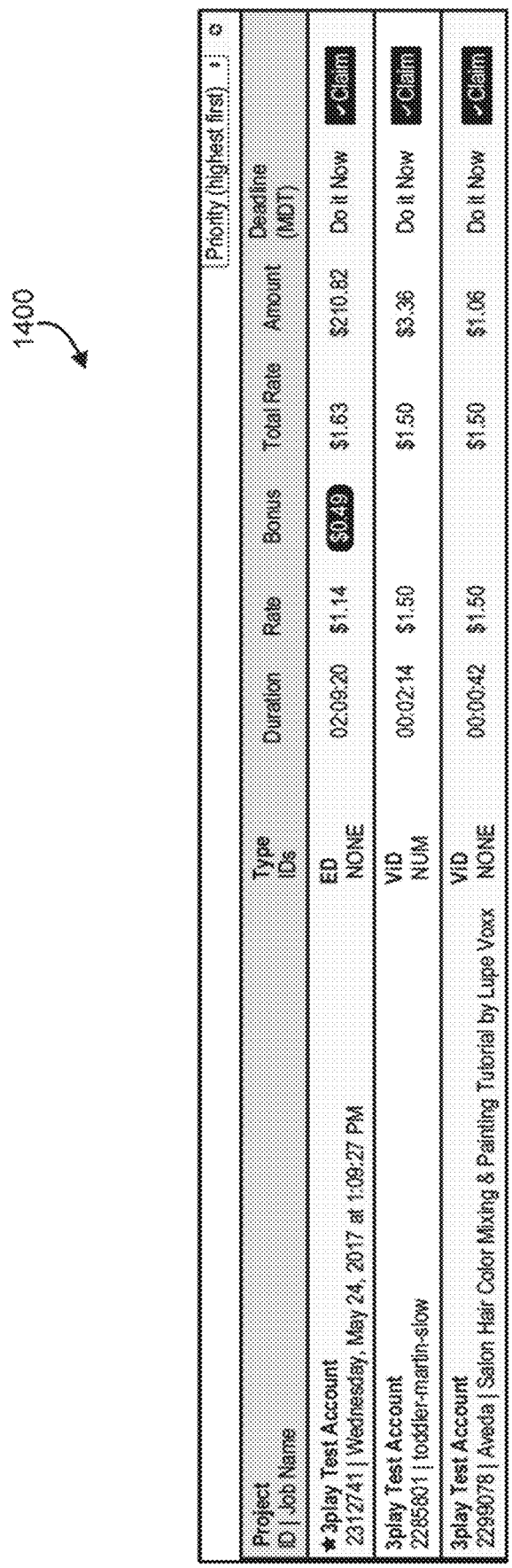
FIG. 14 is an illustration of an example job screen according to at least one embodiment described herein.

In act 806, the audio description system 100 posts the audio description job, making the audio description job available for describers to claim, and sets the audio description job to an available state 822. FIG. 14 illustrates an available job screen 1400 presented by a user interface of the audio description system 100 to a user who is configured for access to both transcription (ED) and audio description (ViD) jobs. In posting the audio description job, the audio description system 100 may set the type of audio description job to standard or extended. Standard audio description does not modify the original audio or video data stored in the media file. Extended audio description modifies the original audio and/or video data in ways that are described in detail below.

In some embodiments in accord with FIG. 8, the audio description system 100 next monitors the due dates and times of available audio description jobs and, if necessary, alters the pay rate (or other job characteristics) of the available audio description jobs to ensure the available audio description jobs are completed by the due date and time.

In act 808, the audio description system 100 accepts an offer by a describer to claim the audio description job and sets the audio description job to an assigned state 824. In the illustrated embodiment, audio description jobs in the assigned state 824 are not available for claiming by other describers. In act 830, the audio description system 100 determines whether the predicted completion date and time for the audio description job, as assigned, occurs before the due date and time. If so, the audio description system 100 executes act 810. Otherwise the audio description system 100 executes act 816.

In the act 816, the audio description system 100 determines whether to revoke the audio description job. If the audio description system 100 determines to revoke the audio description job, the audio description system executes the act 806. Otherwise, the audio description system 100 executes the act 810.

In the act 810, the audio description system 100 records and monitors actual progress in describing the media file associated with the audio description job, as the progress is being made by describers. Also in the act 810, the audio description system 100 sets the audio description job to an in progress state 826. In the act 812, the audio description system 100 determines whether the audio description job is progressing according to schedule. If so, the audio description system executes act 814. Otherwise, the audio description system executes act 818.

In the act 818, the audio description system 100 determines whether to split the media file associated with the audio description job into multiple media files. For example, the audio description system 100 may split the media file into one segment for any work already completed and into another segment for work yet to be completed. This split may enable the audio description system 100 to further improve the quality on a segment by segment basis. For example, a segment which has been described may be split from other segments so that the described segment may proceed to quality assurance (QA). Thus, splitting the media file may enable the audio description system 100 to provide partial but progressive delivery of one or more description products to customers. If the audio description system 100 splits the media file, the audio description system 100 stores the described, completed segment and executes the act 802 for any segments that include content not completely described. If, in the act 818, the audio description system 100 determines to not split the media file, the audio description system 100 executes the act 810.

In the act 814, the audio description system 100 determines whether the content of the media file associated with the audio description job is completely described. If so, the audio description system 100 stores the audio description data and sets the state of the audio description job to a complete state 828, and the process 800 ends. Otherwise, the audio description system 100 executes the act 810.

It is appreciated that the QA and Auditing workflow described in the Electronic Transcription Job Market application may also be applied to audio description. For instance, in some embodiments, completed audio descriptions may be the subject of other jobs, such as QA jobs, as described further below. For example, customers may order audio description services that includes a QA pass, or describers may "flag" descriptions for review by QA-ers prior to completing a job, and these (and other) mechanisms may be used by the audio description system 100 to indicate that additional quality assurance audio description jobs be created and placed on the job market, accessible to individuals with the appropriate job access permissions. Changes made during these QA jobs may be processed by the audio description system to be presented to the original describers as feedback, e.g., as described herein with reference to changes made in the customer interface. Similarly, Auditing jobs may be created, and the auditors (i.e., individual with permissions to access these jobs) may provide feedback to the original describers through an auditing interface. Components included within various embodiments of the audio description system 100, and acts performed as part of the process 800 by these components, are described further below.

Returning to FIG. 1, according to various embodiments, the market engine 132 is configured to both add jobs to the job market provided by the description system 100 and to maintain the efficiency of the job market once the market is operational. To achieve these goals, in some embodiments, the market engine 132 exchanges market information with the customer interface 124, the administrator interface 130, the editor interface 126, the describer interface 140, the system interface 128, the market data storage 134, the media file storage 136, and the description engine 138. Market information may include any information used to maintain the job market or stored within the market data storage 134. Specific examples of market information include media file information, job information, customer information, editor information, describer information, administrator information and audio description request information. Each of these types of information is described further below with reference to FIG. 2.

In some embodiments, the market engine 132 is configured to identify unprocessed media files stored in the media file storage 136. In some of these embodiments, the market engine 132 identifies unprocessed media files after receiving an indication of the storage of one or more unprocessed media files from another component, such as the customer interface 124, which is described further below. In others of these embodiments, the market engine 132 identifies unprocessed media files by periodically executing a query, or some other identification process, that identifies new, unprocessed media files by referencing information stored in the market data storage 134 or the media file storage 136. In some embodiments, the market engine 132 is also configured to send a request for ASR processing of unprocessed media files to the system interface 128. This request may include information specifying that only a limited portion of the unprocessed media file (e.g., a specified time period) be processed. Further, in at least one embodiment, the market engine 132 tracks completion percentage of the draft transcription during subsequent ASR processing. The market engine 132 may store, in the market data storage 134, the completion percentage associated with partial transcriptions stored in the media file storage 136.

In these embodiments, the system interface 128 is configured to receive requests for ASR processing, and, in response to these requests, provide the unprocessed media files to the ASR device 122, along with any requested limits on the ASR processing. The ASR device 122 is configured to receive a media file, to perform transcoding and automatic speech recognition on the received media file in accord with the request and to respond with draft transcription information that includes a draft (synchronized or non-synchronized) transcription of the content of the received media file and a predicted cost of editing the draft transcription. This predicted cost, referred to herein as the ASR_cost is based on information computed as part of the ASR processing and a cost model. The cost model may be a general model or may be associated with the project, customer or editor associated with the media file. A project is a set of media files grouped by a customer according to domain, due date and time or other media file attribute. Projects are described further below. Cost models predict the cost of editing and/or describing a draft transcription and are described further with reference to FIG. 2 below. The system interface 128 is further configured to receive the draft transcription information, store the draft transcription information in the media file storage 136, store the location of the draft transcription information in the market data storage 134, and notify the market engine 132 of the availability of the draft transcription information.

In one example illustrated by FIG. 1, the market engine 132 receives an identifier of a newly stored media file from the customer interface 124. Responsive to receipt of this identifier, the market engine 132 provides a request to perform ASR processing on the media file to the system interface 128. The system interface 128, in turn, retrieves the media file from the media file storage 136 and provides the media file, along with a set of parameters that indicate appropriate language, acoustic, cost and formatting models, to the ASR device 122. The ASR device 122 responds with draft transcription information that includes a synchronized draft transcription, lattices, search statistics, ASR_cost and other associated data. The system interface 128 receives the draft transcription information, stores the draft transcription information in the media file storage 136, stores the location of the draft transcription information in the market data storage 134 and notifies the market engine 132 of the availability of the draft transcription information.

In other embodiments, the market engine 132 is configured to perform a variety of processes in response to receiving a notification that draft transcription information is available. For instance, in one example, the market engine 132 employs natural language processing techniques to determine the type of content or domain included in the media file associated with the draft transcription information and stores this information in the market data storage 134. In another example, the market engine 132 determines the duration of the content included in the media file and stores the duration in the market data storage 134.

In another example, after receiving a notification that draft transcription information is available, the market engine 132 determines an initial pay rate for editing the draft transcription included in the draft transcription information and stores job information associated with editing the draft transcription in the market data storage 134. In this example, the initial pay rate included in the job information is determined using the due date and time, difficulty, duration, domain and ASR_cost of the media file associated with the draft transcription information. In other examples, other combinations of these factors may be used, or these factors may be weighted differently from one another. For instance, in one example, due date and time and duration may be replaced with times-real-time. In another example, the weight applied to any particular factor may be 0.

In another embodiment, after receiving a notification that draft transcription information is available, the market engine 132 transmits a request to the description engine 138 to calculate and return a describability rating for the draft transcription information. The description engine 138, and the processes that it executes to calculate the describability rating, are detailed further below. In this embodiment, the market engine 132 determines an initial pay rate for describing the draft transcription included in the draft transcription information and stores job information associated with description of the draft transcription in the market data storage 134. In this example, the initial pay rate included in the job information is determined using the due date and time, difficulty, duration, domain and describability rating of the media file associated with the draft transcription information. In other examples, other combinations of these factors may be used, or these factors may be weighted differently from one another. For instance, in one example, due date and time and duration may be replaced with times-real-time. In another example, the weight applied to any particular factor may be 0.

In another embodiment, the market engine 132 is configured to calculate a pay rate for an audio description job using a combination of the pay rate calculated for a transcription job targeting the media file and the describability rating of the media file. For instance, the following ratios may be used.

AVERAGE_TRANSRIPTION_PAYRATE=0.80

AVERAGE_DESCRIPTION_PAYRATE=0.40

Description_pay_rate_for_job=(transcription_pay_
rate_for_job/AVERAGE_TRANSCRIPTION_
PAY_RATE)*describability_rating_as_
fraction*AVERAGE_DESCRIPTION_PAY_RATE In other embodiments, the market engine 132 is configured to periodically publish, or "push," notifications to editors and describers that indicate the availability of new jobs. In one of these embodiments, the market engine 132 tailors these notifications by sending them only to particular editors, describers, or groups thereof, such as those editors and describers who have permission to claim the jobs. In other embodiments, the market engine 132 tailors notifications based on other job characteristics, such as the type of job (editing, describing, QA, etc), difficulty, domain or due date and time. In some examples, the market engine 132 sends notifications to editors or describers based on their ability to complete jobs having the attribute to which that the notification is tailored. Continuing the previous examples, the market engine 132 may send notifications to editors or describers who may assume particular roles (editor, describer, QA, etc.), who have a track record of handling difficult jobs, who are well versed in a particular domain, or who are highly efficient.

In at least one embodiment, the market engine 132 notifies describers and editors of near-term future job availability based on the upstream workflow. In this embodiment, as files are uploaded by customers and processed by the ASR device, the market engine 132 predicts how many more jobs will be available and based on one or more the attributes of these jobs, such as duration, domain, etc., the market engine 132 sends out advanced notice to one or more editors via the editor interface 126 and to one or more describers via the describer interface 140.

In other embodiments, the market engine 132 is configured to determine the difficulty of successfully editing the draft transcription and to store the difficulty in the market data storage 134. In these embodiments, the market engine 132 may base this determination on a variety of factors. For example, in one embodiment, the market engine 132 calculates the difficulty using an equation that includes weighted variables for one or more of the following factors: the content type (domain) of the media file, the historical difficulty of media files from the customer (or the project), the draft transcription information, and acoustic factors (such as noise-level, signal-to-noise-ratio, bandwidth, and distortion).

In some embodiments, the market engine 132 is configured to create and post jobs corresponding to unedited or undescribed media files, thereby making the jobs available to the editors or describers for claiming and completion. According to one example, as part of this processing, the market engine 132 stores an association between each job and a media file targeted for work by the job. This action is performed so that factors affecting pay rate, such as those described above, can be located in a media file table.

As described further below with reference to the editor interface 126 and the describer interface 140, editors and describers claim jobs by indicating their preferences on a user interface provided by the editor interface 126 or the describer interface 140. After a job is claimed, the job is removed from the market, so that no other editors or describers can access the job. However, until the editor or describer has actually begun to work the job, it is relatively easy for the job to be put back on the market. Typically, leaving the original claim in place is preferred. However, in some embodiments, the market engine 132 is configured to determine whether the editor or describer who claimed the job will be able to complete the job before the due date and time. In these embodiments, the market engine 132 is configured to make this determination based on the job characteristics (difficulty, domain, duration, etc.) and the editor's or the describer's historical proficiency as stored in the market data storage 134. For example, the editor or describer may be associated with a times-real-time statistic stored in the market data storage 134. The times-real-time statistic measures editor or describer productivity and is calculated by dividing the time it takes for the editor or describer to complete each job by the duration of the media file associated with each job. In some embodiments, the market engine 132 is configured to use this statistic to estimate the completion time of the job (based on duration multiplied by times-real-time). In some embodiments, the market engine 132 is configured to condition this statistic based on job attributes, and thus compute the statistic from similar jobs performed by the editor or the describer in the past. The set of historical jobs used to compute the times-real-time statistic may include all jobs performed by the editor or the describer, a subset of jobs which have similar attributes to the present job, or other combinations of historical jobs, including those that were not performed by the editor or the describer. The market engine 132 may calculate this statistic as a mean, a median, a duration-weighted mean, or using summaries of historical processing times for the editor, describer, other editors or other describers for different media file subsets.

In other embodiments, if the market engine 132 determines that an editor or describer may be unlikely to complete a job before the due date and time, the market engine 132 may reverse the assignment and put the job back on the market, thus allowing some number of other editors or describers to claim the job. In some these embodiments, the market engine 132 determines the likelihood that the editor or describer will complete the job before its due date and time using one or more of the following factors: historical productivity of the editor or describer (in general or, more specifically, when editing or describing media files having a characteristic in common with the media file associated with the job); the number of jobs currently claimed by the editor or describer; the number of jobs the editor or describer has in progress; and the due dates and times of the jobs claimed by the editor or the describer. When the market engine 132 reverses an assignment, the original editor or describer is informed of this condition via the editor interface 126 or the describer interface 140. The market engine 132 may or may not allow the original editor or describer to reclaim the job from the market, depending on whether data indicates interest of other editors or describers in the job. One example of an indicator of interest is whether the job is being previewed by any other editors or describers. Another factor which may influence this decision is if the total volume of unedited or undescribed draft transcriptions exceeds a threshold.

In some embodiments, the market engine 132 determines a likelihood of completion for each possible combination of editor or describer and job. In these embodiments, the market engine 132 may calculate this likelihood using any combination of the factors discussed above (historical productivity, number of jobs claimed, number of jobs in progress, due dates and times of claimed jobs, etc.). Further, in some embodiments, the market engine 132 prevents editors or describers from claiming jobs for which the editor's or describer's likelihood of completion metric transgresses a threshold. In these embodiments, the threshold is a configurable parameter. Further, according to these embodiments, the market engine 132 may prevent an editor or describer from claiming a job in a variety of ways including rejecting an offer from the editor or describer to claim the job and causing the job to not be display to the editor or describer within the editor interface 126 or the describer interface 140 via, for example, a meta rule. Meta rules are discussed further below.

In other embodiments, if the market engine 132 determines that an editor or describer may be unlikely to complete a job before the due date and time, the market engine 132 sends a notification to the editor or describer who claimed the job via the editor interface 126 or the describer interface 140. The notification may include a variety of information, such as a notification that the job may be revoked shortly or including a link to allow the editor or describer to voluntarily release the job.

In several embodiments, the market engine 132 is configured to give permission to many editors or describers to edit or describe the same draft transcription and to offer all editors or describers the same pay rate to do so. In some alternative embodiments, however, the market engine 132 is configured to determine if, based on historical information, some editors or describers display an increased proficiency with particular types of media files (for example in certain domains) and to increase the pay rate for these editors or describers when transcribing media files having the particular type. In addition, some embodiments of the market engine 132 are configured to adjust the pay rate based on overall editor or describer experience levels, as well as the historical productivity of the editors or describers, both in general and on the type of media file for which the rate is being set.

In general, the market engine 132 sets the pay rate based on the aforementioned factors, such as job difficulty, required times-real-time, ASR_cost, and describability rating. However, to maintain an efficient market in some embodiments, the market engine 132 is configured to determine when market conditions suggest intervening actions and to, in some cases, automatically take those intervening actions. For example, when the market is saturated with non-difficult jobs, an abnormally large amount of unassigned, difficult jobs may develop. According to this example, to correct the inefficiency in the market, the market engine 132 intervenes by increasing the pay rate of difficult jobs or decreasing the pay rate of low difficulty jobs. In still another example, the market engine 132 intervenes to increase the pay rate of a job where the proximity of the current date and time and due date and time for the media file associated with the job transgresses a threshold.

In some embodiments, the market engine 132 is configured to use the preview functionality as an indicator of job difficulty and appropriate pay rate. For instance, in one example, the market engine 132 detects that the number of editors or describers who have previewed a job and not claimed it has exceeded a threshold. Alternatively, in another example, the market engine 132 detects that the total preview duration of an unclaimed job has transgressed a threshold. These phenomena may indicate that the job is more difficult than is reflected by the current pay rate. The market engine 132 may then intervene to increase the pay rate to improve the chance that the job will be claimed or to split the media file into segments.

Additionally, in some embodiments, the market engine 132 monitors the status of, and information associated with, all jobs available on the market. This information includes difficulty, pay rate, due date and time, domain and summary information such as the number of editors or describers with permission to edit or describe a draft transcription, the amount of time a job has been on the market, the number of previews of the media file associated with a job, and other data concerning the market status of the job and its associated media file. In some embodiments, the market engine 132 is configured to use this information to ensure that problem jobs are claimed. For example, the market engine 132 may increase the pay rate, may enable a larger number of editors or describers to access to the file, or may cut the file into shorter segments—thus producing several less difficult editing or describing jobs for the same media file.

In other embodiments, the market engine 132 is configured to, under certain conditions, hide some of the low difficulty jobs in order to create a more competitive environment or to induce editors or describers to work on difficult jobs. Additionally, in some embodiments, the market engine 132 is configured to encourage the editors or describers to accept less desirable jobs by bundling jobs together with more desirable jobs. For example, the market engine 132 may group a selection of jobs with variable difficulty together so that a single editor or describer would need to claim all of these jobs, instead of claiming only low difficulty jobs. Other characteristics that may determine the desirability of a job, and which may be used to determine the bundling, include customer, project, domain (e.g. interesting content), and historical time waiting on the market for the customer/project.

In some embodiments, the market engine 132 is configured to analyze the overall status of the market prior to modifying job characteristics. For instance, in one example, the market engine 132 monitors the amount of work available in the market, and if the amount transgresses a threshold, increases the pay rate for jobs that are within a threshold value of their due dates and times. In other embodiments, the market engine 132 is configured to analyze the dynamics of the overall market to determine intervening actions to perform. In one example, the market engine 132 measures the rate at which jobs are being accepted and measures the number of jobs or duration of the jobs, and estimates the time at which only the least popular jobs will remain in the market. If the market engine 132 determines that this time is sufficiently ahead of the due date and time for these jobs, then the market engine 132 may wait before increasing the pay rate.

In other embodiments, the market engine 132 is configured to set meta rules to affect the behavior of the market. Meta rules globally modify the behavior of the market by affecting how all or some of the available jobs will appear on the market. For instance, the market engine 132 may set a meta rule that prevents some percentage of the jobs from being available to any editors or describers for a certain time period. The market engine 132 may use this rule during periods when there is a surplus of work, and therefore help to smooth out the flow of files through the system. Or, the market engine 132 may set a meta rule to make files available only to relatively inexperienced editors or describers for a certain time period. The market engine 132 may use this rule where many relatively easy jobs are being processed by the market, so that the market presents a good opportunity to give less experienced editors or describers more work in learning how to efficiently operate the editing or describing platform. Or, the market engine 132 may set a meta rule that automatically send some percentage of jobs to multiple editors or describers for cross-validation. Various embodiments may implement a variety of meta rules, and embodiments are not limited to a particular meta rule or set of meta rules.

In other embodiments, the market engine 132 is configured to implement a rewards program to encourage editors or describers to claim difficult jobs. In one embodiment, the market engine 132 issues rewards points to editors or describers for completing files and bonus points for completing difficult files. In this embodiment, the editor interface 126 and the describer interface 140 are configured to serve a rewards screen via the user interfaces rendered on the client computers 106 and 107. The rewards screens are configured to receive requests to redeem reward and bonus points for goods and services or access to low difficulty media files.

In some embodiments, the market engine 132 is configured to estimate the expected completion time of editing and describing jobs and further refine the market clearing processes discussed above. If the market engine 132 determines that the current progress is not sufficient to complete the file on time, the editor or describer may be notified of this fact via the editor interface 126 or the describer interface 140, and, should the condition persist, the market engine 132 is configured to make the job available to other editors or describers (i.e. to put the jobs back on the market). In some circumstances, the market engine 132 may revoke the entire job from the original editor or describer. In this case, the job is put back on the market as if no work had been done. In other cases, the market engine 132 may dynamically split the job at the point where the original editor or describer has completed editing or describing, creating one or more new jobs that are comprised of the remaining file content. The market engine 132 puts these one or more new jobs on the market, and the original editor or describer is paid only for the completed work.

In other embodiments, the market engine 132 is configured to perform a variety of processes after receiving an indication that a job has been completed. For example, if a newly completed draft transcription information was split into segments, then the market engine 132 concatenates completed segments together into a completed transcript.

In other embodiments, the market engine 132 is configured to, prior to making the completed transcript or audio description available to the customer, create and post a new job to validate the completed transcription, audio description or the completed segments thereof. For example, in one embodiment, the market engine 132 creates and posts a QA job on the same market as the editing or describing jobs. This QA job may target completed transcriptions, audio descriptions, or a completed segment thereof. A subset of editors or describers may be qualified for the QA role, and the profiles of this subset may include a QA attribute. These editors or describers would then be permitted to view, preview, and claim the QA jobs in the market via the editor interface 126 or the describer interface 140. However, in some examples, the editor or describer of the original transcript would not have permission to QA their own job, even if the editor or describer in general is qualified to perform in a QA role. The profiles of some editors or describers may include a QA attribute, but lack an editor or describer attribute. These editors and describers would only be permitted to view, preview, and claim QA jobs.

As the QA jobs normally require much less work than the original editing or describing job, in some embodiments, the market engine 132 is configured to set the pay rate for the QA jobs at a lower level. However, in other embodiments, the market engine 132 is configured to monitor and adjust the pay rate for the QA jobs as for the editing and describing jobs, with similar factors determining the pay rate, including file difficulty, the ASR_cost, describability rating, the proximity of the due date and time, and the media file duration. Additionally, in some embodiments, the market engine 132 is configured to use QA-specific factors to determine the pay rate for QA jobs. For example, in one embodiment, the market engine 132 adjusts the pay rate based on the number of flags in the edited transcript or audio description, the historical proficiency of the original editor or describer, the times-real-time it took to produce the completed transcription or audio description, and the ASR distance metric or describability rating for the media file. Flags are set during the editing or describing process and indicate problem content within the edited transcript or audio description. For example, flags may indicate content that is unclear or that requires additional research to ensure accurate spelling or description. In some embodiments, the flags are standardized to facilitate automatic processing by the components of the audio description system.

After this QA processing is complete, in some embodiments, the market engine 132 is configured to make the final synchronized transcription, audio description or segments thereof available to the customer, who may then download the transcription, audio description or segments thereof for his or her own use via the customer interface 124.

In some embodiments, to periodically measure editor or describer proficiency, the market engine 132 is configured to allow a media file to be edited or described by multiple editors or describers. For instance, in one example, the market engine 132 periodically creates several different editing or describing jobs for the same media file, and these jobs are claimed and processed by multiple editors or describers. The market engine 132 tracks the underlying media file and does not assign more than one of these jobs to the same editor or describer. After several editors or describers edit or describe the same file, the market engine 132 executes a ROVER or similar process to determine intra-editor or intra-describer agreement, and thereby assign quality scores to individual editors or describers, the quality score being proportional to the number of words in the editor's final transcript or the describer's audio description, which have high agreement among the other editors or describers. In addition, the market engine 132 may use the ROVER process to produce the final transcript or audio description. In this case, the market engine 132 may assign different weights to different editors or describers based on the editor or describer characteristics (domain or customer expertise, historical transcription proficiency, etc).

In other embodiments, the market engine 132 is configured to build cost models that are used to determine predicted costs for editing or describing draft transcriptions. In some of these embodiments, the market engine 132 is configured to generate cost models based on variety of information including historical productivity information, such as times-real-time statistics, ASR distance information, and describability rating. Further, in these embodiments, the cost models may be specific to particular editors, describers, customers or projects. For instance, in one example, the market engine 132 builds cost models that accept a unique identifier for a media file, the ASR information (synchronized draft transcription, lattices, search statistics, acoustic characteristics) for the media file, describability rating, and an indication of an editor, describer, customer or project associated with the media file and that returns a projected transcription or audio description cost that is conditioned on historical productivity associated with the editor, describer, customer or project. Once these models are built, the market engine 132 stores them in the media file storage 136.

In some embodiments, customers may be given access to the transcripts for final editing or audio description via the customer interface 124. In these embodiments, the market engine 132 uses the customer edits or audio description as the gold-standard reference for computing editor or describer accuracy. In other embodiments, the market engine 132 is configured to use times-real-time, stored in the market data storage at the time of job upload, as a factor in determining editor or describer proficiency. Typically, the market engine 132 also adjusts the editing or describing time (and thus the historical editing or describing productivity for editors or describers) by an objective difficulty, such as the ASR distance or describability rating, because more difficult files will necessarily take longer to edit or describe.

According to various embodiments, the description engine 138 is configured to execute a variety of processes that support audio description within the audio description system 100. When executing according to these configurations, the description engine 138 exchanges information with the describer interface 140, the media file storage 136, and the market data storage 134.

For instance, in some embodiments, the description engine 138 is configured to determine the suitability of media files for audio description. In these embodiments, the description engine 138 determines suitability by determining whether sufficient portions of original audio data may be audibly rendered concurrently with audio description data without preventing the original audio data from being heard by an average human. In other words, in these embodiments, the description engine 138 determines whether there is sufficient time within the original audio track stored within the media file for inserting standard audio description data during rendering of the original media file.

In some embodiments, the processes for determining whether there is sufficient time within the original audio track for standard audio description are conditional on a set of tunable parameters of the description engine 138. These tunable parameters are used by the description engine 138 to identify one or more portions of original audio data with attributes that meet one or more predefined criteria. The tunable parameters may include configurable threshold values related to insertion, into gaps, of individual, distinct instances of audio description data and/or of all audio description data.

Some of the tunable parameters are used by the description engine 138 to identify gaps in the original audio data of the media file. These gaps are portions of original audio data suitable for concurrently and audibly rendered audio description. For instance, in one embodiment, the set of tunable parameters includes a value that specifies a maximum volume for suitable portions of original audio data. Portions of original audio data with a volume that exceeds the maximum volume value are identified as being unsuitable for concurrent rendering with audio description. The maximum volume value may be, for example, an absolute value (e.g., 0 dBm, 30 dBm, etc.) or a relative value calculated based on an average volume level of the entire file (e.g., the average volume level −20 decibels).

In another embodiment, the set of tunable parameters includes a value that specifies a maximum volume within particular frequency bands (e.g., in the 300-3000 KHz region where speech is predominant) for suitable portions of original audio data. Original audio data with frequencies outside of the particular frequency bands may contain background noise, music, or other audio not important for understanding the media file content and which are, therefore, potentially suitable. Portions of original audio data with a volume within the frequency bands that exceeds this maximum frequency band volume value are identified as being unsuitable for concurrent rendering with audio description. The maximum frequency band volume value may be, for example, an absolute value (e.g., 0 dBm, 30 dBm, etc.) or a relative value calculated based on an average volume level of the entire file (e.g., the average volume level −20 decibels).

In another embodiment, the set of tunable parameters includes a confidence value that specifies a minimum confidence required for a classifier to classify a portion of original audio data as including speech. Portions of original audio data for which the classifier returns a confidence above this minimum confidence value are identified as being unsuitable for concurrent rendering with audio description. The minimum confidence value may be, for example, 80%. The classifier may be, for example, an automated sound-event classification system such as described in Robust Sound Event Classification Using Deep Neural Networks (IEEE/ACM Transactions on Audio, Speech, and Language Processing, Vol. 23, No. 3, March 2015), which is hereby incorporated herein by reference in its entirety.

In another embodiment, the set of tunable parameters includes a value that specifies a minimum duration for suitable portions of original audio data. Portions of original audio data that are otherwise suitable, but that have a duration that falls below the minimum duration value are identified as being unsuitable for concurrent rendering with audio description. This minimum duration value may be, for example, 2 seconds.

In another embodiment, the set of tunable parameters includes a Boolean value that indicates whether portions of the original audio data should be identified by processing the original audio data or a time-coded transcript of the original audio data. Where the Boolean value indicates that the original audio data should be processed, the description engine 138 is configured to use one or more values of the one or more tunable parameters described above to identify gaps in the original audio data. But, where the Boolean value indicates that the time-coded transcript should be processed, the description engine 138 is configured to identify gaps where a duration between transcript tokens exceeds the minimum duration value. It is appreciated that the time-code transcript may be an ASR generated transcript, an edited transcript, or a QA completed transcript.

In another embodiment, the set of tunable parameters includes a Boolean value that indicates whether portions of the original video data should be analyzed to identify gaps in the original audio data. Where the Boolean value indicates that the original video data should be analyzed, the description engine 138 is configured to execute a video processing technique (e.g., a text detection process) that identifies whether the video includes visible text. Where text is present, the description engine 138 identifies a gap and, in some embodiments, generates and stores audio description text that matches the text detected in the video data.

Others of the tunable parameters are used by the description engine 138 to make an overall determination as to whether the media file is suitable for standard audio description. For instance, in one embodiment, the set of tunable parameters includes a value that specifies a minimum total number of gaps required for a media file to be identified as suitable for standard audio description. Media files with gaps that sum to less than the minimum number value are identified as unsuitable for audio description. The value of the minimum number of suitable portions may be, for example, 5 distinct portions or 1 distinct portion per minute of audibly rendered original audio data.

In another embodiment, the set of tunable parameters includes a value that specifies a minimum total duration of gaps that is required for a media file to be identified as suitable for standard audio description. Media files with gap duration that sums to less than the minimum total duration are identified as unsuitable for audio description. The value of the minimum total duration may be, for example, 30 seconds or 10 seconds per minute of audibly rendered original audio data.

As described below, the tunable parameters described above (and all other constants, variables, and thresholds described herein) may be configurable either via administrative interface 130 or via the customer interface 124.

In some embodiments, the description engine 138 is configured to abort any standard audio description orders for media files without sufficient time for description. Alternatively or additionally, in some embodiments the description engine 138 is configured to convert standard audio description orders to extended audio description orders. If, for example, this minimum number value is 1, the minimum duration value is 2 seconds, and there are no gaps in the original audio data, the description engine 138 may disallow standard audio description ordering.

In some embodiments, the description engine 138 is configured to receive (e.g., from the describer interface 140) and process requests to identify gaps within original audio data and to respond to these requests with data identifying the location (e.g., within the time index of the media file) and the duration of the gap. This data descriptive of gaps may include other gap characteristics. In processing these requests, the description engine 138 loads tunable parameters, which are described below, and uses their values to identify gaps within the original audio data of a media file.

In some embodiments, the description engine 138 is configured to receive (e.g., from the customer interface 124) and process requests to determine the suitability of media files to audio description and to respond to these requests with data characterizing the suitability of the media file to audio description. This data characterizing the suitability may include Boolean values indicating, for example, whether the media file is suitable to audio description and/or describability ratings indicating degrees of suitability. In processing these requests, the description engine 138 loads the tunable parameters described above and uses their values to determine the suitability of the media file to audio description.

For instance, in some embodiments, the description engine 138 is configured to calculate a metric indicative of the suitability of a media file for audio description. For instance, in one embodiment, the description engine 138 is configured to calculate a "describability rating" using a time-coded transcript and the values of the set of tunable parameters described above. For example, the describability rating may be constructed by calculating a ratio of the duration of the suitable portions of original audio data (conditioned based on the values of the tunable parameters) to the duration of the original audio data. Alternatively or additionally, the describability rating may be constructed using a frequency measurement, such as the number of describable regions per minute, and comparing that to a target frequency (e.g., 2 descriptions per minute). When the description engine 138 is configured in this manner, if a 10 minute-long video has 5 minutes with at least 2 available regions each, and 5 minutes with 0 available regions each, then the describability rating may be set to 50%, for example. Alternatively or additionally, if the customer has configured the audio description service to enable extended audio descriptions, then the describability rating may be set to 100%.

It is appreciated that identification of gaps and/or determination of media file suitability for audio description can be made prior to any transcription processing. For example, gaps can be identified and suitability determined where a time-coded transcript is available to the description engine 138 and the description engine 138 is configured to process the time-coded transcript for these purposes. One example of a process for analyzing a transcript for gaps follows. This example focuses on a portion of a transcript represented by the following data structure.

[{index: 0, word: "This," start_time: 2.0, end_time: 2.2},
{index: 1, word: "video," start_time: 2.2, end_time: 2.8},
{index: 2, word: "describes," start_time: 2.8, end_time: 3.3},
{index: 3, word: "how to," start_time: 3.3, end_time: 3.6},
{index: 4, word: "do," start_time: 3.7, end_time: 3.8},
{index: 5, word: "audio description.," start_time: 3.8, end_time: 4.5},

```
{index: 6, "[MUSIC]," start_time: 5.5, end_time: 7.2},
{index: 7, word: "Before," start_time: 7.9, end_time: 8.2},
{index: 8, word: "you," start_time: 8.2, end_time: 8.3},
{index: 9, word: "begin,," start_time: 8.3, end_time: 8.6},
{index: 10, word: "watch this," start_time: 11.9, end_time: 12.5},
{index: 11, word: "demonstration.," start_time: 12.5, end_time: 13.5},
{index: 12, word: "Now,," start_time: 23.4, end_time: 23.5},
{index: 13, word: "let's," start_time: 23.5, end_time: 23.6},
{index: 14, word: "proceed," start_time: 23.6, end_time: 23.9},
{index: 15, word: "with the lesson.," start_time: 23.9, end_time: 24.2},
{index: 16: word: ",," start_time: 24.2, end_time: 24.2, metadata: "<paragraph>"},
{index: 17, word: "This," start_time: 28.9, end_time: 29.0},
 ....
]
```

In this example, by subtracting the start_time of the subsequent entry from the end_time of the previous entry (or, in the case of the entry at index 0, by subtracting 0.0), the description engine 138 identifies intervals of greater than or equal to 2 seconds (for example) occur at the following locations:

A) Before index 0, from 0.0 to 2.0 (2.0 seconds)

B) Between index 9 and index 10, from 8.6 to 11.9 (3.3 seconds)

C) Between index 11 and index 12, from 13.5 to 23.4 (9.9 seconds)

D) Between index 15 (or, equivalently 16) and index 17, from 24.2 to 28.9 (4.7 seconds)

In some embodiments, the description engine 138 is configured to remove transcript tokens that do not represent speech (e.g., tags such as "[MUSIC]" or "[BACKGROUND NOISE]") from the transcript before gaps are identified. In the above example, this would add another identified gap, namely between index 5 and index 7, extending from 4.5 seconds to 7.9 seconds into the media file. Removing these non-speech tokens may be an additional transcription system configuration that is displayed to the customer, as described above. For example, some customers may not wish audio description to be superimposed on musical passages on playback. In this example, the [MUSIC] entry at index 6 would then remain and the additional description region would not be added.

In some embodiments, the description engine 138 is configured to identify gaps only at grammatically salient locations, such as sentence boundaries or paragraph breaks. In these embodiments, a sentence-boundary restriction would eliminate gap (B) above, since this occurs mid-sentence. Alternatively or additionally, if gaps are only allowed at paragraph breaks, then only gaps (A) and (D) would be identified (A because the beginning of the transcription is implicitly a paragraph break, and D because of the explicit break as indicated in the metadata at index 16).

Even when there are gaps in a media file sufficient for audio description, there can often be loud background music or other sounds that make simply mixing additional audio (e.g., by adding the digital samples from multiple audio files) problematic. It is common practice in many types of media to maximize the volume of these sections such that there is very little "headroom," which refers to how much additional volume can be inserted before reaching the maximum levels of the digital medium. In these cases, simply superimposing an audio description track on the original audio could result in undesirable clipping (i.e., exceeding the per-sample resolution of the digital waveform encoder). Even if there is sufficient headroom, the audio description track might be difficult to make out and understand when played simultaneously with these competing sounds and music.

Thus, in some embodiments, the description engine 138 is configured to modify the original audio data of a media file to allow audio description data (e.g., an audio description track) to be intelligible and to be played without distortion. Whether these techniques are used may be conditioned on a configurable settings to enable modification of the original audio data (e.g., configurable settings enabling extended audio description, as described with reference to FIG. 12).

In some embodiments, this modification is accomplished by creating a filtered version of the original audio data for each gap in which audio description data is targeted for audible rendering (as defined, for example, by the audio description manifest described below), and then applying a crossfade over a period of, for example, 10 milliseconds between the original and filtered version. In one embodiment, the filtered version is modified from the original audio data by lowering its volume (e.g., by a linear volume adjustment scale of 0.5), and then applying fast multi-band dynamic range compression, (e.g using attack/release times of 2-50 milliseconds, and a compression ratio of 2:1). Multi-band compression is used both to selectively attenuate louder components of the signal as well as to subtly alter the spectral shape of the original audio signal, which makes it easier for listeners to distinguish the spoken description from the background signal. In this embodiment, frequency bands and compression settings within each band are designed to make the original audio track less attention-capturing than the audio description track. For example, high frequencies (>3 kHz) may be strongly attenuated to result in a slightly muffled sound in the original audio, and low frequencies (<800 Hz) may be attenuated to make the original audio sound slightly thinner and less booming.

In an alternative embodiment, only linear volume adjustment is used as to not modify the character of the original audio signal.

In an alternative embodiment, a linear EQ filter is added to the signal path for spectral shaping, which also preserves the original character of the original audio signal more than multi-band compression.

In an alternative embodiment, mid frequencies (between roughly 500 and 3000 Hz) are attenuated instead of high and low frequencies as these frequencies contain the majority of speech. In some instances, this approach may result in more intelligible audio description narratives.

In an alternative embodiment, stereo or spatial filters are added to the signal path. These filters can include panning the original audio signal slightly or heavily to either the left or right and adding a phase difference between left and right channels. This spatial difference helps to increase the perceptual difference between the competing original audio data and audio description data (which may be stored in tracks), allowing the listener to better focus on the audible rendering of either the original audio data or the audio description data.

In some embodiments, the description engine 138 is configured to receive (e.g., from the describer interface 140) and process requests to estimate durations of audio description text and to respond to these requests with data characterizing these durations. For instance, in one embodiment, the description engine 138 is configured to estimate durations of audio description text by generating audio description data corresponding to the audio description text, rendering the audio description data into an audio description file (e.g., a wave file), and measuring the duration directly from the wave file. For example a wave file of 100 KB at 32 KB/second resolution (e.g., 16 KHz sampling rate with 16-bit sample representation) would yield an estimate of 3.125 seconds. In practice, dynamically generating audio description files by speech synthesis frequently may be too computationally expensive, and therefore estimations made from text characteristics may be more practical in some applications.

In another embodiment, the description engine 138 is configured to estimate the number of syllables directly from the orthographic length of audio description text. For instance, in one embodiment, the description engine 138 is configured to divide the orthographic length by a constant factor (e.g., 2.5) as follows.

N_syllables=length(description_text)/2.5

N_syllables will then be scaled by a typical syllable duration, at the currently configured speaking rate, for example 0.1 seconds at 250 words/minute. In this instance, an estimate the entire duration of the audio description text can be calculated using the following equation.

Estimated_Duration=N_syllables*0.1

In another embodiment, the description engine 138 is configured to estimate the number of syllables in the audio description text by a syllable counting process. One pseudocode example of a syllable counting process follows.

seconds, /aa/=>0.28 seconds, etc, and then apply similar scaling.

In an alternative embodiment, the description engine 138 is configured to combine duration estimation methods to get a more accurate estimate with less computation. For example, if audio description text duration was measured directly via an explicitly generated wave file, and the audio description text is subsequently changed, the new duration may be estimated as a difference from the old (measured) duration using a differential analysis of the old and new text. For example, take the case where a wave file was generated from the following audio description text: "The child plays with the lid.", and the audio waveform for this audio description text measures 2.8 seconds. Further, in this case, the describer modifies the audio description text to be: "The child plays with the lid of the box."

In this example, the description engine 138 estimates the rendered duration of new audio description data generated from the new audio description text to be: 2.8+text_duration_estimate("of the box"), where the text_duration_estimate function uses one of the methods described above.

In some embodiments, the description engine 138 is configured to receive (e.g., from the describer interface 140) and process requests to synthesize audio description text into audio description data stored in audio description files (e.g., wave files). In these embodiments, the description engine 138 is configured to access audio description configuration settings and interoperates with a speech synthesis engine to generate the audio description files according to the settings. Some examples of speech synthesis engines with which the description engine 138 may interact are describe further below.

In some examples, the description engine 138 is configured to receive a request to execute a differential pricing process and to respond to the request by executing the differential pricing process and providing its results (e.g., differential price) to the requester (e.g., the customer interface 124). The calculations performed by the differential pricing process vary between examples. Some of the factors that contribute to differential cost calculation in some embodiments include ASR_Cost, describability rating, con-

```
def count_syllables(description_text)
    # count vowel clusters, including accounting for common accented characters:
    n_syllables
    description_text.scan(/[aeiouy\u0225\u0233\u0237\u0243\u0250\u0252]+/i).count
    # add a syllable for each digit or "point" indicated by the text:
    n_syllables += description_text.scan(/[0-9\/]|\B\.\B/i).count
    # 2 syllables for any "colon"
    n_syllables += (description_text.scan(/\B\:\B/).count * 2)
    # 3 syllables for "underscore"
    n_syllables += (description_text.scan(/_/).count * 3)
    # Appropriate counts for URL verbalizations:
    n_syllables += 3 if description_text.match(/www/i)
    n_syllables += 4 if description_text.match(/http/i)
    n_syllables += 1 if description_text.match(/https/i)
    # Make sure there is at least one syllable per 2.5 orthographic characters, excluding
    spaces:
    n_syllables = [n_syllables, description_text.sub(" ","").length/2.5].max
    return n_syllables
end
```

In an alternative embodiment, the description engine 138 is configured to convert the entire audio description text into a phoneme sequence using a phonetic dictionary. In this embodiment, the description engine 138 may look up the phoneme durations in to a table, for example/b/=>0.05 figuration settings (e.g., values of the tunable parameters of the description engine 138 described above), and the content of the original media file.

For instance, in one example, where a media file has a describability rating of 100%, the differential pricing process increases the price of the audio description service. The implication of the 100% describability rating is that the audio description of the media file will consume substantial describer time and will produce a large amount of description text and audio description data for the customer. As such, the differential pricing process imposes a higher price rate on the customer as the describability rating in increases. In some examples, the differential pricing process calculates differential pricing using as a linear scale factor based on the describability rating. In other examples, the differential pricing process combines (e.g., add) an offset to the scaled describability to calculate a differential price. For instance, in one example where a 10-minute file is 50% describable, a price for the audio description service may be calculated as:

Price/minute=$5.00+(0.50*$ 5.00)=$7.50/minute

So, the total price for describing this file, in this example, would be $75.00.

In other embodiments, the description engine 138 is configured to adjust the differential price further by inferring the degree to which audio description data will need to be created. For example, some embodiments of the description engine 138 execute image processing techniques (e.g., key-frame identification and/or differentiation), to determine whether there is a large amount of variation among the video frames in the original media file. For example, if a key-frame algorithm is used, the time-rate of key-frame occurrence may be used to adjust the price rate. For example, a key-frame rate of 1/minute would add an additional $0.50/minute to the price of the file, whereas a key-frame rate of 0.2/minute would add an additional $0.10/minute to the price Alternatively or additionally, some embodiments of the description engine 138 execute natural language processing techniques (e.g., topic identification or keyword extraction) using a transcript (e.g., an ASR transcript or a professional edited transcript), and/or to the title of a video in the media file. For example, using a topic-modeling algorithm based on word2vec and latent Dirichlet allocation, the transcription system may determine that the original media file concerns a type of event that generally requires more description (e.g., a sporting event, an action/adventure film, etc.).

In some embodiments, the description engine 138 is configured to receive (e.g., from the describer interface 140 and/or the market engine 132) and process requests to generate output files that include audio description data. These files may comply with a variety of formats.

For instance, in some cases, the customer may require the audio description manifest and the associated audio description files in wave file format. An example structure for an audio description manifest follows.

a video player plugin. With the audio description files and manifest, this plugin may be modified to also play each audio description file at the appropriate time in the original media file (as indicated by the audio description manifest offset). In this case, the playback of the original media file would continue, with the audio description file playbacks being superimposed and controlled in this manner by the plugin. In this embodiment, the "optional" parameter, if set to true, may indicate that the audio description file should not be played as it will likely overlap and interfere with the original audio.

In an alternative embodiment, the plugin may be configured to stop playing the original media file whenever an audio description file is played. For example, with reference to the above example audio description manifest, the plugin would begin by playing the audio description file at index 0 ("snippet_FHJSX.wav") before the original media file is played at all. Once playback of this audio description file completes (or, for example, if the duration of 3.1 seconds is exceeded), the plugin would return control to the media player to begin playing.

Then, when the plugin has played 13.2 seconds of the original video, it would signal to the original media player to pause, and then play "snippet NMYFG," before returning control to the original media player to continue playing, etc. It is appreciated that this method enables audio description to be inserted at any time point within playback of the original media file. As such, this method can be used in conjunction with an original media file that does not have any gaps identified prior to the SAVI process, and the describer may be instructed to use very extensive descriptions to benefit the sight-impaired consumer.

In some embodiments, it is appreciated that a combined audio description file may be constructed from the audio description files identified in the audio description manifest for use in other applications. For example, a combined audio file that contains all of the audio description files in sequence, with silence inserted when no audio description file is indicated by the audio description manifest, may be constructed by concatenating the audio description files and variable length silence wave files into a single, combined audio description file. If all of the "optional" audio description files described above are skipped, this combined audio description file could be played simultaneously with the video of the original media file, and the end user experience would be the same as with the first plugin described above. In an alternative embodiment, this combined audio playback experience may also be obtained by merging the original audio track with the combined audio description file containing the concatenated audio description files into a new, single audio file for playback with the original video. In this

[{snippet_index: 0, description_text: "Text: Institute for Brain Science and Learning," snippet_file: "snippet_FHJSX.wav," snippet_offset: 0.0, snippet_duration 3.1},
{snippet_index: 1, description_text: "The child plays with the lid of the box," snippet_file: "snippet_NMYFG.wav," snippet_offset: 13.2, snippet_duration 2.6, optional: true},
...
{snippet_index: 10, description_text: "Kelly leaves the room as the child watches. The child appears sad.," snippet_file: "snippet_AKIFW.wav," snippet_offset: 134.2, snippet_duration 5.7}
...
]

For example, the end user may have a copy of the original media file which is being played back under the control of embodiment, it may be possible to add the description audio as an additional track or channel, so that the original audio data and the audio description data play simultaneously but through different audio sources. Alternatively or additionally, the audio description data and the original audio data may be combined on the same track or channel, either through addition, or using the filtering techniques described above to ensure that the audio description may be heard clearly above the original audio. Alternatively or additionally, the description engine 138 may using signal processing on the audio description data, such as pitch-constant speed control, to modify the duration of the audio description data to fit within a gap.

In another embodiment, an audio description text manifest may be provided to the customer. This manifest is similar to the audio description snippet manifest, but with the "snippet_file" attributes removed. Optionally, depending on the use case, the "duration" attributes may also be excluded. Thus, this output represents a time-coding of the description text locations into the original media file. An audio description text manifest such as this may be useful in applications where a speech synthesizer is already available to the end-user during video playback. For example, many web browsers include speech synthesizers in order to render audio for a screen reader, and this same mechanism may be used in conjunction with the audio description text manifest. It is appreciated that the audio description text manifest may also be employed to create audio description recordings using professional voice talent. The audio description text manifest (or, for example, a simple textual conversion of this manifest) would act as a script for this process, and the audio description files produced with this method could be used identically as with the synthetic audio description files, especially if the voice recording were constrained to the indicated durations, either naturally, or using signal processing on these recordings such as pitch-constant speed control to modify their duration.

In other embodiments, the description engine 138 is configured to generate files in other textual formats for provision to the customer. For example, in one embodiment, the description engine 138 is configured to generate a plain text document that contains either just the audio description text segments or both the transcript text and the audio description text segments. This text file may be supplemented with labels indicating which sections are from the transcript of the original media file and which are from the audio description of the original media file, and/or timing markers (e.g., SMPTE timecodes) that are derived from the time-coded transcript and/or the audio description manifest. Alternatively, this textual information may be converted into standard caption formats such as WebVTT, DFXP, or other formats which encode textual, timing, and, optionally, metadata information.

In some embodiments, the customer interface 124 is configured to provide a user interface to the customer 110 via the network 116 and the client computer 104. For instance, in one embodiment, the customer interface 124 is configured to serve a browser-based user interface to the customer 110 that is rendered by a web-browser running on the client computer 104.

According to one example illustrated by FIG. 1, the customer interface 124 is configured to provide a variety of screens that enable a customer to order an audio description, and thereby submit an audio description request. FIG. 9 illustrates one such screen, an upload screen 900, that is provided by some examples of the customer interface 124. As shown, the upload screen 900 includes controls 902 configured to receive selections of one or more primary services and controls 904 configure to receive selections of one or more add-on services 904. The upload screen 900 enables a customer to order an audio description in conjunction with a transcript.

Figure 10:
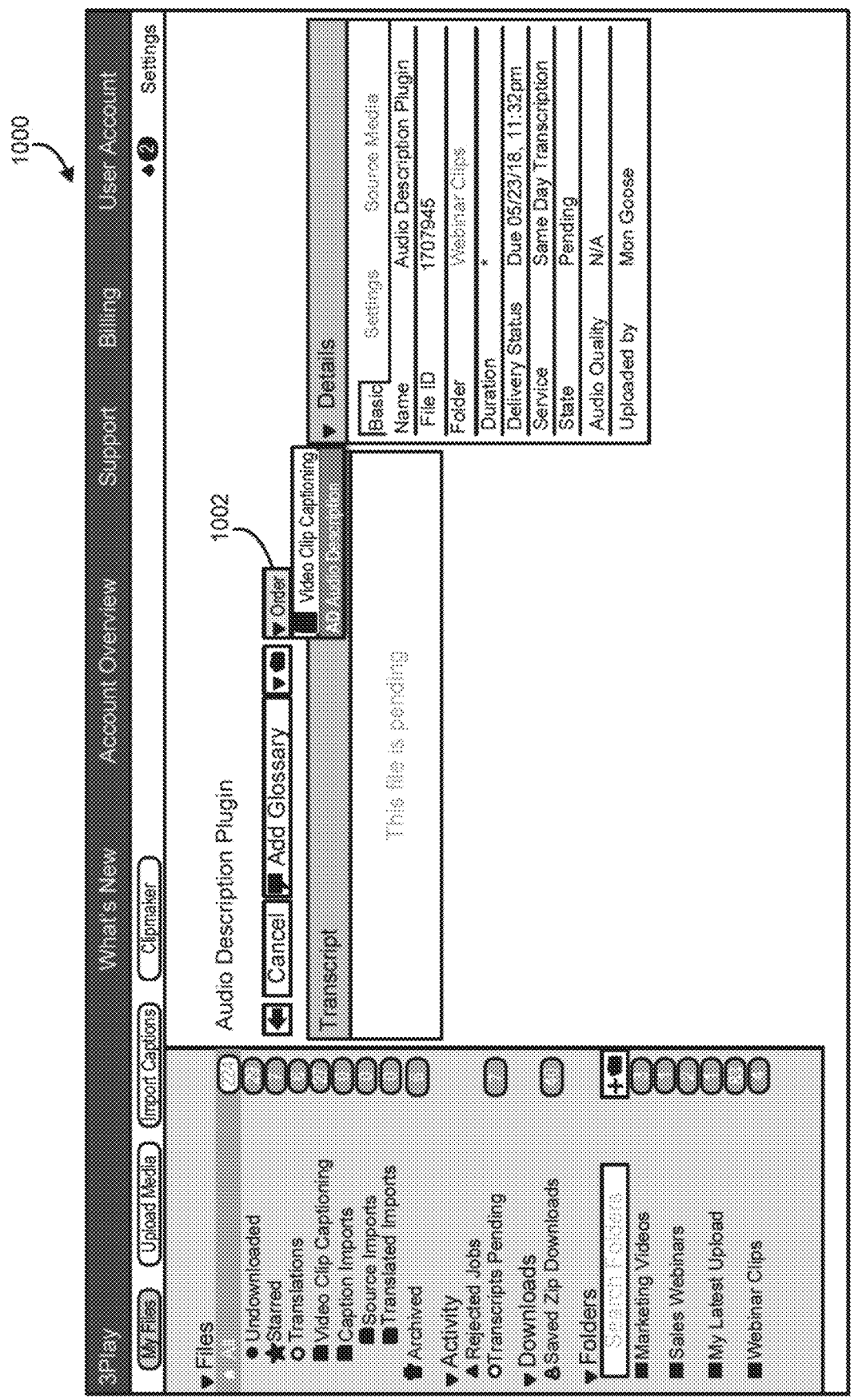
FIG. 10 is an illustration of an example status screen according to at least one embodiment described herein.

FIG. 10 illustrates another screen that enables ordering of audio description, a status screen 1000, that is provided by some examples of the customer interface 124. As illustrated, the status screen 1000 includes an order control 1002 that enables a customer to order audio description for a media file within the context of viewing the status of the media file (in this case the media file is named "Audio Description Plugin"). As shown, transcription of the media file is underway, but no transcript is yet available. Thus, at least some examples of the customer interface 124 disclosed herein enable customers to order audio description of a media file along with transcription, at any point during the transcription process, or after the transcription is complete.

In some embodiments, the customer interface 124 is configured to present the describability rating during the ordering process to enable customers to decide whether or not to proceed with ordering audio description for a media file. For instance, in one embodiment, the customer interface 124 is configured to present the describability rating in both of screens 900 and 1000. In this embodiment, the customer is be given a choice to "Cancel" their order. In another embodiment, the customer interface 124 is configured to present the screen 900 with a supplemental view of the transcript (in its current state) that displays the locations and durations of the describable (given the current threshold configurations) regions, prior to ordering. This enables the customer to decide with more precision whether or not the audio description is worth ordering. In another embodiment, the customer interface 124 is configured to present the screen 900 with an additional "Describe" button. In this embodiment, the customer interface 124 is configured to respond to selection of this button by skipping the automated description order and proceeding to a customer editing screen for this media file in which the customer can manually perform audio description.

Figure 16:
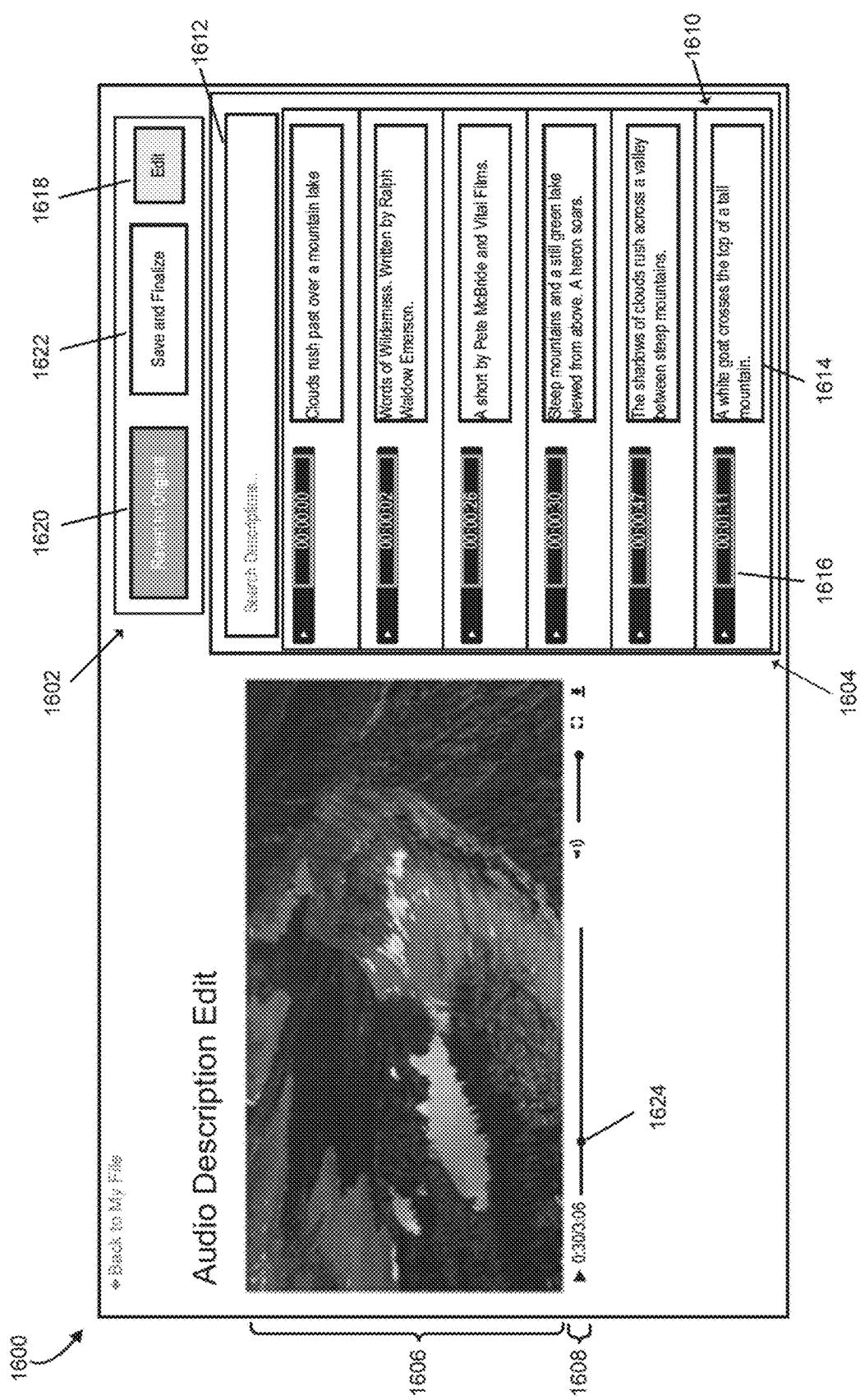
FIG. 16 is an illustration of another example describing screen according to at least one embodiment described herein.

One example of a customer editing screen 1600 is illustrated within FIG. 16. As shown, the customer editing interface 1600 is segmented into control buttons 1602, an audio description editing region 1604, a video display 1606, and a video control 1608. The customer editing interface 1600 displays the original media data and associated audio description text, and allows a customer to view or modify the audio description text.

The control buttons 1602 includes an edit button 1618, a revert button 1620, and a save button 1622. In some embodiments, the edit button 1618 may initially be the only button displayed within the control buttons 1602. Once the edit button 1618 is activated, the revert button 1620 and the save button 1622 may be displayed or become operable, and the edit button 1618 may not be displayed or may become inoperable. Activating the edit button 1618 allows modification within the audio description editing region 1604. The revert button 1620 allows reversion of the audio description data the customer has associated with the media file to original audio description data generated by the describer. The save button 1622 stores the currently display audio description text and transmits a request to the description engine 138 to generate output files. In an alternative embodiment, the customer editing interface 1600 may include a separate edit button 1618 and a revert button 1620 for each audio description segment within the audio description editing region 1604.

The audio description editing region 1604 includes audio description segments, such as a description segment 1610, and a search box 1612. The description segment 1610 represents generated audio description data associated with a time location within the source media file.

The segment 1610 includes a text box 1614 and a playback control 1616. The text box 1614 contains the audio description text contained within the audio description data. The playback control 1616 displays the associated time location within the source media. The playback control 1616 allows the customer to play back the audio portion of the audio description data. The audio description text within the text box 1614 is rendered editable if the edit button 1618 is activated. Modifying any of the audio description text in this interface will cause regeneration (for example, re-synthesis) of the associated audio description data, so that the user may then observe the new audio description data's duration and listen to the audio description data in the context of the (possibly modified) source media audio.

The search box 1612 allows display of a subset of the audio description data within the audio description editing region 1604. Entering a search string in the search box 1612 may display only those audio description segments containing the entered search string.

The video display 1606 displays the video data of the source media file. The video control 1608 provides controls over the source displayed by the video display 1606, including volume control, playback control, full-screen control, and a current point 1624 within the video.

Figure 15:
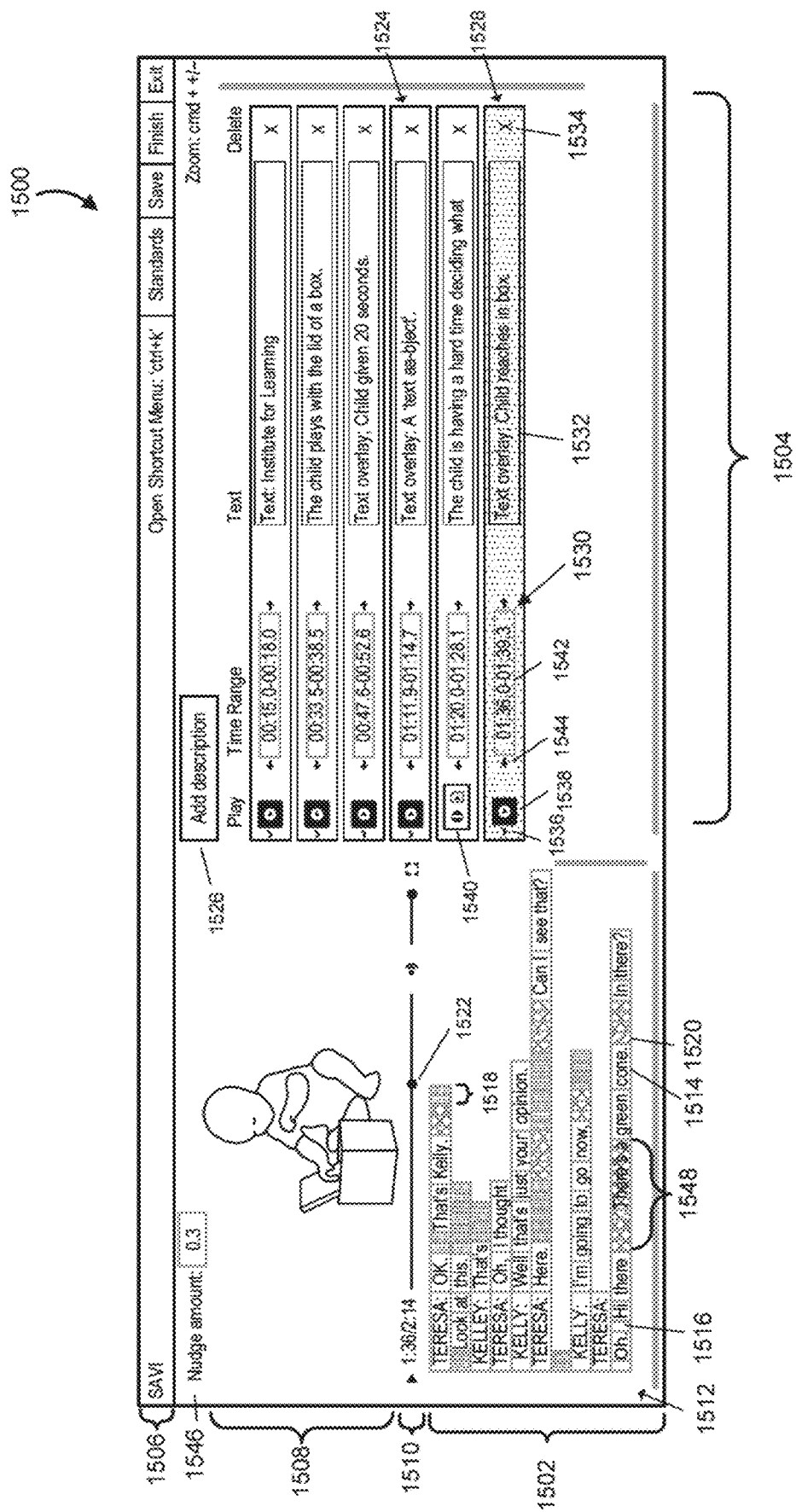
FIG. 15 is an illustration of an example describing screen according to at least one embodiment described herein.

Note that this interface will, in one embodiment, differ significantly from the SAVI 1500 as shown in FIG. 15 and described below, excluding the time-coded transcript view and the ability to adjust the start time of the audio description data. The goal of this interface is to enable the customer to modify the audio descriptions while playing back the combined source and audio description data to ensure that both are audible and useful. Alternative embodiments may include some or all of the additional capabilities that are available in the SAVI 1500.

In an alternative embodiment, the customer editing interface 1600 may be configured to enable the customer to insert audio description text at other points in the video, independent of the locations that were created previously. For example, this mode of customer editing may be used when the customer decides—at ordering time—to forgo the provided audio description service and proceed to describe the source media file by themselves. In this embodiment, numerous empty text boxes may be displayed within the audio description editing region 1604, corresponding to all gaps (as determined by the description engine 138). The customer could then choose to enter audio description text in some, all, or none of these text boxes, and the audio description manifest could then be produced from only the gaps for which audio description text was entered.

In an alternative embodiment, the customer editing interface 1600 may be configured to solicit feedback from the customer. This feedback may be collected by the audio description system and saved, to be used (for example) in modifying the Standards which are made available to the describers in SAVI, as described below with reference to FIG. 15. For example, the customer editing interface 1600 may include a text box wherein the customer may type feedback about the current audio description which may be displayed to administrators in a separate interface. Alternatively or additionally, the audio description system may collect pairs of original (i.e., created in the description system 100 by describers) and customer-edited audio description text segments for collation by administrators. The information derived from this feedback may then be added to the audio description Standards database housed within the market data storage 134 to be displayed in SAVI when the describer clicks on the "Standards" button. "Standards" are a resource to guide the describers in creating useful descriptions. "Standards" communicate what to describe and what not to, provide some hints and rules, and also provide some description of how the speech synthesis engine can be manipulated using the audio description text input.

In some embodiments, the difference between the original and customer-edited audio description text may be processed automatically by the audio description system to create examples of "incorrect" and "correct" descriptions which are displayed in the Standards view in SAVI. For example, a string aligning process such as dynamic-time-warping (with, for example, the Levenshtein distance matching criteria) may be applied to the original and edited audio description text, with the resulting alignment displayed in a way that highlights important changes. For example, if an original describer audio description text segment recites: "Woman doing exercises," and the corrected audio description text recites: "Woman does pushups," the audio description system could display this as an example in the standards with a "track changes" type of markup highlighting the changes.

It is appreciated that the audio description system 100 described herein to produce synthesized audio description data may be extended to also include recorded audio description as a deliverable to the customer. In this embodiment, the SAVI 1500 may be extended to accept recorded audio description data (e.g., using a built-in or attached microphone connected to the computer system running the SAVI interface) in place of, or in addition to, audio description text segments. In addition, the audio description system 100 may support a combination of recorded and synthesized audio in the customer deliverables.

Figure 11:
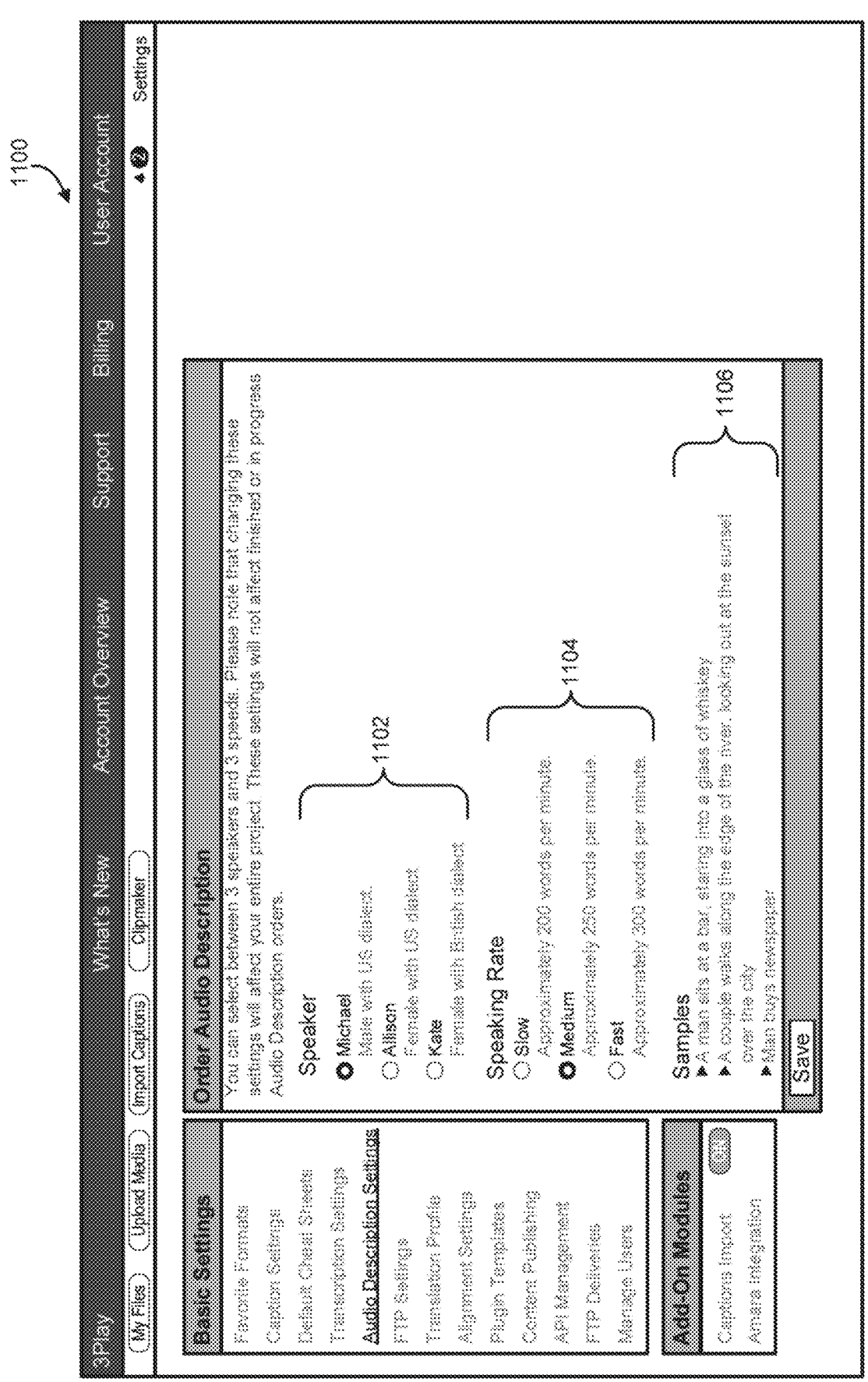
FIG. 11 is an illustration of an example configuration screen according to at least one embodiment described herein.

Returning to FIG. 1, in certain examples, the customer interface 124 is configured to provide a configuration screen to enable a customer to configure audio description settings that may be used in processing an order. FIG. 11 illustrates a configuration screen 1100 provided by some of these examples. As shown, the configuration screen 1100 includes controls configured to receive selections of a voice 1102 and a speaking rate 1104. In this example, the customer has the ability to select from three voices and three speaking rates although other examples may include greater or fewer options. These selections determine settings for a speech synthesizer executed by the description engine 138 that renders (e.g., as audio wave files) the audio description data for the audio description text segments. The configuration screen 1100 also includes controls for sample sentences 1106. On selecting one of these controls 1106, an audio description data corresponding to the text and to the control 1106 is played with the currently selected voice and speaking rate. In this way, the customer may select their preferred synthetic speaking style for the audio description data. Once saved, these and other settings described herein may be applied to media files, projects, or all customer assets.

Figure 12:
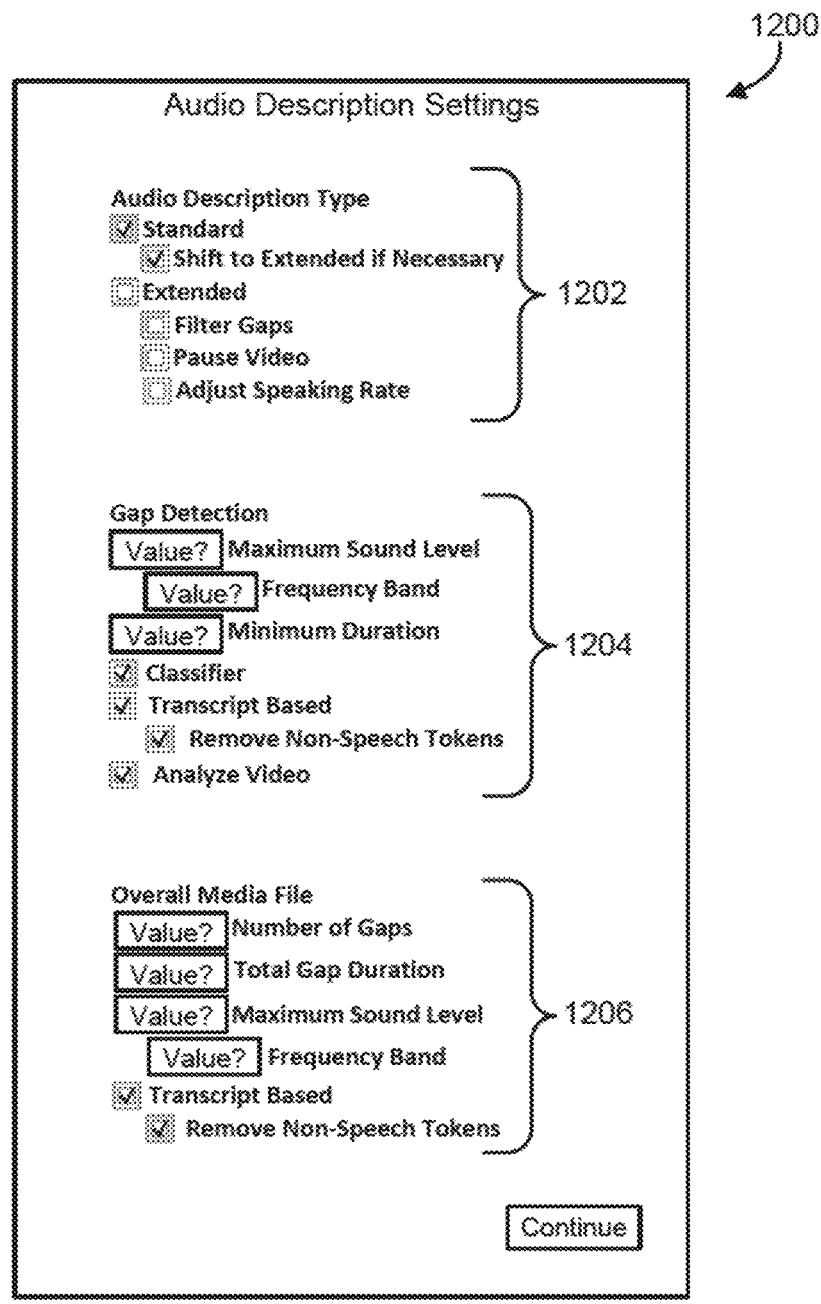
FIG. 12 is an illustration of another example configuration screen according to at least one embodiment described herein.

In some examples, the customer interface 124 is configured to provide other configuration screens to enable a customer to configure other audio description settings. FIG. 12 illustrates a configuration screen 1200 provided by some of these examples. As shown, the configuration screen 1200 includes controls 1202 configured to receive selections of audio description type 1202, controls 1204 configured to receive values of tunable parameters of the description engine 138 directed to gap identification/detection, and controls 1206 configured to receive values of tunable parameters of the description engine 138 directed to determining overall media file suitability for audio description. The controls 1202, 1204 and 1206 impact how and whether audio description may be applied to original media files.

For example, the controls 1202 present options to choose standard or extended audio description. Extended audio description configures the description engine 138 to modify the original media file audio to enable greater audibility for rendered audio description data. For instance, where the "Filter Gaps" option is selected, the description engine 138 is configured to execute signal processing methods to, for example, decrease the amplitude of the original media file audio signal, or filter the signal, as described above, during gaps.

Alternatively or additionally, where the "Pause Video" option is selected, the description engine 138 is configured to pause of the video so that audio descriptions may be inserted in a way that does not overlap with the original media file audio. Thus, the description engine 138 is configured to effectively extend the duration of the original media file by inserting replicated image frames into the original video data and inserting silence into the original audio data, both for a duration equal to the duration of the audio description data positioned at that point of the media file.

Alternatively or additionally, where the "Adjust Speaking Rate" option is selected, the description engine 138 is configured to vary the speaking rate used within the audio description data. For example, the description engine 138 may use a nominal speaking rate of 250 words/minute, but where this option is selected, the description engine 138 is configured to selectively speed up the speaking rate in order to fit audio description data into shorter time periods than would they would at a slower speaking rate. It is appreciated that any of these options may impact the automatic cancellation or shifting methods described herein. For example, setting a faster speaking rate, or enabling a variable speaking rate, may allow a lower duration threshold for gaps.

Alternatively or additionally, where the "Shift to Extended if Necessary" option is selected, the description engine 138 is configured to enable extended audio description for audio descriptions that cannot be completed as standard audio description. Extended audio description permits original audio modification (or original video pausing) and may allow audio description to proceed independently of the gap times available as determined from the transcript or audio analysis. In at least one embodiment, any ordered audio descriptions that cannot be completed as standard audio description are automatically shifted to extended audio description. In this embodiment, audio description orders need not be canceled due to lack of sufficient gaps.

In some examples, the customer interface 124 is configured to restrict ordering of an audio description where the media file is not suitable for audio description. For example, where transcoding of the media file reveals that the media file does not contain a video track (i.e., that it is only audio), the customer interface 124 may prevent audio description ordering. Alternatively or additionally, processing executed by the description engine 138 may indicate that the audio track contains insufficient time for the insertion of description audio, and this may negate the possibility of performing standard audio description. In any of these cases, the customer interface 124 may implement restrictions by, for example, not displaying the audio description ordering button or menu. Alternatively, the description engine 138 may cancel or convert an existing audio description order at the time when the relevant conditions are determined. In this event, a notice may be displayed to the customer via the customer interface 124 explaining the reason that the order was cancelled or converted.

Figure 13:
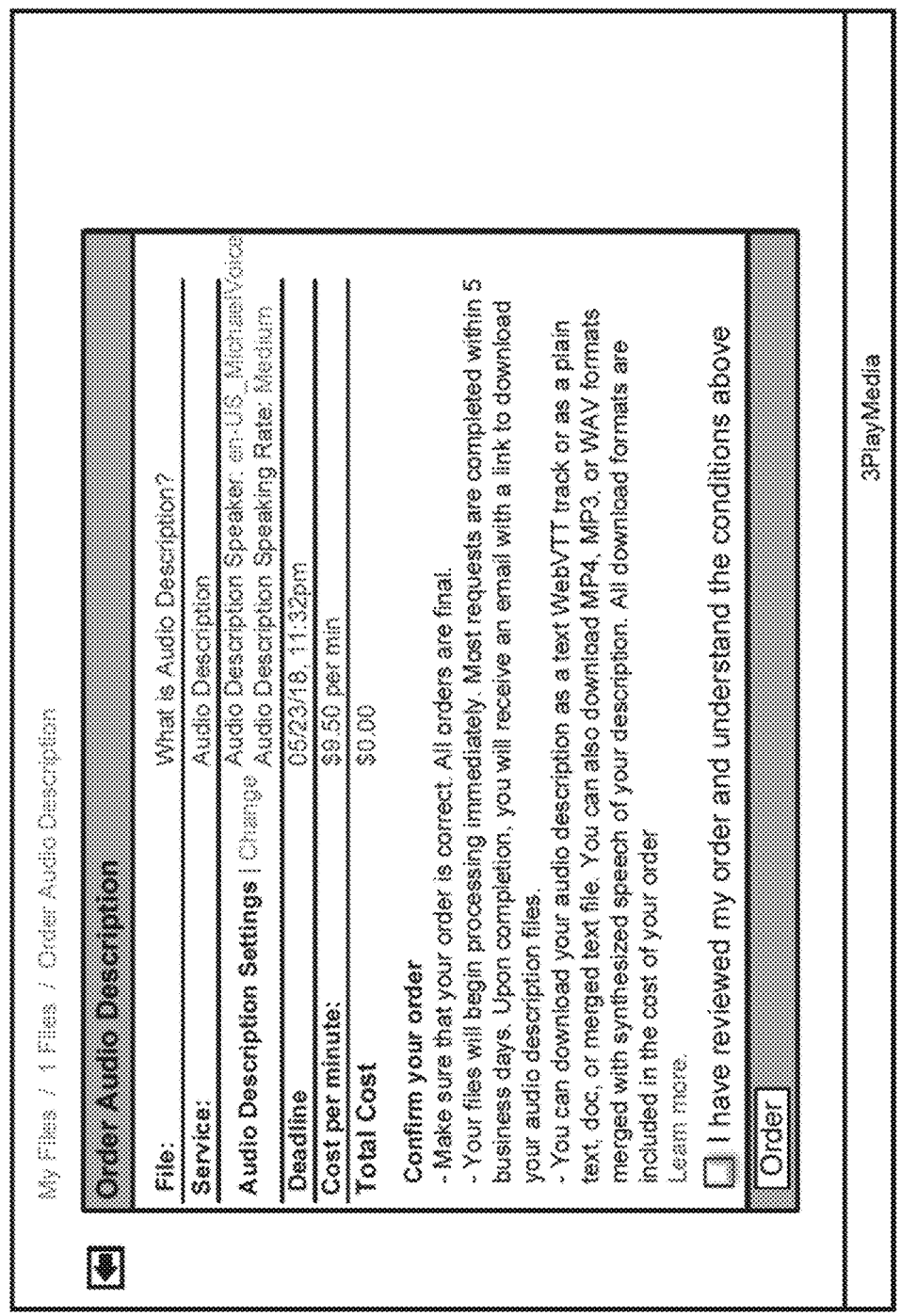
FIG. 13 is an illustration of an example order summary screen according to at least one embodiment described herein.

In some examples, the customer interface 124 is configured to transmit a request to the description engine 138 to execute a differential pricing process and to receive and present the results of this process to the customer. Differential pricing may be displayed, for example, with an order review summary screen configured to enable a customer to review and confirm an order. One example of an order summary screen is illustrated in FIG. 13. As shown, the summary screen 1300 provides a variety of information regarding an order to a customer. This information includes output formats in which the audio description will be rendered.

According to another example illustrated by FIG. 1, the customer interface 124 provides media file information to the user interface. This media file information includes one or more unique identifiers of one or more media files previously received from the customer 110 and other attributes of these files including, for example, the due dates and times, content types, prices, difficulties, describability ratings, and statuses or states of jobs associated with the previously received media files. As discussed above with reference to FIG. 8, examples of job states include New, Initial Processing, Available, Assigned, In_Progress, and Complete. In some embodiments, the customer interface 124 serves media file information as one web page, while in other embodiments, the customer interface 124 serves this media file information as multiple web pages. It is to be appreciated that different due dates and times and content type may be associated with different prices to the customer. Customer prices may also be impacted by other factors that impact the underlying transcription or audio description cost, including how objectively difficult the media file transcription is to edit or describe, as described above.

In another example, the customer interface 124 serves media file information that includes final transcription information to the user interface rendered by the client computer 104. The final transcription information includes a final (synchronized or non-synchronized) transcription of the content included in a media file. The synchronized transcription is comprised of a textual representation of the content of the media file, where each textual token has associated with it indicia of the location in the media file to which it applies. The textual tokens may include words, numerics, punctuation, speaker identification, formatting directives, non-verbal indicators (such as [BACKGROUND NOISE], [MUSIC], [LAUGHTER], [PAUSING]) and other markings that may be useful in describing the media file content. The empty string may also be used as a textual token, in which case the location indicia serves to keep the transcription synchronized with the media file content in the absence of useful textual information. In the case of the draft transcription from the ASR device, these empty-string tokens may be used if the ASR process was confident that some transcription-worthy event has occurred at that location but is unsure of the particular identity of that event. In this case, having the location indicia associated with the event facilitates synchronized correction by the editor.

In some embodiments, the customer interface 124 exchanges customer and media file information with the customer 110 via the user interface. Media file information may include one or more media files, information associated with the one or more media files, or information descriptive of the attributes of the one or more media files. Specific examples of media file information include a media file to be transcribed or described, content derived from the media file (e.g., captions and caption placement information), a type of content included in a media file, a date and time a transcription or audio description of a media file is due, a domain of the subject matter presented in the content, a unique identifier of a media file, storage location of a media file, subtitles associated with a media file, annotations associated with a media file, semantic tagging associated with a media file, describability rating of the media file, and advertising associated with a media file. Media file information is described further below with reference to FIG. 2. According to an example illustrated by FIG. 1, the customer interface 124 receives media file information from the user interface. This media file information includes a media file, information indicating a date and time that transcription and/or audio description of the media file is due, and a type of content included in the media file. Responsive to receipt of this media file information, the customer interface 124 stores the media file in the media file storage 136 and stores a unique identifier of the media file, the due date and time, and the content type in the market data storage 134.

According to an example illustrated by FIG. 1, the customer interface 124 receives media file information from the user interface. This media file information includes a media file and media file information indicating a domain of the subject matter of the content included in the media file or a project to be associated with the media file from which the domain may be derived. Responsive to receipt of this media file information, the customer interface 124 stores the media files in the media file storage 136 and stores a unique identifier of the media file and other media file information in the market data storage 134.

According to another example illustrated by FIG. 1, the customer interface 124 provides media file information to the user interface. This media file information includes unique identifiers of one or more media files previously received from the customer 110, the due dates and times associated with the received media files, and the project information associated with the received media files. In this example, the customer interface 124 receives modifications to the provided media file information made by the customer 110 via the user interface. Responsive to receiving the modifications, the customer interface 124 stores the modifications in the market data storage 134.

In other embodiments, the customer interface 124 is configured to receive a request to edit final transcription information from the user interface, and in response to the request, to provide an editing platform, such as the editing screen described below with reference to the editor interface 126, to the user interface. In this example, the editing platform enables customers to edit the final transcription information. Also, in this example, user interface includes elements that enable the customer interface 124 to initiate an upload of the edited final transcription information to the customer interface 124. The customer interface 124, in turn, receives the edited final transcription information, stores the final transcription information in the media file storage 136 and stores an association between the edited final transcription information and the media file with content that was transcribed in the market data storage 134.

In other embodiments, the customer interface 124 is configured to receive a request to edit final audio description information from the user interface, and in response to the request, to provide an audio description platform, such as the describing screen detailed below with reference to the describer interface 140, to the user interface. In this example, the audio description platform enables customers to edit the final audio description information. Also, in this example, user interface includes elements that enable the customer interface 124 to initiate an upload of the edited final audio description information to the customer interface 124. The customer interface 124, in turn, receives the edited final audio description information, stores the final audio description information in the media file storage 136 and stores an association between the edited final audio description information and the media file with the media file that was described in the market data storage 134.

Although the examples described above focus on a web-based implementation of the customer interface 124, embodiments are not limited to a web-based design. Other technologies, such as technologies employing a specialized, non-browser-based client, may be used to implement the user interface without departing from the scope of the aspects and embodiments disclosed herein. For instance, according to one embodiment, the customer interface 124 is a simple, locally executed upload client that allows the customer to do nothing more than upload media files to the server via FTP or some other protocol. In other embodiments, the customer interface 124 is configured to perform a variety of processes in response to exchanging information via the user interface. For instance, in one embodiment, after receiving one or more media files via the user interface, the customer interface 124 provides the market engine 132 with an identifier of newly stored, unprocessed media files.

In some embodiments, the customer interface 124 is configured to provide a system interface to the client computer 104 via the network 116. For instance, in one embodiment, the customer interface 124 implements an HTTP API through which the client computer 104 exchanges transcription request information or audio description request information with the customer interface 124. The audio description request information may include request audio description type information, project information (e.g., an identifier of a project), customer information (e.g. an identifier of a customer), media file information (e.g., an identifier of a media file or derived content), values of configuration settings and tunable parameters, and responses to any requests. In response to receiving the transcription request information, the customer interface 124 may store the transcription request information in the market data storage 134 in association with the identifier of the media file, project, or customer for which the requested transcription products are to be generated. In addition, responsive to receiving the audio description request information, the customer interface 124 may store the media file identified in the audio description request information in the media file storage 136.

In some embodiments, the administrator interface 130 is configured to provide a user interface to the administrator 114 via the network 120 and the client computer 108. For instance, in one embodiment, the administrator interface 130 is configured to serve a browser-based user interface to the administrator 114 that is rendered by a web-browser running on the client computer 108. In this embodiment, the administrator interface 130 exchanges market information with the administrator 114 via this user interface. Market information may include any information used to maintain the job market and stored within the market data storage 134. Specific examples of market information include a media file information, job information, customer information, editor information, describer information, administrator information and transcription request information. Market information is described further below with reference to FIG. 2. Using the administrator interface 130, the administrator 114 acts as a manager who regulates the job market as a whole to promote its efficient allocation of resources.

In these embodiments, the administrator interface 130 is also configured to receive a request from the user interface to provide a preview of a media file, and in response to the request, serve a preview screen for the requested media file to the user interface. This preview screen provides the content of the media file, the draft transcription associated with the media file, and the describability rating of the media file. More particular, in some embodiments, the preview screen is configured to provide the media file content, in the form of, for example, a streamed version of the original file, as well as the draft transcription information for the media file, which includes time-codes or frame-codes. This information enables the preview screen to display the draft transcription in synchronization with the media file content. A preview may consist of all or some of this information.

According to an example illustrated by FIG. 1, the administrator interface 130 provides media file information to the user interface. This media file information includes one or more unique identifiers of one or more media files previously received from the customer 110, the content types associated with the received media files and the difficulties associated with the received media files. In this example, responsive to receipt of an indication that the administrator 114 wishes to preview a media file, the administrator interface 130 provides a preview of the media file, the draft transcription information associated with the media file, and the describability rating of the media file. Further, in this example, the administrator interface 130 receives modifications to the provided media file information made by the administrator 114 via the user interface. Responsive to receiving the modifications, the administrator interface 130 stores the modifications in the market data storage 134.

In other embodiments, the administrator interface 130 is also configured to receive a request from the user interface to provide an administrator view of all jobs available on the market, and in response to the request, serve an administrator screen to the user interface. This administrator view is configured to display the same information available to editors or describers viewing the job market (difficulty, pay-rate, due date and time, domain, etc.), and also displays additional information to assist the administrator. For example, the administrator view may display the number of editors or describers with permission to edit or describe each available media file, the amount of time each job has been on the market, the number of previews of the media file, and other data concerning the market status of the media file. In this way, the administrator view displays information that enables administrators to ensure that the media file is accepted as an editing or describing job.

The administrator interface 130 is also configured receive a request from the user interface to modify information displayed by administrator view, and in response to the request, store the modified information. Thus, the administrator view may increase the pay rate, may manually enable a larger number (or smaller number) of editors or describers access to the file, or may cut the file into shorter segments—thus producing several editing or describing jobs for the same media file. The administrator view may also bundle jobs together to ensure that all editors and describers have access to a reasonable cross-section of work. For example, the administrator view may group a selection of jobs with variable difficulty together so that a single editor or describer would need to accept all of these jobs, instead of just picking low difficulty jobs for themselves. The administrator view may also throttle the supply of low difficulty jobs in order to create a more competitive environment or to induce editors or describers to work on difficult jobs. The administrator view may also record as accepted a claim offer that is higher than the pay rate for a job.

In other embodiments, the administrator interface 130 is also configured to receive a request from the user interface to provide a meta rules view, and in response to the request, serve a meta rules screen to the user interface. Meta rules globally modify the behavior of the market by affecting how all or some of the available jobs will appear on the market. In some embodiments, the administrator interface 130 is configured receive a request from the user interface to add to or modify meta rules displayed by meta rules view, and in response to the request, store the newly introduced meta rule information.

In other embodiments, the administrator interface 130 is also configured to receive a request from the user interface to provide a market view of jobs available on the market, and in response to the request, serve a market screen to the user interface. The market screen is configured to provide summarized information about jobs organized according to one or more job (or associated media file) attributes. For instance, one example of the market screen displays all of the jobs assigned to one or more editors or describers. In another example, the market screen displays all jobs organized by due date and time in the form of a calendar. In yet another example, the market screen displays all jobs belonging to a particular customer.

Although the examples described above focus on a web-based implementation of the administrator interface 130, embodiments are not limited to a web-based design. Other technologies, such as technologies employing a specialized, non-browser-based client, may be used without departing from the scope of the aspects and embodiments disclosed herein.

In some embodiments, the editor interface 126 is configured to provide a user interface to the editor 112 via the network 118 and the client computer 106. For instance, in one embodiment, the editor interface 126 is configured to serve a browser-based user interface to the editor 112 that is rendered by a web-browser running on the client computer 106. In this embodiment, the editor interface 126 exchanges media file information, editor information and job information with the editor 112 via this user interface. Editor information may include information associated with an editor profile or the history of an editor within the job market. Job information may include information associated with transcription jobs that are available or that have been completed via the job market. Specific examples of editor information include a unique identifier of the editor, domains of subject matter in which the editor is qualified to work, and identifiers of currently claimed jobs. Specific examples of job information include a unique identifier of the job, a deadline for the job, and a pay rate for the job. Media file information, editor information as a form of user information and job information are described further below with reference to FIG. 2.

In some embodiments, the editor interface 126 is configured to provide job information only for jobs that the editor 112 is permitted to work. In one example, the editor interface 126 determines that an editor is permitted to edit a draft transcription based on a complex of factors. If a media file associated with the draft transcription has a specific content type, then in some examples, the editor interface 126 will only provide job information associated with the media file to editors qualified to edit that specific content type. In other examples, the editor interface 126 may provide job information associated with more difficult files to more experienced editors. In still other examples, the editor interface 126 provides job information for jobs associated with specific customers to particular subset of editors. This approach may be advantageous, for example, if there are confidentiality concerns and only that subset of editors have signed non-disclosure agreements. Thus, some examples of the editor interface 126 do not provide job information to the editor 112 for jobs claimed by another editor or for jobs that the editor 112 does not have permission to claim.

In other embodiments, the editor interface 126 is configured to receive a request from the user interface to provide a preview of a media file, and in response to the request, serve a preview screen for the requested media file to the user interface. This preview screen provides the content of the media file and the draft transcription information associated with the media file. Editors may be given access to the preview screen for a media file before they choose to accept the editing job at the given pay rate. The preview screen includes the media file content, in the form of, for example, a streamed version of the original media file, as well as the draft transcription information for the media file, which includes time-codes or frame-codes. This information enables the preview screen to display and draft transcription in synchronization with playback of the media file content. A preview may consist of all or some of this content. The editors may access the preview screen content and thereby assess for themselves the difficulty of the editing job, and then make a judgment as to whether they are willing to accept the job at the current pay rate. This enables editors to select content that they are interested in and to reveal their expertise or preferences for subject matter that would otherwise by unknown to administrators. In aggregate this will tend to improve transcription quality since the jobs will be better matched to editors than if randomly assigned.

According to an example illustrated by FIG. 1, the editor interface 126 provides job information to the user interface. This job information includes one or more unique identifiers of one or more jobs available for the editor 112, identifiers of the media files associated with the jobs, pay rates of the jobs, domain information, and durations of the content of the media file associated with the job. In this example, responsive to receipt of an indication that the editor 112 wishes to preview a media file, the editor interface 126 provides a preview of the media file and the draft transcription information associated with the media file. If the editor 112 wishes to claim the job, the editor 112 indicates this intent by interacting with the user interface and the user interface transmits a request to claim the job for the editor 112 to the editor interface 126. Next, in this example, the editor interface 126 receives the request to claim an available job from the user interface, and responsive to receiving this request, the editor interface 126 records the job as claimed in the market data storage 134.

In other embodiments, the editor interface 126 is configured to receive a request from the user interface to edit a draft transcription, and in response to the request, serve an editing screen to the user interface. The editing screen is configured to provide a variety of tools for editing and correcting the draft transcription. For instance, the editing screen provides access to the original file (or a converted version of the original file) along with the draft transcription information by referencing information contained in both the market data storage 134 and the media file storage 136. For instance, in at least one embodiment, the editing screen includes a side panel that indicates whether there is any metadata associated with particular portions of transcript text.

In one embodiment, once an editor begins working on a job, the editing screen provides the complete media file content and synchronized draft transcription information for editing using client-computer-based editing software. The editor interface 126 also transitions the job into a working state by recording the working state for the job in the market data storage 134.

The editing process consists of playing the media file content, and following along with the draft transcription, modifying the draft transcription information as necessary to ensure that the saved draft transcription reflects the content of the media file. According to some embodiments, as the editor modifies the draft transcription information, the editing screen communicates with the editor interface 126 to indicate progress through the editing job. The editing screen tracks the time point into the file that the editor is playing, as well as the parts of the draft transcription information that has been modified, to estimate progress. The progress is communicated back to the editor interface 126, and the editor interface 126 then stores this progress in the market data storage 134 in association with the editing job. In the course of working a job, the editor may come across words and phrases that are difficult to understand. The editing screen allows editors to flag these regions, so that they may be reviewed and possibly corrected by an administrator or QA user. A flag may indicate complete unintelligibility or may include a guess as to the correct word, but with an indicator that it is a guess. For each job, the prevalence of corrected flags in the edited transcript is stored in the market data storage 134, and the market engine 132 may use stored flags as an indicator of editor proficiency to aid with future job assignment. In some embodiments, the editing screen allows editors to store auxiliary deliverables such as search keywords, descriptive summarization, and other metadata derived from the transcription information during editing jobs and QA jobs.

In other embodiments, the editor interface 126 is configured to receive a request from the user interface to save an edited draft transcription, and in response to the request, save the edited draft transcription to the media file storage 136 and update progress information for the job in the market data storage 134. In some embodiments, saving the progress information triggers estimation of a new completion date and time, which is then evaluated relative to the due date and time as discussed with reference to FIG. 6 below.

According to an example illustrated by FIG. 1, the editor interface 126 provides job information to the user interface. This job information includes one or more unique identifiers of one or more jobs available for the editor 112, identifiers of the media files associated with the jobs, pay rates of the jobs, durations of the content of the media file associated with the job and progress the editor 112 has made editing the draft transcription associated with the job. In this example, responsive to receipt of an indication that the editor 112 wishes to edit the draft transcription, the editor interface 126 serves an editing screen to the user interface.

In some embodiments, the editing screen is configured to receive an indication that the editor has completed a job. In these embodiments, the editing screen is also configured to, in response to receiving the indication, store the edited draft transcription information as final transcription information in the media file storage 136 and update the market data storage 134 to include an association between the media file and the final transcription information.

The examples described above focus on a web-based implementation of the editor interface 126. However, embodiments are not limited to a web-based design. Other technologies, such as technologies employing a specialized, non-browser-based client, may be used without departing from the scope of the aspects and embodiments disclosed herein.

In some embodiments, the describer interface 140 is configured to provide a user interface to the describer 113 via the network 119 and the client computer 107. For instance, in one embodiment, the describer interface 140 is configured to serve a browser-based user interface to the describer 113 that is rendered by a web-browser running on the client computer 107. In this embodiment, the describer interface 140 exchanges media file information, describer information and job information with the describer 113 via this user interface. Describer information may include information associated with a describer profile or the history of a describer within the job market. Job information may include information associated with audio description jobs that are available or that have been completed via the job market. Specific examples of describer information include a unique identifier of the describer, domains of subject matter in which the describer is qualified to work, and identifiers of currently claimed jobs. Specific examples of job information include a unique identifier of the job, a deadline for the job, and a pay rate for the job. Media file information, describer information as a form of user information and job information are described further below with reference to FIG. 2.

In some embodiments, the describer interface 140 is configured to provide job information only for jobs that the describer 113 is permitted to work. In one example, the describer interface 140 determines that a describer is permitted to describe a draft transcription based on a complex of factors. If a media file associated with the draft transcription has a specific content type, then in some examples, the describer interface 140 will only provide job information associated with the media file to describers qualified to describe that specific content type. In other examples, the describer interface 140 may provide job information associated with more difficult files to more experienced describers. In still other examples, the describer interface 140 provides job information for jobs associated with specific customers to particular subset of describers. This approach may be advantageous, for example, if there are confidentiality concerns and only that subset of describers have signed non-disclosure agreements. Thus, some examples of the describer interface 140 do not provide job information to the describer 113 for jobs claimed by another describer or for jobs that the describer 113 does not have permission to claim.

In other embodiments, the describer interface 140 is configured to receive a request from the user interface to provide a preview of a media file, and in response to the request, serve a preview screen for the requested media file to the user interface. This preview screen provides the content of the media file and the draft transcription information associated with the media file. Describers may be given access to the preview screen for a media file before they choose to accept the describing job at the given pay rate. The preview screen includes the media file content, in the form of, for example, a streamed version of the original media file, as well as the draft transcription information for the media file, which includes time-codes or frame-codes. This information enables the preview screen to display and draft transcription in synchronization with playback of the media file content. A preview may consist of all or some of this content. The describers may access the preview screen content and thereby assess for themselves the difficulty of the describing job, and then make a judgment as to whether they are willing to accept the job at the current pay rate. This enables describers to select content that they are interested in and to reveal their expertise or preferences for subject matter that would otherwise by unknown to administrators. In aggregate this will tend to improve audio description quality since the jobs will be better matched to describers than if randomly assigned.

According to an example illustrated by FIG. 1, the describer interface 140 provides job information to the user interface. This job information includes one or more unique identifiers of one or more jobs available for the describer 113, identifiers of the media files associated with the jobs, pay rates of the jobs, domain information, and durations of the content of the media file associated with the job. In this example, responsive to receipt of an indication that the describer 113 wishes to preview a media file, the describer interface 140 provides a preview of the media file and the draft transcription information associated with the media file. If the describer 113 wishes to claim the job, the describer 113 indicates this intent by interacting with the user interface and the user interface transmits a request to claim the job for the describer 113 to the describer interface 140. Next, in this example, the describer interface 140 receives the request to claim an available job from the user interface, and responsive to receiving this request, the describer interface 140 records the job as claimed in the market data storage 134.

In other embodiments, the describer interface 140 is configured to receive a request from the user interface to describe a media file, and in response to the request, serve a describing screen to the user interface. The describing screen is configured to provide a variety of tools for describing the media file. For instance, in some embodiments, the describing screen provides access to the original media file (or a converted version of the original media file) along with the draft transcription information by referencing information contained in both the market data storage 134 and the media file storage 136. For instance, in at least one embodiment, the describing screen includes a side panel that indicates whether there is any metadata associated with particular portions of transcript text.

One example of a describing screen 1500 is illustrated within FIG. 15. As shown, the describing screen 1500 is a Synthesized Audio Video Interface (SAVI). The SAVI 1500 is segmented into a time-coded transcript region 1502, an audio description text insertion region 1504, an action header 1506, a video display 1508, and a video control 1510.

The time-coded transcript region 1502 includes a displayed time-coded transcript 1512. The time-coded transcript 1512 is separated into discrete "cells." Each cell represents a renderable duration of original audio data. Cells with word contents, such as word cell 1514, may have a variable duration dependent on the audible rendering of the words. Empty cells, such as empty cell 1516, represent fixed durations of, for example, 0.3 seconds. Cells are selectable portions of the time index that organizes the time-coded transcript. The description system identifies gaps, such as gap 1518, (identified in this example by areas of the time-coded transcript 1512 that exceed a minimum gap duration threshold configured to be 1.0 econds). Gaps may be identified by the description engine 138 using various processes described herein. The SAVI 1500 indicates gaps within the time-coded transcript region 1502, for example by color or by patterning, here in gap 1518 by shading. The current cursor position 1520 corresponds to the video-playback location 1522 described in the video control 1510 below. The SAVI 1500 indicates the current cursor position 1520, for example by color or by patterning, here in current cursor position 1520 by diagonal hatching. Audio description data is generated and associated with the time-coded transcript 1512 based on input in the audio description text insertion region 1504, as described below. The SAVI 1500 indicates the location and duration of audio description data, for example by color or by patterning, here in description indication 1548 by cross-hatching. Discrete instances of audio description data may have a duration overlapping cells with word contents, as seen in description indication 1548.

The audio description text insertion region 1504 includes an add description button 1526 and description text insertion fields, such as insertion field 1524 and 1528. The add description button 1526 may be accessible via a hot-key, such as "ctrl-A" and adds a description text insertion field to the audio description text insertion region 1504. Example insertion field 1528 includes an associated time range 1530, a text entry box 1532, a delete control 1534, a checkbox 1536, and a playback button 1538. A description text insertion field, may exclude, replace, or include elements, including a warning box 1540. The warning box 1540 may be present where a rendering of the audio description text, using the current configuration options, would result in a duration that exceeds the gap associated with the audio description text. Associated time range 1530 includes a begin time and end time 1542, with the begin time and end time 1542 initially set to the video-playback location 1522 associated with the current cursor position 1520 when the add description button 1526 added insertion field 1528. Time range 1530 also includes adjustment arrows, such as adjustment arrow 1544, that may be used to adjust the begin time and end time 1542. Activation of the adjustment arrows adjusts the time by a configurable nudge amount 1546 which can be set, for example, to 0.3 seconds. The begin time and end time 1542 updates as text is entered into text entry box 1532 with an estimate of the duration of the audio description data that will be generated from the description text. This estimate is reflected in the time-coded transcript 1512. The SAVI 1500 interoperates with the description engine 138 to determine duration estimates. The SAVI 1500 may request duration estimate dynamically as the describer types the description (e.g., when they pause, or enter a space). Duration estimates may be calculated using a number of methods, as described above with reference to the description engine 138.

In some embodiments, the describer interface 140 interoperates with the description engine 138 to generate (or "synthesize") audio description data based on the description text insertion fields. Audio description data may be generated or regenerated in one or several ways, including automatically when a cursor is moved out of insertion field 1528, in response to changes in text entry box 1532, and/or activation of the checkbox 1536. The checkbox 1536 may be used to indicate that the current description text in text entry box 1532 does not overlap original audio data corresponding to the transcript text displayed in video display 1508. In one embodiment, once audio description data is generated, playback button 1538 is displayed. The playback button 1538 allows audio playback of the audio description data in the context of the original media file, allowing the user to verify that the snippet audio does not interfere with the original audio. Once audio description data is generated, the associated begin and end time 1542 and description indication 1548 update from showing a duration estimate to reflecting the actual duration of the audio description data. The warning box 1540 may be displayed if audio description data (based on location and duration, estimated or actual) overlaps cells with word content, as seen in description indication 1548. The delete control 1534 may be used to delete insertion field 1528, if, for example, the field is no longer desired.

In some embodiments, the SAVI 1500 interoperates with the description engine 138 to modify the original audio data dynamically during the SAVI description session, so that the describers are able to hear the combined audio as it will sound to the customer. Additionally or alternatively, the SAVI 1500 may interoperate with the description engine 138 to batch modify the original audio data once work in the SAVI 1500 is completed.

As seen in insertion field 1524, the user may input portions of the text using phonetic orthography, (here "Text overlay: A 'text aa-bject'.") in order to improve the quality of the resulting speech synthesized audio description data. A phonetic alphabet such as the international phonetic alphabet (IPA, for example, as represented by the ARPABET or WORLDBET) may be used, with the phonemes entered separated by the standard orthography text using markers such as hyphens or slashes. In the above example, the /aa/ phoneme is used to replace the ambiguous orthographic letter "o" (in the word "object"), and the hyphen is employed as a delimiter to separate standard orthography from the IPA input.

In an alternative embodiment, the IPA (for example, as represented by the ARPABET) transcriptions of some or all of the words in the description text, and/or in the transcript text may be displayed to the describer in the form of a "glossary." For example, this glossary may be compiled from a pre-existing phonetic dictionary filtered to include a subset of words of potential interest to the describer. This subset may be restricted to important words in the transcript, such as content words (for example, ignoring function words), keywords (for example, by applying a keyword extraction process to the relevant text, such as the TextRank process), unusual words (for example, as determined by a statistical language model as applied to the text), or combinations of these and other methods. The selected word subset, along with corresponding phoneme sequences may be displayed in a side-panel view, or pop-menu (for example, triggered by the ctrl-P shortcut) to assist the user in entering phonetic spellings for important words. Alternatively or additionally, the phonetic transcription for a particular word in the description text or transcript, may be displayed (for example, as a pop up modal) in response to the user highlighting a word and hitting a shortcut key. In response to the user then selecting this phonetic spelling for the selected word, all occurrence of that word in the description text insertion fields may be replaced with the associated phonemes, in the format discussed above. In this way, the describers may be assisted in improving the pronunciation of important words by the speech synthesis engine.

Some speech synthesizers support further customization of the synthesized audio description data. For example, the Watson speech synthesis engine from IBM supports tagging words, phrases, and sentences with sentiment (e.g., good news, apology, uncertainty) using the "say-as" SSML tag. In some embodiments, the SAVI 1500 supports adding these tags, for example by highlighting words, phrases, sentence, etc. and then selecting from a menu of sentiment identifiers. These tags may then be added to the audio description text manifest as metadata and/or may be used to dynamically generate the audio description data in SAVI 1500, for example by including the SSML markup in the request made to the speech synthesis engine.

In some embodiments, the speech synthesis engine may be resident on the computer system on which the SAVI description session is running. Alternatively, speech synthesis may be invoked by a request to a remote computer running the speech synthesis engine. For example, this request may include the description text, the speaker, and the speaking rate as parameters. In some embodiments, the audio waveform file returned from the speech synthesis engine may be further processed to have silence removed prior to duration measurement in SAVI. For example, the silence may be identified by a section of the waveform at the beginning and/or end having a very low absolute energy (e.g., −60 dBm) or having a low energy relative to the peak or average of the rest of the waveform (e.g., −30 dB from this peak or average). This silence removal may be configured to operate only at the beginning and/or end of the snippet, and/or throughout the snippet, or any combination of these settings.

In an alternative embodiment, and depending on customer configuration, the SAVI 1500 may allow the user to have fine-grained control over the playback speed of the synthesized audio description snippets. For example, the SAVI 1500 may include a speed-control slider to enable adjustment of the speed of individual snippets. In this way, the user may be allowed to speed up snippets so as to include more description (for example, for fast-moving video sections), or to slow down the playback in areas where more careful and understandable descriptions are required (for example, in a classroom lecture video, where the describer is narrating text which has been put on a white board by the lecturer).

In an alternative embodiment, playback of the original and audio description data in the SAVI 1500 may be accomplished using extended audio description. In these situations, the combined playback of the original and audio description data will, in general, take longer than the inherent duration of the original media file. This may be accomplished, for example, by automatically pausing the original video at each time location corresponding to the beginning of audio description data, followed by playing the audio description data for its duration, followed by resuming the original audio data playback, and so on for each portion of audio description data. In a variation of this, the playback of the audio description data may proceed, either with or without pausing the original video, but with the original audio data attenuated or turned off, so that the user may see the video and hear the rendered corresponding audio description data clearly.

In some embodiments, the gaps are the only places where a user may insert descriptions in the SAVI 1500. In this case, the add description button 1526 would be unavailable (for example, greyed-out) if the current cursor position 1520 was not located over an identified gap. In other embodiments, these gaps act as suggestions for available areas for description, but the add description button 1526 is always available, for example to insert very short descriptions (for example, "Stands," "Leaves," etc.).

In other embodiments, the SAVI 1500 may be configured to add both "required" and "optional" descriptions, as indicated, for example by checking a check box labeled "optional" next to the text entry box 1532 in the SAVI 1500. These optional descriptions may typically be inserted in places where very little space exists, and may, in fact, appear as overlaps on the time-coded transcript 1512 (and warnings in the description text insertion fields). This mode may be useful for example, to support cases where the original media must be played back continuously (without pausing, for example, in a broadcast application) as well as where the original media may be played back with pausing, so that the combined original plus audio description playback time is longer than the original media file duration (for example, in a user-driven interactive web application). In the latter case, the optional description snippets may be included in the playback.

The action header 1506 includes controls to view the audio description "Standards," "Save," and "Finish." In response actuation, the Save control causes the audio description system 100 to store the work done thus far (for example, within a current audio description text manifest). In response to actuation, the Finish control causes the audio description system 100 to save the audio description data (for example, as files on a file server) and the audio description text manifest (which may include a list of files, the description texts, their timing offsets into the associated media file, and/or the duration of each snippet). The Finish control further responds to actuation by initiating generation of the output assets via the description engine 138. Other actions, including any in the SAVI 1500, may be available by a variety of elements which may include displayed controls in the action header 1506 or shortcuts. Shortcuts may be accessed directly or from a shortcut menu obtained from a keyboard shortcut with the action header 1506 displaying the keyboard shortcut. Other actions may include zooming (or un-zooming) the display, deleting entire description snippets, expanding the video playback window to full screen (for example, in order to more clearly show text displayed on the video requiring description), and adjusting the playback volume.

In some embodiments, other capabilities are available in the SAVI 1500. For example, a spell-check functionality may be available to validate spellings in the audio description text. Note that a spell-check function may be made aware of the syntax for inserting IPA spellings of words and therefore not trigger on these. Also, the SAVI 1500 may include a built-in messaging functionality so that describers and administrators may communicate during the description process. An autosave functionality may be included such that description texts are saved during the course of the job. A "Finalize and load next" button may be available to both finish the current job and immediately begin the next audio description job which the user has claimed.

The video display 1508 displays the video data of the original media file. The video control 1510 provides controls over the original displayed by the video display 1508, including volume control, playback control, full-screen control, and the video-playback location 1522 within the time index.

As is apparent in view of this disclosure, the describer may iterate on this process of using the SAVI 1500 until satisfied with the quality and appropriateness of each description, and of the way it sounds in the context of the original media file audio. The describer may play the entire media file, or sections of the media file overlayed with an audio description track (e.g., by playing the audio description data at their corresponding time into the media file) for example, by clicking on the video playback button, by selecting a point in the video timeline, or by placing the cursor at a location in the time-coded transcript view and pressing a key sequence (e.g., shift-space) to indicate that this combined playback should begin at that time location. In an alternative embodiment, the SAVI 1500 may include toggle buttons to play only the original media file or only the audio description data during playback. The SAVI 1500 may also incorporate separate playback controls to govern the synchronized playback of both the original media file and audio description data.

Returning to FIG. 1, in one embodiment, once an describer begins working on a job, the describing screen provides the complete media file content and synchronized draft transcription information for describing using client-computer-based describing software. The describer interface 140 also transitions the job into a working state by recording the working state for the job in the market data storage 134.

The describing process consists of playing the media file content, and following along with the draft transcription, describing the content of the media file at points which are suitable for audio description. According to some embodiments, as the describer progress through the media file, the describing screen (e.g., the SAVI 1500) communicates with the describer interface 140 to indicate progress through the audio description job. The describing screen tracks the time point into the media file where the describer is describing to estimate progress. The progress is communicated back to the describer interface 140, and the describer interface 140 then stores this progress in the market data storage 134 in association with the audio description job. In the course of working a job, the describer may come across content that is difficult to describe. The describing screen allows describers to flag these regions, so that they may be reviewed and possibly corrected by an administrator or QA user. A flag may indicate complete lack of description or may include a guess as to the correct description along with an indicator that it is a guess. For each job, the prevalence of corrected flags in the audio description is stored in the market data storage 134, and the market engine 132 may use stored flags as an indicator of describer proficiency to aid with future job assignment. In some embodiments, the describing screen allows describers to store auxiliary deliverables such as search keywords, descriptive summarization, and other metadata derived from the transcription information during describing jobs and QA jobs.

According to an example illustrated by FIG. 1, the describer interface 140 provides job information to the user interface. This job information includes one or more unique identifiers of one or more jobs available for the describer 113, identifiers of the media files associated with the jobs, pay rates of the jobs, durations of the content of the media file associated with the job and progress the describer 113 has made describing the media file associated with the job. In this example, responsive to receipt of an indication that the describer 113 wishes to describe the media file, the describer interface 140 serves an describing screen to the user interface.

In other embodiments, the describer interface 140 is configured to receive a request from the user interface to save (e.g., via the Save control discussed above) an audio description, and in response to the request, save the audio description to the media file storage 136 and update progress information for the job in the market data storage 134. In some embodiments, saving the progress information triggers estimation of a new completion date and time, which is then evaluated relative to the due date and time as discussed with reference to FIG. 6 below.

In some embodiments, the describing screen is configured to receive an indication that the describer has completed a job (e.g., via the Finish control discussed above). In these embodiments, the describing screen is also configured to, in response to receiving the indication, store the audio description as a final audio description in the media file storage 136 and update the market data storage 134 to include an association between the media file and the final audio description.

In some embodiments, the describer interface 140 performs pre-finish validations prior to allowing the describer to complete the current description job. For example, the describer interface 140 may ensure that all description texts are not empty, that there is at least one instance of audio description text, and/or that the customer has allowed for express exceptions to these rules. The describer interface 140 may interoperate with the description engine 138 to calculate overlaps (e.g., using time codes, audio analysis, or a combination thereof) between the audio description data and the original media file, and prevent the job from finishing if the occurrence of these overlaps exceeds a configurable threshold. Alternatively or additionally, the describer interface 140 may calculate that pairs of audio description data will overlap and prevent this condition. Alternatively or additionally, these checks may be further conditioned on a customer configurable duration "buffer" which requires separation of audio description data from the original audio by a minimum amount, e.g., 0.1 seconds. In this embodiment, should any of these condition trigger, the describer interface 140 interface may, for example, pop up a modal message to indicate the problems and their locations to the describer, so that the problems may be corrected prior to finishing the job. These validations may be "hard" (i.e., prevent the job from finishing) or "soft" (i.e., pop up the suggested changes, but allow the job to finish) depending on the transcription system configuration.

The examples described above focus on a web-based implementation of the describer interface 140. However, embodiments are not limited to a web-based design. Other technologies, such as technologies employing a specialized, non-browser-based client, may be used without departing from the scope of the aspects and embodiments disclosed herein.

Each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data into the audio description system 100 or unauthorized access to the audio description system 100.

Figure 2:
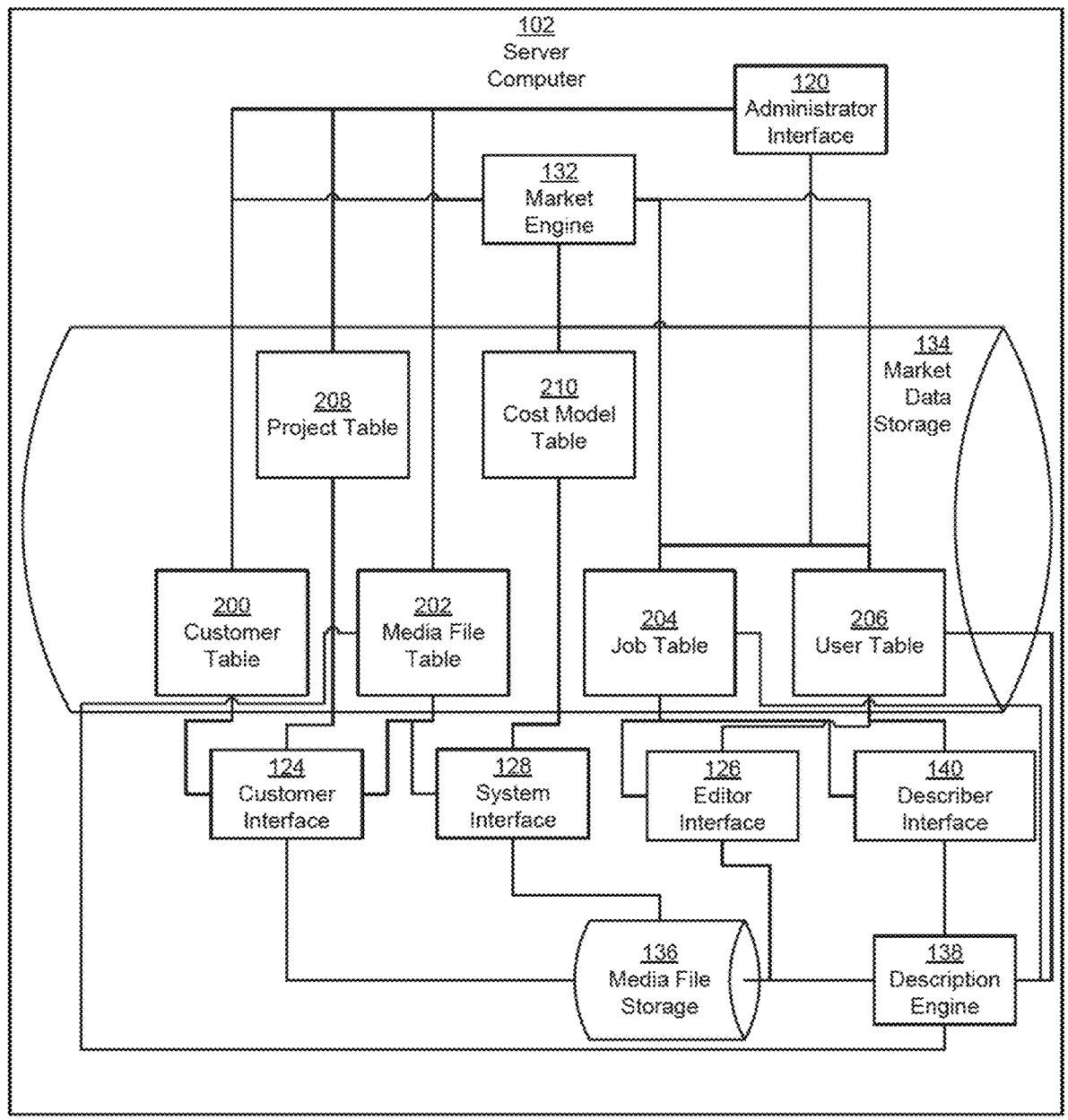
FIG. 2 is a schematic diagram of the server computer shown in FIG. 1 according to at least one embodiment described herein.

FIG. 2 illustrates the server computer 102 of FIG. 1 in greater detail. As shown in FIG. 2, the server computer 102 includes the market engine 132, the description engine 138, the market data storage 134, the customer interface 124, the system interface 128, the editor interface 126, the describer interface 140 and the media file storage 136. In the embodiment illustrated in FIG. 2, the market data storage 134 includes a customer table 200, a media file table 202, a job table 204, an user table 206, a project table 208 and a cost model table 210.

In the embodiment of FIG. 2, the customer table 200 stores information descriptive of the customers who employ the job market to have their media files transcribed and/or described. In at least one embodiment, each row of the customer table 200 stores information for a customer and includes an customer_id field, and a customer_name field. The customer_id field stores an identifier of the customer that is unique within the job market. The customer_name field stores information that represents the customer's name within the job market. The customer_id is used as a key by a variety of functions disclosed herein to identify information belonging to a particular customer.

The media file table 202 stores information descriptive of the media files that have been uploaded to the job market for transcription and/or description. In at least one embodiment, each row of the media file table 202 stores information for one media file and includes the following fields: media_file_id, customer_id, state, duration, due_date_and_time, difficulty, domain, ASR_cost, describability_rating, proposed_pay_rate, ASR_transcript_location, edited_transcript_location, QA_transcript_location, audio_description_location, advertisement, etc. . . . The media file_id_field stores a unique identifier of the media. The customer_id field stores a unique identifier of the customer who provided the media file. The state field stores information that represents the state of the media file. The duration field stores information that represents the duration of the content of the media file. The due_date_and_time field stores information that represents the date and time by which the customer requires a transcription be complete. The difficulty field stores information that represents an assessed difficulty of completing a transcription of the media file. The domain field stores information that identifies a subject matter domain to which the media file belongs. The ASR_cost field stores information that represents a predicted cost of transcribing the media file as assessed using draft transcription information. The describability_rating field stores information that indicates a predicted difficulty in describing the visual content renderable from the medial file. The proposed_pay_rate field stores information that represents a pay rate proposed using draft transcription information. The ASR_transcript_location field stores an identifier of a location of draft transcript information associated with the media file. The edited_transcript_location field stores an identifier of a location of edited draft transcript information associated with the media file. The QA_transcript_location field stores an identifier of a location of QA transcription information associated with the media file. The audio_description_location field stores an identifier of a location of audio description information associated with the media file. The advertisement field stores one or more identifiers of one or more locations of one or more advertisements associated with the media file. The media_file_id is used as a key by a variety of functions disclosed herein to identify information associated with a particular media file.

The job table 204 stores information descriptive of the jobs to be completed within the job market. In at least one embodiment, each row of the job table 204 stores information for one job and includes the following fields: job_id, media_file_id, deadline, state, job_type, pay_rate, user_id, progress, flags, XRT, corrections, hide, ASR_distance. The job_id field stores an identifier of the job that is unique within the job market. The media_file_id field stores the unique identifier of the media file to be transcribed by an editor working the job or to be described by a describer working the job. The deadline field stores information that represents the date and time by which the job must be complete. The state field store the current state (or status) of the job. Examples values for the state field include New, Initial_Processing, ASR_In_Progress, Available, Assigned, Editing_In_Progress, In_Progress, and Complete. The job_type field stores information that represents a type of work that must be performed to complete the job, for example editing, describing_extended, describing_standard, QA, etc. The pay_rate field stores information that represents a pay rate for completing the job and may reflect calculations involving ASR_Cost and/or describability rating. The user_id field stores the unique identifier of the editor or describer who has claimed this job. The progress field stores information that represents an amount of work completed for the job. The flags field stores information that represents the number and type of flags assigned to the job during editing or describing, as described above. The XRT field stores information that represents the times-real-time statistic applicable to the job. The corrections field stores information that represents corrections made to the draft transcription as part of the job. The hide field stores information that determines whether components, such as the market engine 132, the editor interface 126, and the describer interface 140 should filter out the job from job views. The ASR_distance field stores information that represents the number of changes from the draft transcription made as part of the job. The job_id is used as a key by a variety of functions disclosed herein to identify information associated with a particular job.

The user table 206 stores information descriptive of the editors and describers who prepare transcriptions and audio descriptions within the job market. In at least one embodiment, each row of the user table 206 stores information for one user and includes the following fields: user_id, roles, reward_points, domains, and special_capabilities. The user_id field stores an identifier of the editor or describer that is unique within the job market. The roles field stores information representative of roles that the editor or describer is able to assume with the job market, for example, editor, describer, QA, etc. Examples of these roles include editor, describer and QA editor. The reward_points field stores information that represent the number of reward points accumulated by the user. The domains field stores information that represents subject matter domains of media files that the user has permission to edit or describe. The special_capabilities field stores information that represents specialized skills that the editor or describer possesses. The user_id is used as a key by a variety of functions disclosed herein to identify information belonging to a particular editor or describer.

In the embodiment of FIG. 2, the project table 208 stores information descriptive of projects that the job market is being utilized to complete. In at least one embodiment, each row of the project table 208 stores information for a project and includes an project_id field, a project_name field, a customer_id field, and a domain field. The project_id field stores information that identifies a group of media files that belong to a project. The project_name field stores information that represents the project's name within the job market. The customer_id field indicates the customer to whom the project belongs. The domain field stores information that identifies a subject matter domain of media files included in the project. The project_id is used as a key by a variety of functions disclosed herein to identify information grouped into a particular project.

In the embodiment of FIG. 2, the cost model table 210 stores information descriptive of one or more cost models used to predict the cost of editing or describing the content included media files. In at least one embodiment, each row of the cost model table 210 stores information representative of a cost model and includes an user_id field, a customer_id field, a project_id field and a Cost_Model_Location field. The user_id field stores the unique identifier of an editor or describer to whom the cost model applies. The customer_id field stores the unique identifier of a customer to whom the cost model applies. The project_id field stores the unique identifier of a project to which the cost model applies. The Cost_Model_Location field stores information identifying a location of the cost model. The user_id, customer_id or project_id, any of which may be null or the wildcard indicator, may be used as a key by a variety of functions disclosed herein to identify a location of a cost model applicable to any of these entities.

Various embodiments implement the components illustrated in FIG. 2 using a variety of specialized functions. For instance, according to some embodiments, the customer interface 124 uses a File_Upload function and a File_Update function. The File_Upload function uploads a file stored on a customer's computer to the server computer 102 and accepts parameters including customer_id, project_id, filename, and optionally, domain. The customer_id parameter identifies the customer's unique customer_id. The project_id identifies the project to which the media file belongs. The filename parameter specifies the name of the media file or derived content file to be uploaded by the customer interface 124. The domain parameter specifies the subject matter domain to which the media file belongs. In at least one embodiment, if the domain parameter is not specified, the market engine 132 determines the value of the domain parameter from the value of the domain field of a record stored within the project table 208 that has a project_id field that is equal to the project_id parameter.

In other embodiments, the File_Update function updates an attribute of a media file record and accepts parameters including media_file_id, attribute, and value. The media_file_id parameter identifies the media file record with attributes that will be modified as a result of execution of the File_Update function. The attribute parameter identifies an attribute to be modified. In at least one embodiment, this attribute may be the domain, difficulty or state of the media file, as stored in the media file table 202. The value parameter specifies the value to which the attribute is to be set as a result of executing the File_Update function.

In other embodiments, the system interface 128 uses a File_Send_to_ASR function and a File_Create_Draft function. The File_Send_to_ASR function provides a media file to the ASR device 122 and causes the ASR device 122 to perform automatic speech recognition on the content included in the media file. The File_Send_to_ASR function accepts parameters including media_file_id. The media_file_id parameter identifies the media file to be processed by the ASR device 122.

In other embodiments, the File_Create_Draft function creates draft transcription information for a media file and accepts parameters including media_file_id and ASR_output. The media_file_id parameter identifies the media file for which the draft transcription information will be created by execution of the File_Create_Draft function. The ASR_output parameter specifies the location of the ASR output generated by the ASR device 122 during its processing of the media file.

In other embodiments, the market engine 132 uses the following functions: File_Assess_Difficulty, File_Propose_Pay_Rate, File_Compute_Actual_Difficulty, Job_Create, Job_Split, Job_Adjust_Parameter and Job_Revoke. The File_Assess_Difficulty function determines an estimated difficulty to transcribe the content included in a media file and accepts parameters including a media_file_id. The media_file_id parameter identifies the media file including the content for which editing difficulty is being accessed.

In other embodiments, the File_Propose_Pay_Rate function determines an initial pay rate for transcribing the content included in a media file and accepts a media_file_id parameter, from which the function determines the location of the draft_transcription_information. The media_file_id parameter identifies the media file for which the proposed_pay_rate that will be determined as a result of execution of the File_Propose_Pay_Rate function. The File_Propose_Pay_Rate function determines the initial pay rate using the information included in the draft transcription information, ASR_cost, and/or describability rating.

In other embodiments, the File_Compute_Actual_Difficulty function determines an actual difficulty of transcribing the content included in a media file and accepts parameters including media_file_id (from which it determines the location of the draft_transciption_information and final_transcription_information from the media file table 202. The media_file_id parameter identifies the media file for which the actual difficulty will be determined as a result of execution of the File_Compute_Actual_Difficulty function. The File_Compute_Actual_Difficulty function determines the actual difficulty by comparing the content of the draft transcription included in the draft transcription information to the content of the final transcription included in the final transcription information. In one embodiment, File_Compute_Actual_Difficulty function uses the number of corrections performed on the transcription to compute a standard distance metric, such as the Levenshtein distance. The File_Compute_Actual_Difficulty function stores this measurement in the ASR_distance field of the job table 204.

In other embodiments, the Job_Create function creates a job record and stores the job record in the job table 204. The Job_Create function and accepts parameters including media_file_id, job_type, pay_rate and, optionally, deadline. The media_file_id parameter identifies the media file for which the job is being created. The job_type parameter specifies the type of editing or describing work to be performed by an editor or describer claiming the job. The pay_rate parameter specifies the amount of pay an editor or describer completing the job will earn. The deadline parameter specifies the due date and time for completing the job.

In other embodiments, the Job_Split function segments a job into multiple jobs and accepts parameters including job_id and a list of timestamps. The job_id parameter identifies the job to be segmented into multiple jobs. The list of timestamps indicates the location in the media file at which to segment the media file to create new jobs.

In other embodiments, the Job_Adjust_Attribute function modifies the value of an attribute stored in a job record and accepts parameters including job_id, attribute and value. The job_id parameter identifies the job record with an attribute to be modified. The attribute parameter identifies an attribute to be modified. In at least one embodiment, this attribute may be the pay_rate, deadline, XRT, or ASR_distance of the job record, as stored in the job table 204. The value parameter specifies the value to which the attribute is to be set as a result of executing the Job_Adjust_Attribute function.

In other embodiments, the Job_Revoke function removes a job from an editor or describer and makes the job available for other editors or describers to claim according to the current market rules. The Job_Revoke function accepts parameters including job_id. The job_id parameter identifies the job to be revoked.

In other embodiments, the editor interface 126 and/or the describer interface 140 uses the following functions: Job_Store_Output, Job_Update_Progress, Job_List_Available, Job_Preview, Job_Claim, and Job_Begin. The Job_Store_Output function stores the current version of the edited draft transcription or audio description and accepts parameters including a job_id. The job_id parameter identifies the job for which the current version of the edited or described draft transcription is being stored.

In other embodiments, the Job_Update_Progress function updates the progress attribute included in a job record and saves the current state of the transcription or audio description. The Job_Update_Progress function accepts parameters including job_id, transcription data or audio description data, and progress. The job_id parameter identifies the job record for which the progress attribute will be updated to the value specified by the progress parameter. The transcription data or audio description data is saved to the location specified in the media file record associated with the job_id.

In other embodiments, the Job_List_Available function returns a list of jobs available to an editor or describer and accepts parameters including user_id, and optionally, job_type, domain, difficulty, deadline, and proposed_pay_rate. The user_id parameter identifies the editor or describer for which the list of available jobs is being created. The job_type parameter specifies a job_type to which each job in the list of available jobs must belong. The domain parameter specifies a domain to which each job in the list of available jobs must belong. The difficulty parameter specifies a difficulty that the media file associated with the job in the list must have. The deadline parameter specifies a deadline that each job in the list of available jobs must have. The proposed_pay_rate parameter specifies a proposed_pay_rate that the media file associated with the job must have. It is to be appreciated that meta rules, may also impact the list of jobs returned by the Job_List_Available function.

In other embodiments, the Job_Preview function causes a preview screen to be provided to a user interface and accepts parameters including user_id and job_id. The user_id parameter identifies the editor or describer for which the preview is being provided. The job_id parameter specifies the job that is being previewed.

In other embodiments, the Job_Claim function records a job as claimed and accepts parameters including user_id and job_id. The user_id parameter identifies the editor or describer for which the job is being claimed. The job_id parameter specifies the job that is being claimed.

In other embodiments, the Job_Begin function causes an editing or describing screen to be provided to a user interface and accepts parameters including job_id. The job_id parameter specifies the job associated with the draft transcription to be edited or described.

Embodiments of the audio description system 100 are not limited to the particular configuration illustrated in FIGS. 1 and 2. Various examples utilize a variety of hardware components, software components and combinations of hardware and software components configured to perform the processes and functions described herein. In some examples, the audio description system 100 is implemented using a distributed computer system, such as the distributed computer system described further below with regard to FIG. 3.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 3:
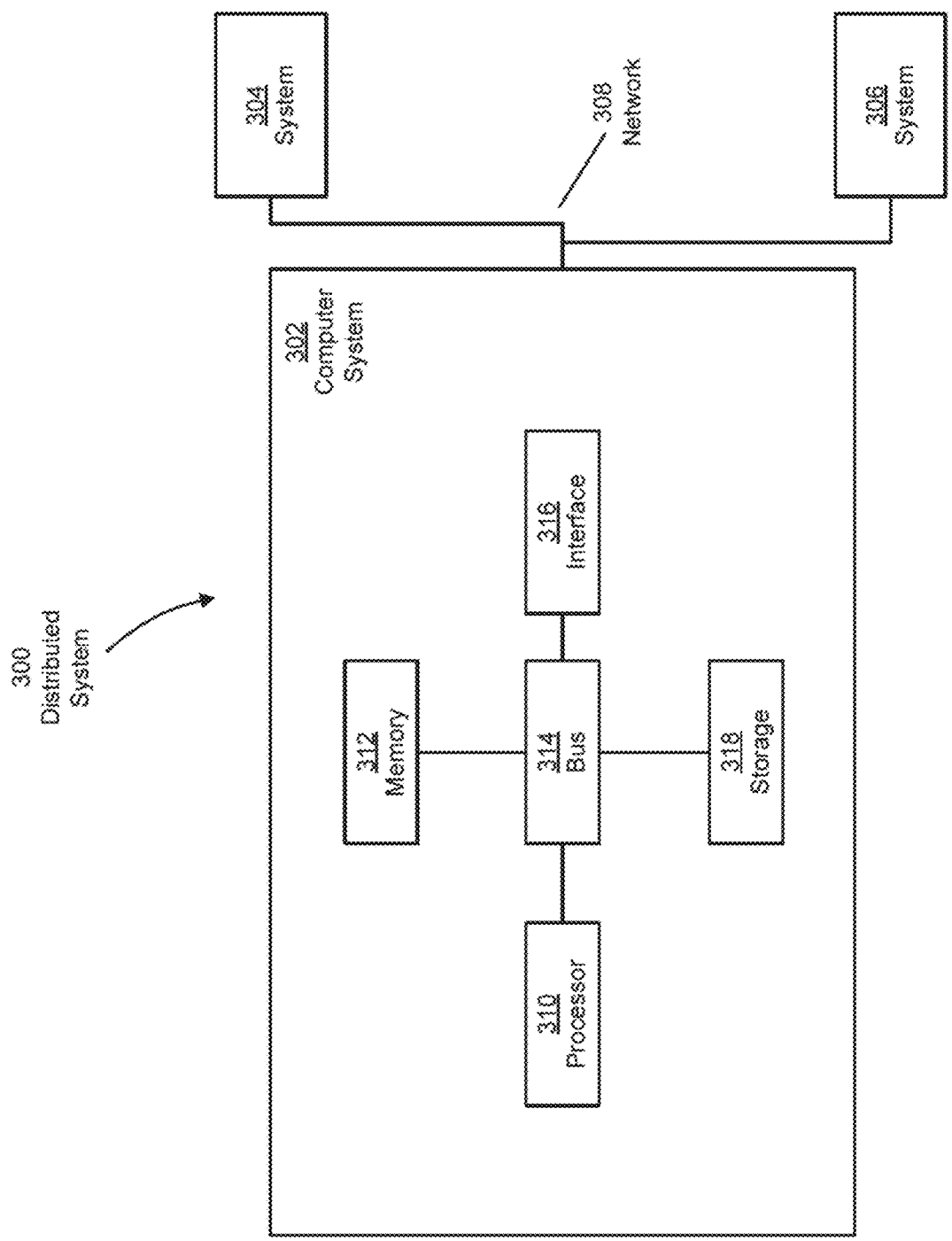
FIG. 3 is a schematic diagram of one example of a computer system that may perform processes and functions according to at least one embodiment described herein.

Referring to FIG. 3, there is illustrated a block diagram of a distributed computer system 300, in which various aspects and functions are practiced. As shown, the distributed computer system 300 includes one more computer systems that exchange information. More specifically, the distributed computer system 300 includes computer systems 302, 304 and 306. As shown, the computer systems 302, 304 and 306 are interconnected by, and may exchange data through, a communication network 308. The network 308 may include any communication network through which computer systems may exchange data. To exchange data using the network 308, the computer systems 302, 304 and 306 and the network 308 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 302, 304 and 306 may transmit data via the network 308 using a variety of security measures including, for example, TLS, SSL or VPN. While the distributed computer system 300 illustrates three networked computer systems, the distributed computer system 300 is not so limited and may include any number of computer systems and computing devices, networked using any medium and communication protocol.

As illustrated in FIG. 3, the computer system 302 includes a processor 310, a memory 312, a bus 314, an interface 316 and data storage 318. To implement at least some of the aspects, functions and processes disclosed herein, the processor 310 performs a series of instructions that result in manipulated data. The processor 310 may be any type of processor, multiprocessor or controller. Some example processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 310 is connected to other system components, including one or more memory devices 312, by the bus 314.

The memory 312 stores programs and data during operation of the computer system 302. Thus, the memory 312 may be a relatively high performance, volatile, random access memory such as a dynamic random access memory (DRAM) or static memory (SRAM). However, the memory 312 may include any device for storing data, such as a disk drive or other non-volatile storage device. Various examples may organize the memory 312 into particularized and, in some cases, unique structures to perform the functions disclosed herein. These data structures may be sized and organized to store values for particular data and types of data.

Components of the computer system 302 are coupled by an interconnection element such as the bus 314. The bus 314 may include one or more physical busses, for example, busses between components that are integrated within a same machine, but may include any communication coupling between system elements including specialized or standard computing bus technologies such as IDE, SCSI, PCI and InfiniBand. The bus 314 enables communications, such as data and instructions, to be exchanged between system components of the computer system 302.

The computer system 302 also includes one or more interface devices 316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 302 to exchange information and to communicate with external entities, such as users and other systems.

The data storage 318 includes a computer readable and writeable nonvolatile, or non-transitory, data storage medium in which instructions are stored that define a program or other object that is executed by the processor 310. The data storage 318 also may include information that is recorded, on or in, the medium, and that is processed by the processor 310 during execution of the program. More specifically, the information may be stored in one or more data structures specifically configured to conserve storage space or increase data exchange performance. The instructions may be persistently stored as encoded signals, and the instructions may cause the processor 310 to perform any of the functions described herein. The medium may, for example, be optical disk, magnetic disk or flash memory, among others. In operation, the processor 310 or some other controller causes data to be read from the nonvolatile recording medium into another memory, such as the memory 312, that allows for faster access to the information by the processor 310 than does the storage medium included in the data storage 318. The memory may be located in the data storage 318 or in the memory 312, however, the processor 310 manipulates the data within the memory, and then copies the data to the storage medium associated with the data storage 318 after processing is completed. A variety of components may manage data movement between the storage medium and other memory elements and examples are not limited to particular data management components. Further, examples are not limited to a particular memory system or data storage system.

Although the computer system 302 is shown by way of example as one type of computer system upon which various aspects and functions may be practiced, aspects and functions are not limited to being implemented on the computer system 302 as shown in FIG. 3. Various aspects and functions may be practiced on one or more computers having a different architectures or components than that shown in FIG. 3. For instance, the computer system 302 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 302 may be a computer system including an operating system that manages at least a portion of the hardware elements included in the computer system 302. In some examples, a processor or controller, such as the processor 310, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 310 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Audio Description System Processes

Figure 4:
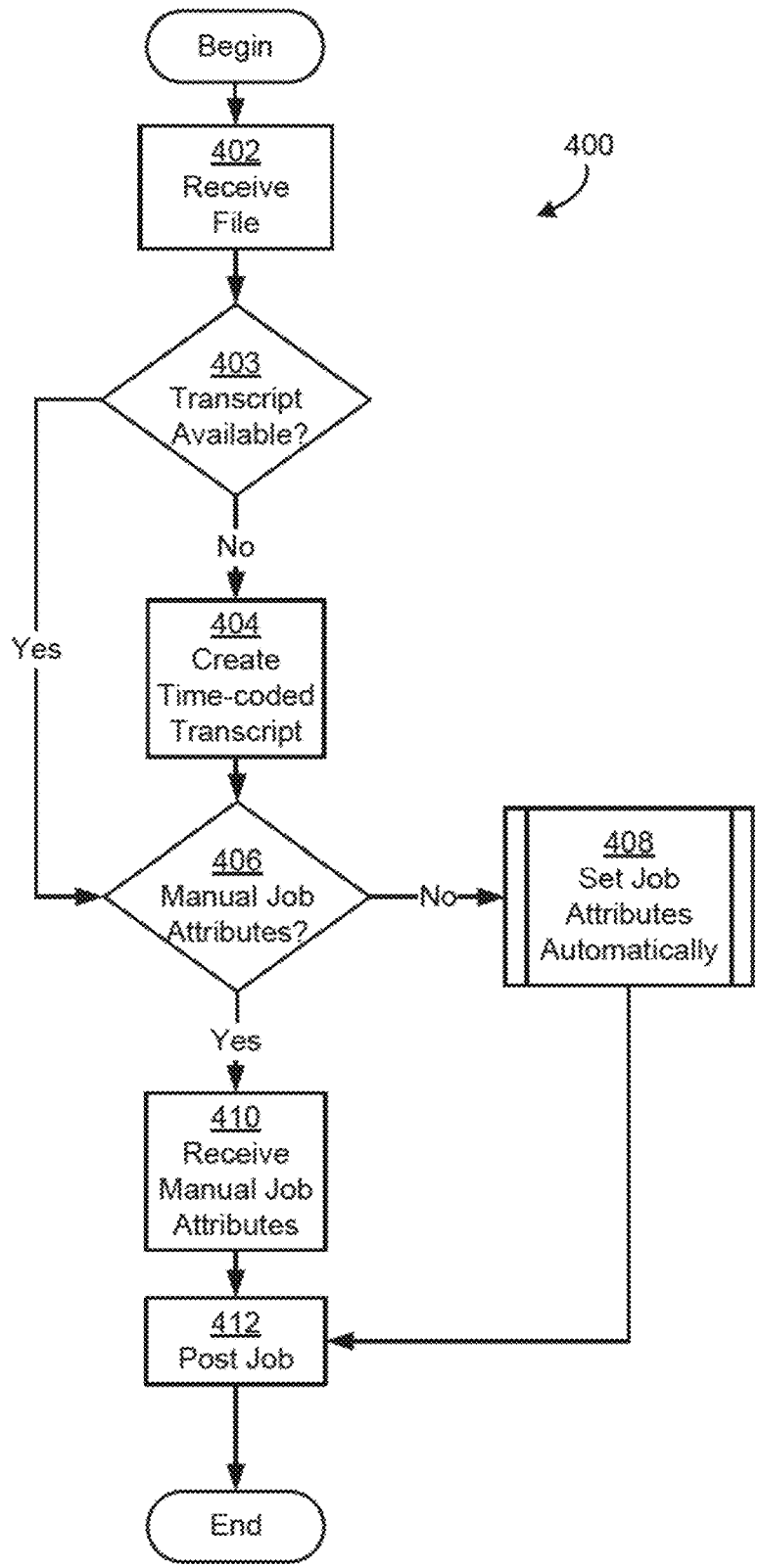
FIG. 4 is a flow diagram illustrating a process of creating a job according to at least one embodiment described herein.

Some embodiments perform processes that add jobs to a job market using an audio description system, such as the audio description system 100 described above. One example of such a process is illustrated in FIG. 4. According to this example, a process 400 includes acts of receiving a media file, creating an ASR transcription, receiving job attributes, setting job attributes automatically and posting a job.

In act 402, the audio description system receives a media file including content to be transcribed and/or described. Next, in act 403, the audio description system determines whether a time-coded transcript of the media file content is currently available (e.g., was uploaded as part of the audio description request). If so, the audio description system proceeds to act 406. Otherwise, the audio description system proceeds to act 404.

In the act 404, the audio description system generates a time-coded transcript of the media file content. The act 404 may include a variety of processes, according to various embodiments. For example, in one embodiment, the audio description system generates an ASR transcript of the media file via a system interface (e.g., the system interface 128) to an ASR device (e.g., the ASR device 122). In another embodiment, the audio description system creates a transcription job, posts a transcription job, and manages the transcription job to completion using a transcription generation process, such as the process 800 described in the Electronic Job market patent. In another embodiment, the audio description system generates a time-coded transcript by importing one or more caption files (with or without audio description data) using, for example, 3Play Media's caption import service as described in the Alignment patent. Alternatively or additionally, where the customer uploads a non-time-coded transcript, and the audio description system may generate a time-coded transcript from the non-time-coded transcript and the media file using an alignment process (e.g., 3Play Media's Transcription Alignment service). In all of these embodiments, including the embodiment where the time-coded transcript is produced using the full transcription process (potentially, including QA review) described in the Electronic Transcription Job Market application, the time-coded transcript gives a full representation of the time location and durational extent of all words and silence regions in the original media file. Additionally, the time-coded transcript may indicate the durational extent of non-verbal events such as important background noises, musical passages, or sound effects. The time-coded transcript may also indicate the durational extent of speech which is not in the native language of the target audience (e.g., using a tag like [NON-ENGLISH SPEECH]). Locations of speaker changes, the speaker names, paragraph breaks, and other metadata may also be encoded in the transcript data structure.

After generating a time-coded transcript is created or verifying the transcripts availability, the audio description system determines whether attributes for a job to be associated with the media file will be set manually in the act 406. If so, the audio description system receives the manually entered job attributes in act 410. Otherwise, the audio description system executes a process that sets the job attributes automatically in act 408. This process is described further below with reference to FIG. 7. Once the job attributes have been set, the audio description system posts the job in act 412, and the process 400 ends.

Figure 5:
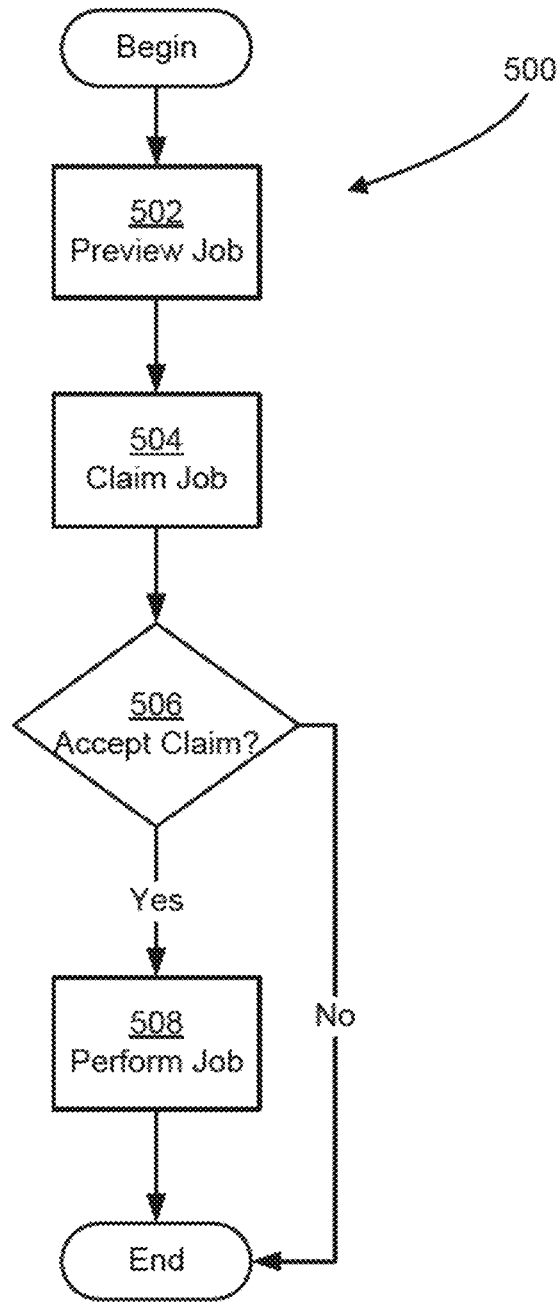
FIG. 5 is a flow diagram illustrating a process of working a job according to at least one embodiment described herein.

Other embodiments perform processes that allow an editor or a describer to perform a job listed on the job market using an audio description system, such as the audio description system 100 described above. One example of such a process is illustrated in FIG. 5. According to this example, a process 500 includes acts of previewing a job, claiming a job and completing a job.

In act 502, the audio description system receives a request to provide a preview of a job. In response to this request, the audio description system provides a preview of the job. The preview includes a preview of the content included in the media file associated with the job and draft transcription information for a transcript that is associated with the media file. The preview may also include job attributes such as pay rate, job type, domain, duration, and difficulty.

Next, in act 504, the audio description system receives a request to claim the job. In response to this request, in act 506 the audio description system determines whether to accept the claim using the processes disclosed herein. If the claim is not accepted, the process 500 ends. If the claim is accepted, the process 500 executes act 508.

In the act 508, the audio description system receives a request to perform the job. In response to this request, the audio description system provides a user interface and tools that enable an editor or describer to perform work. While the editor or describer is performing the work, the audio description system monitors progress and periodically saves work in process. Upon receipt of an indication that the editor or describer has completed the job, the audio description system saves the completed job, and the process 500 ends.

Figure 6:
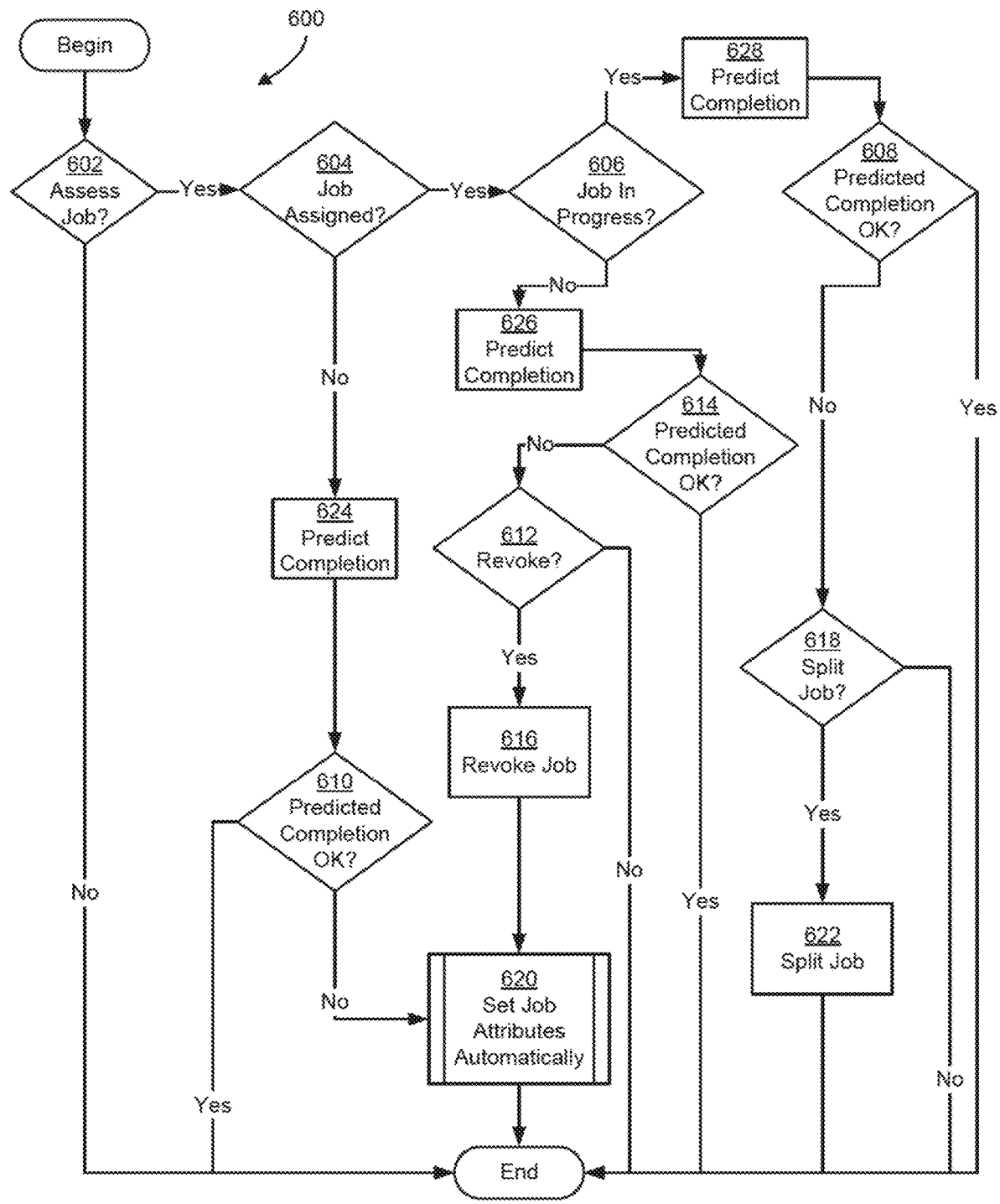
FIG. 6 is a flow diagram illustrating a process of calibrating a job according to at least one embodiment described herein.

Other embodiments perform processes that monitor jobs to ensure the jobs are completed according to schedule using an audio description system, such as the audio description system 100 described above. One example of such a process is illustrated in FIG. 6. According to this example, a process 600 includes several acts that are described further below.

In act 602, the audio description system determines whether a job should be assessed for attribute adjustment. The audio description system may make this determination based on a variety of factors including receipt of a request to assess the job from a component of the system or expiration of a predetermined period of time since the job was previously assessed, i.e., a wait time. If the job should not be assessed, the process 600 ends. Otherwise, the process 600 executes act 604.

In the act 604, the audio description system determines whether the job is assigned. If so, the audio description system executes act 624. Otherwise, the audio description system determines whether the job is in progress in act 606. If not, the audio description system executes act 626. Otherwise, the audio description system executes the act 628.

In the acts 624, 626 and 628, the audio description system predicts the completion date and time of the job using one or more of the following factors: the current date and time, the amount of progress already complete for the job; historical productivity of the editor or describer (in general or, more specifically, when editing or describing media files having a characteristic in common with the media file associated with the job); the number of jobs currently claimed by the editor or describer; the number of jobs the editor or describer has in progress; and the due dates and times of the jobs claimed by the editor or describer.

In some embodiments, the following equation is used to predict the completion date and time of the job:

$$Tc = To + [(1-Pj)*Dj*Xe] + [K1*Fc*Dc*Xc] + [K2*Fp*Dp*Xp]$$

Where,
Tc is the predicted completion time of the job
To is the current time
Pj is the progress on the job, expressed as a decimal fraction Xe is the times-real-time-statistic for the editor or describer, either the general statistic or the conditional statistic as determined by the job characteristics Xc is the times-real-time-statistic for the editor or describer, either the general statistic or the conditional statistic as determined by the claimed job characteristics, taken as a whole Xp is the times-real-time-statistic for the editor or describer, either the general statistic or the conditional statistic as determined by the in-progress job characteristics, taken as a whole Dj is the duration of the job Dc is the duration of the claimed but not yet in-progress jobs Dp is the duration of the in-progress jobs Fc is the fraction of the total claimed job duration accounted for by jobs which have a due date and time earlier than that of the current job Fp is the fraction of the total in-progress jobs duration accounted for by jobs which have a due date and time earlier than the current job K1 and K2 are tunable constants.

In act 608, the audio description system determines whether the predicted completion date and time of the job is before the due date and time of the job. If so, the process 600 ends. Otherwise, the audio description system executes act 618.

In act 610, the audio description system determines whether the predicted completion date and time of the job is before the due date and time of the job. If so, the process 600 ends. Otherwise, the audio description system executes a process that sets the job attributes automatically in act 620. This process is described further below with reference to FIG. 7. Once the job attributes have been set, the process 600 ends.

In act 614, the audio description system determines whether the predicted completion date and time of the job is before the due date and time of the job. If so, the process 600 ends. Otherwise, the audio description system determines whether to revoke the job in act 612. If not, the process 600 ends. Otherwise, the audio description system revokes the job in act 616.

In act 618, the audio description system determines whether to split the job. If not, the process 600 ends. Otherwise, the audio description system splits the job in act 622, and the process 600 ends.

Figure 7:
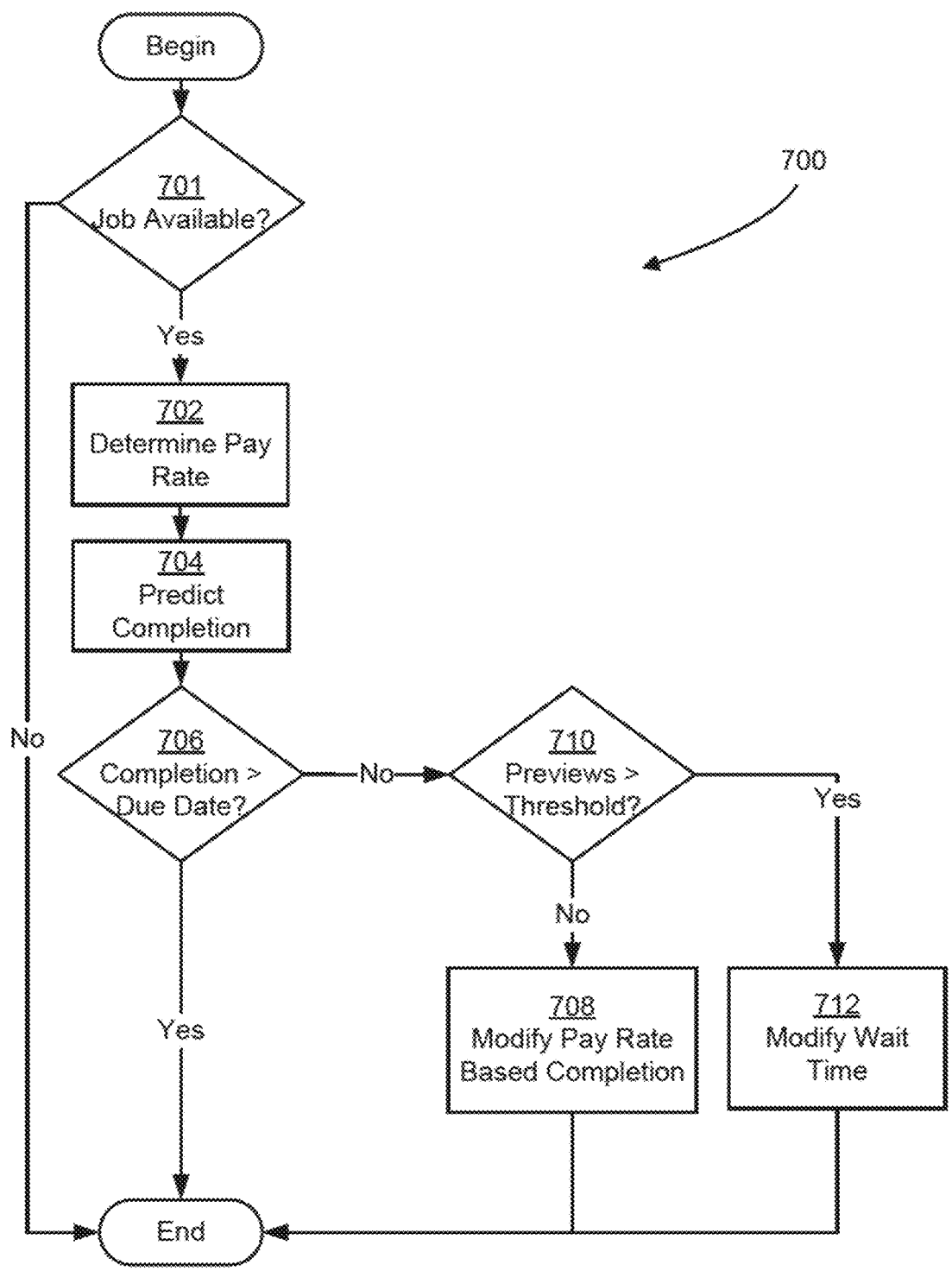
FIG. 7 is a flow diagram illustrating a process of determining job attributes according to at least one embodiment described herein.

As discussed above with reference to FIGS. 4 and 6, some embodiments perform processes that set attributes of jobs using an audio description system, such as the audio description system 100 described above. One example of such a process is illustrated in FIG. 7. According to this example, a process 700 includes several acts that are described further below.

In act 701, the audio description system determines if the job is available. In not, the process 700 ends. Otherwise, the audio description system determines a pay rate for the job in act 702. The audio description system may make this determination based on any of a variety of factors including due date and time, difficulty, domain, ASR_cost, and describability rating.

In act 704, the audio description system predicts a completion date and time for the job for each editor or describer. The audio description system may make this determination based on any of a variety of factors including difficulty, domain and historical XRT of previously completed, similar jobs.

In act 706, the audio description system determines whether the completion date and time is prior to the due date and time for the job. If so, the process 700 ends. Otherwise, the audio description system determines whether the number of previews provided for the job transgresses a threshold in act 710. If not, the audio description system executes act 708. Otherwise, the audio description system executes act 712.

In act 708, the audio description system modifies the pay rate based on the difference between the due date and time to the completion date and time, and the process 700 ends. For instance, the audio description system may set the modified pay rate equal to the unmodified pay rate plus a date and time increment amount multiplied by the difference between the due date and time and the completion date and time.

In act 712, the audio description system modifies the wait time for reassessment of the job, and the process 700 ends. For instance, the audio description system may set the modified wait time equal to the unmodified wait time plus an increment amount.

Figure 17:
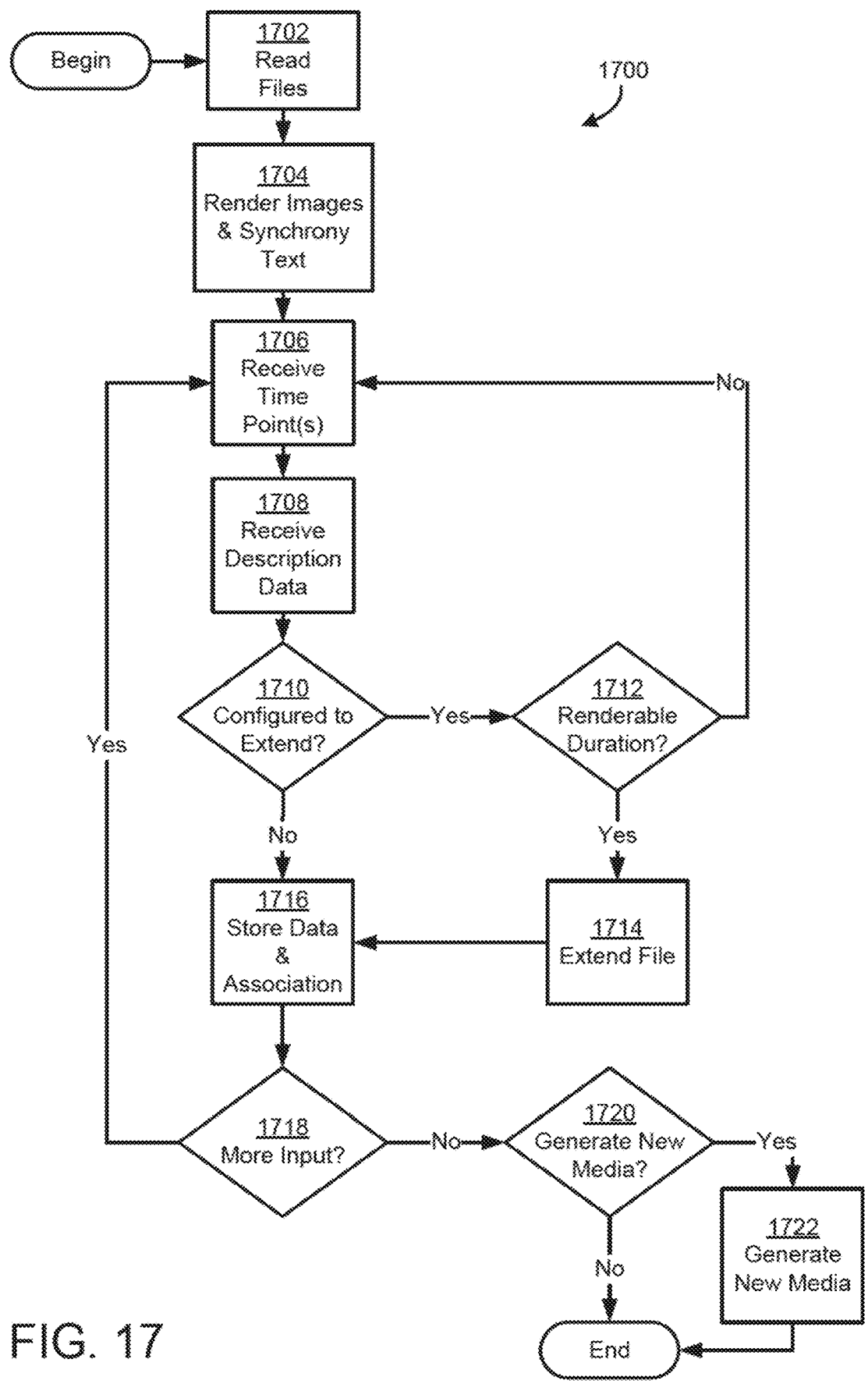
FIG. 17 is a flow diagram illustrating an audio description process according to at least one embodiment described herein.

Some embodiments perform processes that generate an audio description of a media file using a computer system, such as the computer system 300 described above, having a display, a memory, and at least one processor coupled to the display, the memory, and an interface device. One example of such a process is illustrated in FIG. 17. According to this example, a process 1700 includes acts of reading a media file and a transcript, rendering one or more images, rendering transcription text, receiving at least one time point, receiving audio description data, storing and associating the audio description data with at least one time point, extending the media file, and generating a new media file.

In act 1702 the processor reads files stored in memory, including a media file comprising video data accessible via a time index and audio data synchronized with the video data via the time index; and a transcript of the audio data comprising transcription data synchronized with the video data via the time index.

Next, in act 1704, the computer system renders, via a display, one or more images from portions of the video data, along with text from portions of the transcription data in synchrony with the one or more images. The at least one processor may be further configured to render additional text from additional portions of the transcription data adjacent to the portions of the transcription data. Additionally, the at least one processor may be further configured to identify a plurality of points within the time index that identify a plurality of portions of the audio data that each have one or more attributes that meet one or more predefined criteria; the computer system rendering, via the display, a plurality of indications representing the plurality of points within the text and the additional text. Furthermore, the at least one processor may be configured to identify the plurality of points at least in part by accessing one or more of the transcription data and the audio data. Also, the one or more attributes may comprise a duration, a volume, and/or a volume over a range of frequencies. The one or more predefined criteria may specify that the duration be at least a predefined threshold value, the volume not exceed a predefined threshold value, and/or the volume over the range of frequencies not transgress one or more predefined threshold values.

In act 1706, the computer system receives input identifying at least one point within the time index. The processor may be configured to receive input identifying the at least one point via selection of an area within the text.

In act 1708, the computer system receives input specifying audio description data to associate with the at least one point. The interface device coupled to the at least one processor may be a microphone, wherein the at least one processor is configured to receive input specifying the audio description data via the microphone. Alternatively, or additionally, the interface device coupled to the at least one processor may be a keyboard, wherein the at least one processor is configured to receive input specifying the audio description data via the keyboard.

In act 1710, the computer system determines if the processor is configured to extend the media file. If not, the computer system executes act 1716. If so, the computer system determines whether the audio description data has at least one renderable duration in act 1712.

If not, the computer system returns to, and executes, act 1706. Otherwise, the computer system executes act 1714.

In act 1714, the computer system extends the media file, at one or more locations accessible via the at least one point, by the at least one renderable duration.

In act 1716, the computer system stores, in the memory, the audio description data and an association between the audio description data and the at least one point.

Next, in act 1718, the computer system determines if more input is available to receive. If so, the computer system returns to, and executes, act 1706. If not, the computer system determines whether the processor is configured to generate a new media file in act 1720. If not, process 1700 ends. Otherwise, the computer system executes act 1722.

In act 1722, the computer system generates a new media file, and the process ends. The new media file may include the audio description data synchronized with the video data according to the time index. Alternatively, or additionally, the new media file may include the video data, the audio data, and the audio description data. In another alternative or addition, if the processor is further configured to adjust a volume of at least one portion of the audio data, thereby generating adjusted audio data, the computer system generates a new media file that comprises the adjusted audio data.

Figure 18:
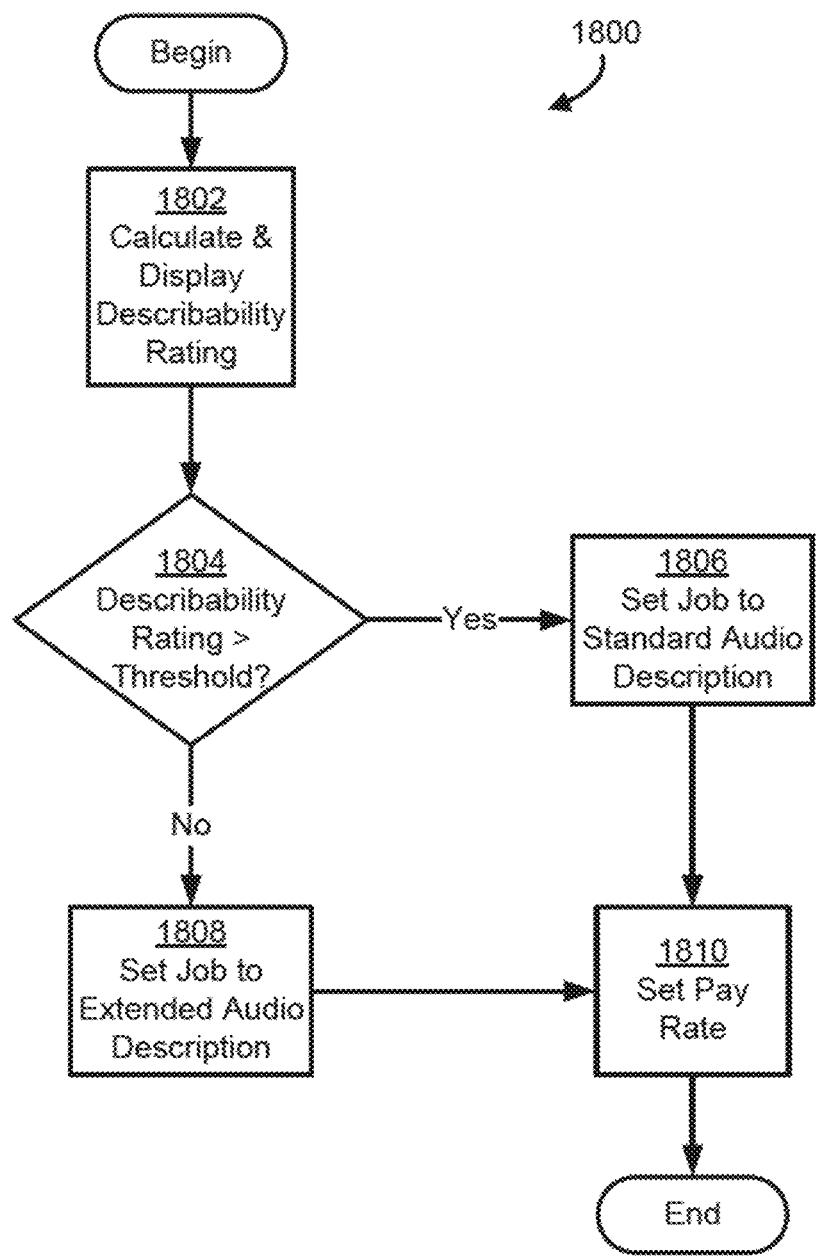
FIG. 18. Is a flow diagram illustrating a pay rate setting process according to at least one embodiment described herein.

Some embodiments perform processes that set a pay rate for an audio description job using a computer system, such as the computer system 300 described above. One example of such a process 1800 is illustrated in FIG. 18.

In act 1802 the processor calculates, via execution of a description engine such as the description engine 138, a describablity rating of a media file associated with an audio description job and displays the describablity rating via a user interface. In act 1804, the processor compares the describablity rating to a threshold value to determine whether the describablity rating transgresses the threshold value. If so, the processor executes act 1806. Otherwise, the processor executes act 1808.

In the act 1806, the processor configures the audio description job to be a standard audio description job, for example by altering configuration data defining the job in a data store, such as the market data storage 134. In the act 1808, the processor configures the audio description job to be an extended audio description job, for example by altering configuration data defining the job in a data store, such as the market data storage 134. In act 1810, the processor calculates a pay rate for the job, via execution of a market engine such as the market engine 132, and sets the pay rate of the job to the calculated pay rate, for example by altering configuration defining the job in a data store, such as the market data storage 134. After execution of the act 1810, the processor terminates the process 1800.

Processes 400 through 1800 each depict one particular sequence of acts in a particular example. The acts included in these processes may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. Furthermore, as discussed above, in at least one example, the acts are performed on a particular, specially configured machine, namely a audio description system configured according to the examples and embodiments disclosed herein.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

The invention claimed is:

1. A computer system configured to generate an audio description of a media file, the computer system comprising:
   a display;
   a memory storing
      a media file comprising video data accessible via a time index and audio data synchronized with the video data via the time index; and
      a transcript of the audio data comprising transcription data synchronized with the video data via the time index; and
   at least one processor coupled to the display and the memory and configured to
      render, via the display, one or more images from portions of the video data;
      render, via the display, text from portions of the transcription data in synchrony with the one or more images;
      receive input identifying at least one point within the time index;
      receive input specifying audio description data to associate with the at least one point;
      store, in the memory, the audio description data;
      store, in the memory, an association between the audio description data and the at least one point; and
      calculate a describability rating for the media file.

2. The computer system of claim 1, wherein the audio description data has at least one renderable duration and the at least one processor is further configured to extend the media file, at one or more locations accessible via the at least one point, by the at least one renderable duration.

3. The computer system of claim 1, wherein the at least one processor is further configured to generate a new media file that includes the audio description data synchronized with the video data according to the time index.

4. The computer system of claim 1, wherein the at least one processor is further configured to generate a new media file that includes the video data, the audio data, and the audio description data.

5. The computer system of claim 1, wherein the at least one processor is further configured to:
   adjust a volume of at least one portion of the audio data to generate adjusted audio data; and
   generate a new media file that comprises the adjusted audio data.

6. The computer system of claim 1, wherein the at least one processor is configured to receive input identifying the at least one point via selection of an area within the text.

7. The computer system of claim 1, further comprising a microphone coupled to the at least to one processor, wherein the at least one processor is configured to receive input specifying the audio description data via the microphone.

8. The computer system of claim 1, further comprising a keyboard coupled to the at least one processor, wherein the at least one processor is configured to receive input specifying the audio description data via the keyboard.

9. The computer system of claim 1, wherein the at least one processor is further configured to render additional text from additional portions of the transcription data adjacent to the portions of the transcription data.

10. The computer system of claim 9, wherein the at least one processor is further configured to
 identify a plurality of points within the time index that identify a plurality of portions of the audio data that each have one or more attributes that meet one or more predefined criteria; and
 display a plurality of indications representing the plurality of points within the text and the additional text.

11. The computer system of claim 10, wherein the at least one processor is configured to identify the plurality of points at least in part by accessing one or more of the transcription data and the audio data.

12. The computer system of claim 10, wherein the one or more attributes comprise a duration and the one or more predefined criteria specify that the duration be at least a predefined threshold value.

13. The computer system of claim 10, wherein the one or more attributes comprise a volume and the one or more predefined criteria specify that the volume not exceed a predefined threshold value.

14. The computer system of claim 10, wherein the one or more attributes comprise a volume over a range of frequencies and the one or more predefined criteria specify that the volume over the range of frequencies not transgress one or more predefined threshold values.

15. The computer system of claim 1, wherein the at least one processor is further configured to render, via the display, the describability rating.

16. The computer system of claim 1, wherein the at least one processor is further configured to:
 setup an audio description job associated with the media file;
 compare the describability rating to a predefined threshold value;
 configure the audio description job as a standard job where the describability rating transgresses the predefined threshold value; and
 configure the audio description job as an extended job where the describability rating does not transgress the predefined threshold value.

17. The computer system of claim 16, wherein the at least one processor is further configured to determine a pay rate for the audio description job that is based at least in part on the describability rating.

18. The computer system of claim 1, wherein the describability rating includes at least one of a ratio and a target frequency, the ratio being a sum of durations of a plurality of portions of the audio data that each have one or more attributes that meet one or more predefined criteria divided by a duration of the media file, the target frequency being a count of the plurality of portions per unit of time.

19. The computer system of claim 18, wherein the unit of time is 1 minute.

20. A method for generating an audio description of a media file using a computer system comprising a display and memory coupled to the display, the method comprising:
 storing, by the computer system, a media file comprising video data accessible via a time index and audio data synchronized with the video data via the time index;
 storing a transcript of the audio data comprising transcription data synchronized with the video data via the time index;
 rendering, via the display, one or more images from portions of the video data;
 rendering, via the display, text from portions of the transcription data in synchrony with the one or more images;
 receiving input identifying at least one point within the time index;
 receiving input specifying audio description data to associate with the at least one point;
 storing the audio description data;
 storing an association between the audio description data and the at least one point; and
 calculating a describability rating for the media file.

21. The method according to claim 20, wherein the audio description data has at least one renderable duration and the method further comprises extending the media file, at one or more locations accessible via the at least one point, by the at least one renderable duration.

22. The method according to claim 20, further comprising generating a new media file that includes the audio description data synchronized with the video data according to the time index.

23. The method according to claim 20, further comprising generating a new media file that includes the video data, the audio data, and the audio description data.

24. The method according to claim 20, further comprising:
 generating adjusted audio data by adjusting a volume of the audio data; and
 generating a new media file that comprises the adjusted audio data.

25. The method according to claim 20, further comprising rendering additional text from additional portions of the transcription data adjacent to the portions of the transcription data.

26. The method according to claim 25, further comprising:
 identifying a plurality of points within the time index that identify a plurality of portions of the audio data that each have one or more attributes that meet one or more predefined criteria; and
 displaying a plurality of indications representing the plurality of points within the text and the additional text.

27. The method according to claim 20, further comprising:
 setting up an audio description job associated with the media file;
 comparing the describability rating to a predefined threshold value;
 configuring the audio description job as a standard job where the describability rating transgresses the predefined threshold value;
 configuring the audio description job as an extended job where the describability rating does not transgress the predefined threshold value; and determining a pay rate for the audio description job that is based at least in part on the describability rating.

28. A non-transitory computer readable medium storing computer-executable sequences of instructions to generate an audio description of a media file via a computer system, the sequences of instructions comprising instructions to:
  store, in a memory, a media file comprising video data accessible via a time index and audio data synchronized with the video data via the time index;
  store, in the memory, a transcript of the audio data comprising transcription data synchronized with the video data via the time index;
  render, via a display, one or more images from portions of the video data;
  render, via the display, text from portions of the transcription data in synchrony with the one or more images;
  receive input identify at least one point within the time index;
  receive input specifying audio description data to associate with the at least one point;
  store, in the memory, the audio description data;
  store, in the memory, an association between the audio description data and the at least one point; and
  calculate a describability rating for the media file.

29. The computer readable medium according to claim 28, wherein the audio description data has at least one renderable duration and the sequences of instructions further comprise instructions to extend the media file, at one or more locations accessible via the at least one point, by the at least one renderable duration.

30. The computer readable medium according to claim 28, wherein the sequences of instructions further comprise instructions to render additional text from additional portions of the transcription data adjacent to the portions of the transcription data.

31. A transcription system configured to generate audio description snippets and a snippet manifest from a source media file, the transcription system comprising:
  a time-coded transcript of the source media file; and
  a synthesized audio video interface configured to
    display the source media file;
    display the time-coded transcript;
    receive input identifying a selected time location within the source media file;
    receive input specifying audio description text to associate with the selected time location, the audio description text having at least one text characteristic;
    generate an estimated duration of the audio description text using at least one of the at least one text characteristics;
    display the estimated duration of the audio description text;
    generate an audio snippet from the audio description text;
    store the audio snippet as a file;
    store, in the snippet manifest, the audio snippet, the audio description text, the selected time location in the source media file, and a duration of the snippet; and
    calculate a describability rating for the media file.

* * * * *